US008885282B2

(12) United States Patent
Sakuma

(10) Patent No.: US 8,885,282 B2
(45) Date of Patent: Nov. 11, 2014

(54) LIBRARY DEVICE AND CONTROL METHOD THEREOF

(71) Applicant: Fujitsu Limited, Kawasaki (JP)

(72) Inventor: Ichirou Sakuma, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/219,049

(22) Filed: Mar. 19, 2014

(65) Prior Publication Data

US 2014/0293471 A1 Oct. 2, 2014

(30) Foreign Application Priority Data

Mar. 28, 2013 (JP) .................................. 2013-070686
Feb. 13, 2014 (JP) .................................. 2014-025613

(51) Int. Cl.
*G11B 19/02* (2006.01)
*G11B 15/68* (2006.01)

(52) U.S. Cl.
CPC .................................. *G11B 15/6835* (2013.01)
USPC ............ 360/69; 360/92.1; 713/300; 700/214; 700/245

(58) Field of Classification Search
None
See application file for complete search history.

(56) References Cited

U.S. PATENT DOCUMENTS

| 5,872,751 | A  | * | 2/1999  | Utsumi et al. ............. 369/30.29 |
| 6,456,364 | B1 |   | 9/2002  | Imai                                 |
| 7,171,571 | B2 | * | 1/2007  | Starr et al. .................... 713/320 |
| 2005/0130453 | A1 |   | 6/2005  | Inada et al.                       |
| 2005/0279281 | A1 |   | 12/2005 | Yamashita et al.                   |

FOREIGN PATENT DOCUMENTS

| JP | 2000-164480 | 6/2000 |
| JP | 2005-175125 | 6/2005 |
| JP | 2006-012912 | 1/2006 |

OTHER PUBLICATIONS

Tom Sato, "Safety Interlock", http://homepage3.nifty.com/tsato/terms/interlock.html. Sep. 19, 2002 (English translation).

* cited by examiner

*Primary Examiner* — Andrew L Sniezek
(74) *Attorney, Agent, or Firm* — Fujitsu Patent Center

(57) ABSTRACT

A cell stores a plurality of magnetic tapes. A conveyance mechanism manages movement of the magnetic tapes stored in the cell. An interlock switch cam moves in a predetermined direction when a pressing force from an inner door claw is removed. An interlock switch shuts off power supply to the conveyance mechanism when the interlock switch cam moves in the predetermined direction. A disabling button moves on a moving path of the interlock switch cam by receiving an instruction from an operator and prevents the interlock switch cam from moving in the predetermined direction.

9 Claims, 53 Drawing Sheets

LIBRARY DEVICE AND CONTROL METHOD THEREOF

CROSS-REFERENCE TO RELATED APPLICATIONS

This application is based upon and claims the benefit of priority of the prior Japanese Patent Application No. 2013-070686, filed on Mar. 28, 2013, and the Japanese Patent Application No. 2014-025613, filed on Feb. 13, 2014, the entire contents of which are incorporated herein by reference.

FIELD

The embodiments discussed herein are directed to a library device and a control method of the library device.

BACKGROUND

There is a tape drive device that writes data to magnetic tape in order to record and store data outputted from an arithmetic processing unit such as a server. To cope with the tendency of increasing amount of data in recent years, a tape library device which contains a large number of tape drive devices in one housing is provided. In the tape library device, a robot mechanism that receives a command puts a tape into and takes a tape out of each tape drive device.

A door of the tape library device is provided with an interlock mechanism so that an operator such as a worker who performs maintenance of the tape library (hereinafter simply referred to as an "operator") does not touch the robot mechanism that is operating. When the door of the tape library device is opened, the interlock mechanism shuts off power supply of the robot mechanism to stop the robot mechanism.

When a failure occurs in the library device, if the operator opens the door to check the state of the device, the power supply of the robot mechanism is shut down. Therefore, when the operator checks the state of the robot mechanism, the operator temporarily turns on the interlock switch by using a tool to disable the interlock and thereafter checks the state of the robot mechanism. The robot mechanism whose power is turned on again returns to normal operation after performing an initialization operation, so that the operator waits until the initialization operation is completed to check the operation of the robot mechanism. Further, when the initialization operation is performed, the state of the robot mechanism changes from the state of the time when the failure occurs, so that it is difficult for the operator to check the state of the time when the failure occurs without change.

Further, in recent years, in order to manage more tapes, a tape library device is provided in which a plurality of tape library devices are connected and a conveyance mechanism that moves tapes between the devices is installed. Conventionally, in the device in which a plurality of tape library devices are connected, when a door of any one of the tape library devices is opened, along with the power supply of the robot mechanism of the tape library device whose door is opened, the power supply of the conveyance mechanism is shut off and the conveyance mechanism is stopped by the interlock mechanism. Therefore, it is not possible to move storage media between the tape library devices whose doors are not opened.

A conventional technique is proposed in which the interlock is logically disabled by performing control using a circuit or the like in order to secure a continuity of the device operation.

Patent Document 1: Japanese Laid-open Patent Publication No. 2000-164480
Patent Document 2: Japanese Laid-open Patent Publication No. 2006-12912
Patent Document 3: Japanese Laid-open Patent Publication No. 2005-175125

However, in the conventional technique which logically disables the interlock by performing control, a mechanism including a circuit to control the interlock has to be additionally provided. Therefore, if the conventional technique is used, the manufacturing cost increases by newly manufacturing a control mechanism. Further, manufacturing and assembling of the control mechanism occur in addition to those of the interlock mechanism, so that the manufacturing process is complicated. Further, it is necessary to test a disabling mechanism to secure safety and a method of testing a logical disabling mechanism is complicated, so that the cost increases from this point.

SUMMARY

According to an aspect of an embodiment, a library device includes: a storage shelf that stores a plurality of storage media; a management unit that manages movement of the storage media stored in the storage shelf; a switch cam that moves in a predetermined direction when a pressing force from a pressing member is removed; a power supply shutoff unit that shuts off power supply to the management unit when the switch cam moves in the predetermined direction; and a movement prevention unit that moves on a moving path of the switch cam by receiving an instruction from an operator and prevents the switch cam from moving in the predetermined direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The library device and the control method of the library device disclosed by the present application are not limited by the embodiments described below.

First Embodiment

Figure 1:
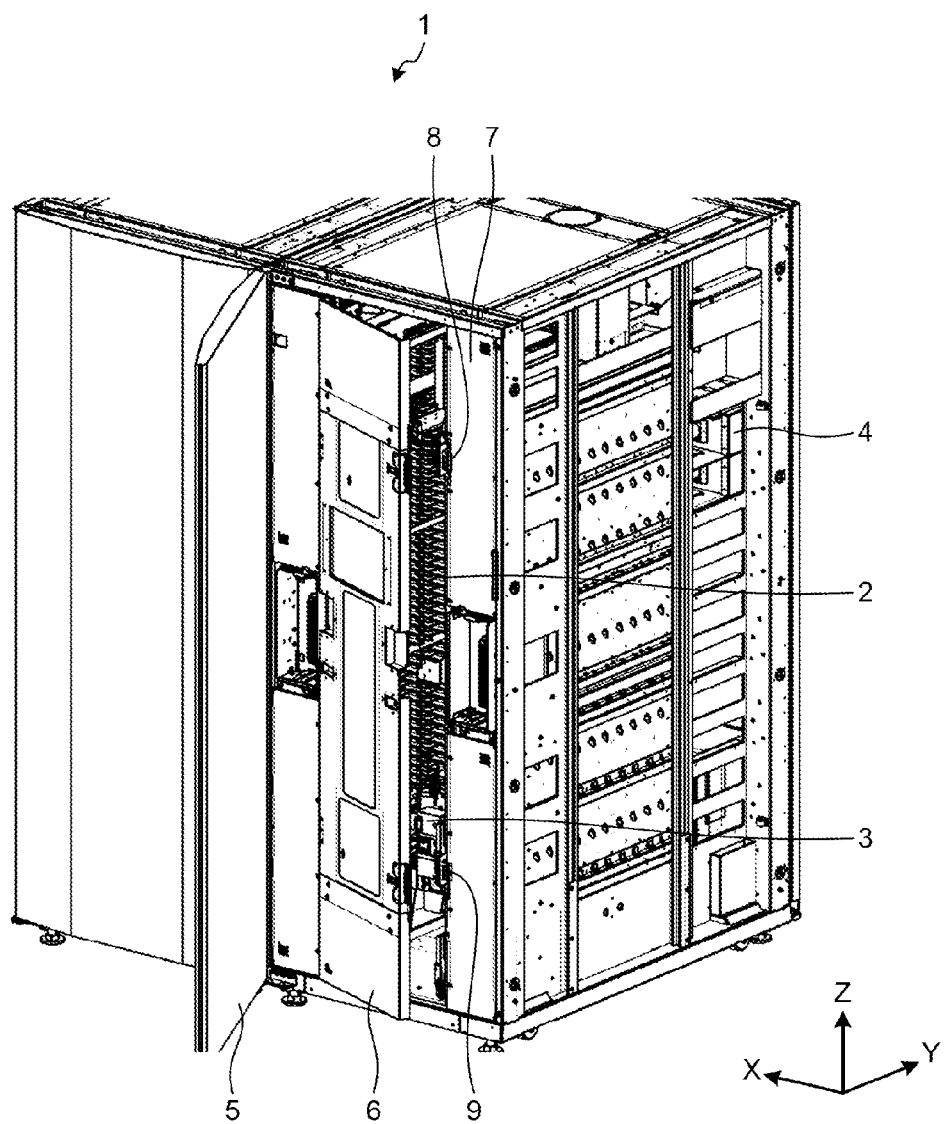
FIG. 1 is a perspective view of a tape library device in a connected state.

FIG. 1 is a perspective view of a tape library device in a connected state. In the tape library device 1 of FIG. 1, two tape library devices including a cell 2 which is a storage shelf called a cell that stores magnetic tapes are connected. Each tape library device has the same function, so that each tape library device connected to each other is described as the "tape library device 1" in the description below.

The tape library device 1 includes the cell 2. Further, the tape library device 1 includes a robot mechanism 3, a conveyance mechanism 4, an outer door 5, an inner door 6, a maintenance cover 7, a conveyance mechanism interlock mechanism 8, and a robot mechanism interlock mechanism 9.

The cell 2 is a storage shelf that stores magnetic tapes.

The robot mechanism 3 receives an instruction from an information processing device such as a server and puts a magnetic tape into and takes a magnetic tape out of the cell 2 in the same housing. Further, the robot mechanism 3 puts a magnetic tape into and takes a magnetic tape out of a tape drive device.

The conveyance mechanism 4 receives an instruction from an information processing device such as a server and conveys a magnetic tape between the housings.

The outer door 5 is the outermost door of the tape library device 1. When an operator such as a maintenance person accesses a mechanism in the tape library device 1, the operator first opens the outer door 5. However, it is difficult for the operator to access mechanisms in the tape library device 1 such as the cell 2 and the robot mechanism 3 by only opening the outer door 5.

The inner door 6 is a door inside the tape library device 1. The operator can access mechanisms in the tape library device 1 such as the cell 2 and the robot mechanism 3 by opening the inner door 6. A general user does not open the inner door 6. Normally, a maintenance person or the like opens the inner door 6 to perform maintenance or the like. In the description below, a state in which the inner door 6 is closed may be referred to as "when the inner door is closed" and a state in which the inner door 6 is open may be referred to as "when the inner door is open".

The maintenance cover 7 is a cover that prevents general users from touching internal mechanisms such as the interlock mechanisms. The operator performs maintenance of the tape library device 1 by removing the maintenance cover 7.

The conveyance mechanism interlock mechanism 8 is a mechanism that shuts down the power supply to the conveyance mechanism 4 to stop the conveyance mechanism 4 for the safety of the operator when the inner door 6 is opened.

The robot mechanism interlock mechanism 9 is a mechanism that shuts down the power supply to the robot mechanism 3 to stop the robot mechanism 3 for the safety of the operator when the inner door 6 is opened.

The conveyance mechanism interlock mechanism 8 and the robot mechanism interlock mechanism 9 have the same configuration. Therefore, in the description below, the interlock mechanism according to the present embodiment will be described by using the conveyance mechanism interlock mechanism 8 as an example. In the description below, the conveyance mechanism interlock mechanism 8 may be simply referred to as the "interlock mechanism 8". In the description below, in a state in which the inner door 6 is closed, a direction from the inner door 6 to the cell 2, that is, Y direction, may be referred to as "rear" and a direction from the cell 2 to the inner door 6, that is, a direction opposite to the Y direction, may be referred to as a "reverse Y direction" or "front". A direction from the installation surface to the ceiling of the tape library device 1, that is, Z direction, may be referred to as "above or up" and a direction from the ceiling to the installation surface of the tape library device 1, that is, a direction opposite to the Z direction, may be referred to as a "reverse Z direction" or "below or low". Further, in a state in which the inner door 6 is closed, a left direction with respect to the tape library device 1, that is, X direction, may be referred to as "left", and a direction opposite to the X direction may be referred to as a "reverse X direction" or "right".

Figure 2:
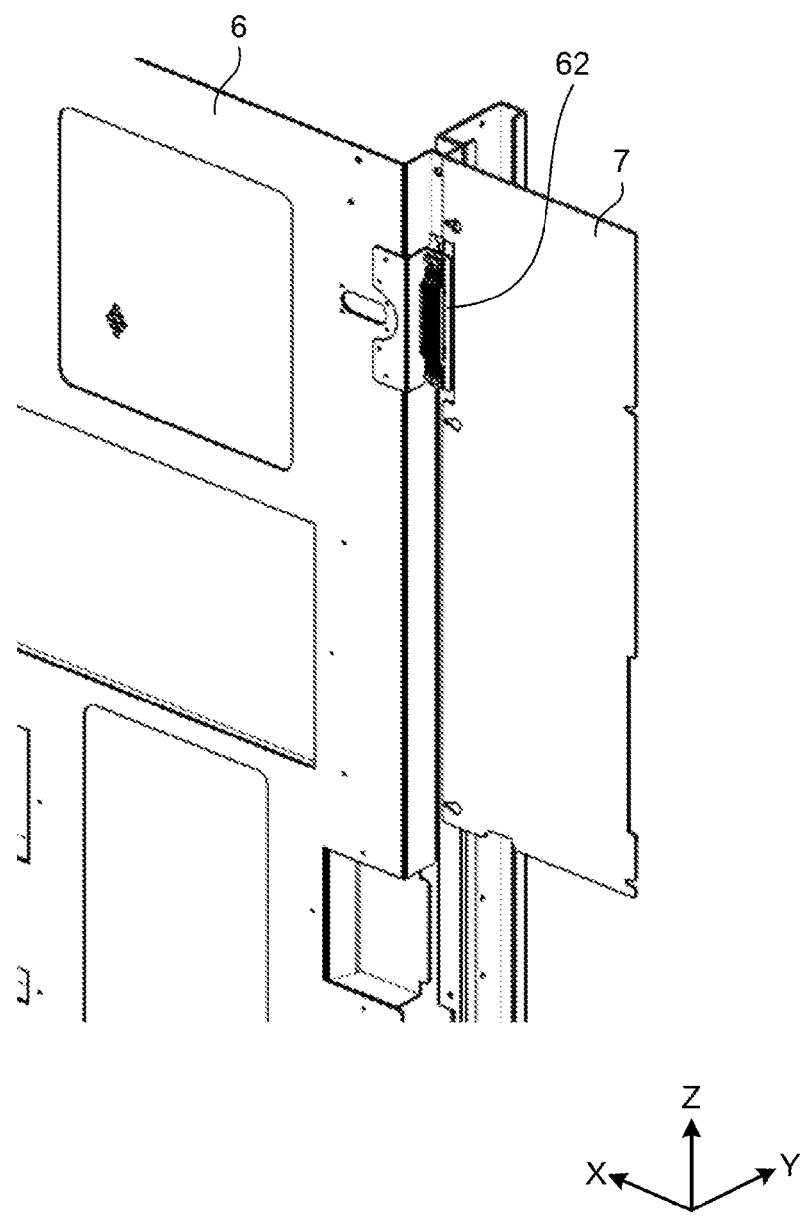
FIG. 2 is an enlarged view of a conveyance mechanism interlock portion when an inner door is closed according to a first embodiment.

FIG. 2 is an enlarged view of a conveyance mechanism interlock portion when the inner door is closed according to the first embodiment. The inner door 6 is provided with an inner door claw connection member 62. The inner door claw connection member 62 protrudes toward the maintenance cover 7. The maintenance cover 7 can be removed even when the inner door 6 is closed. The operator can operates mechanisms installed behind the maintenance cover 7 of the interlock mechanism 8, that is to say, mechanisms installed on an accessible front surface in the rear of the maintenance cover 7 by removing the maintenance cover 7 with the inner door 6 closed without causing the interlock mechanism 8 to operate.

Figure 3:
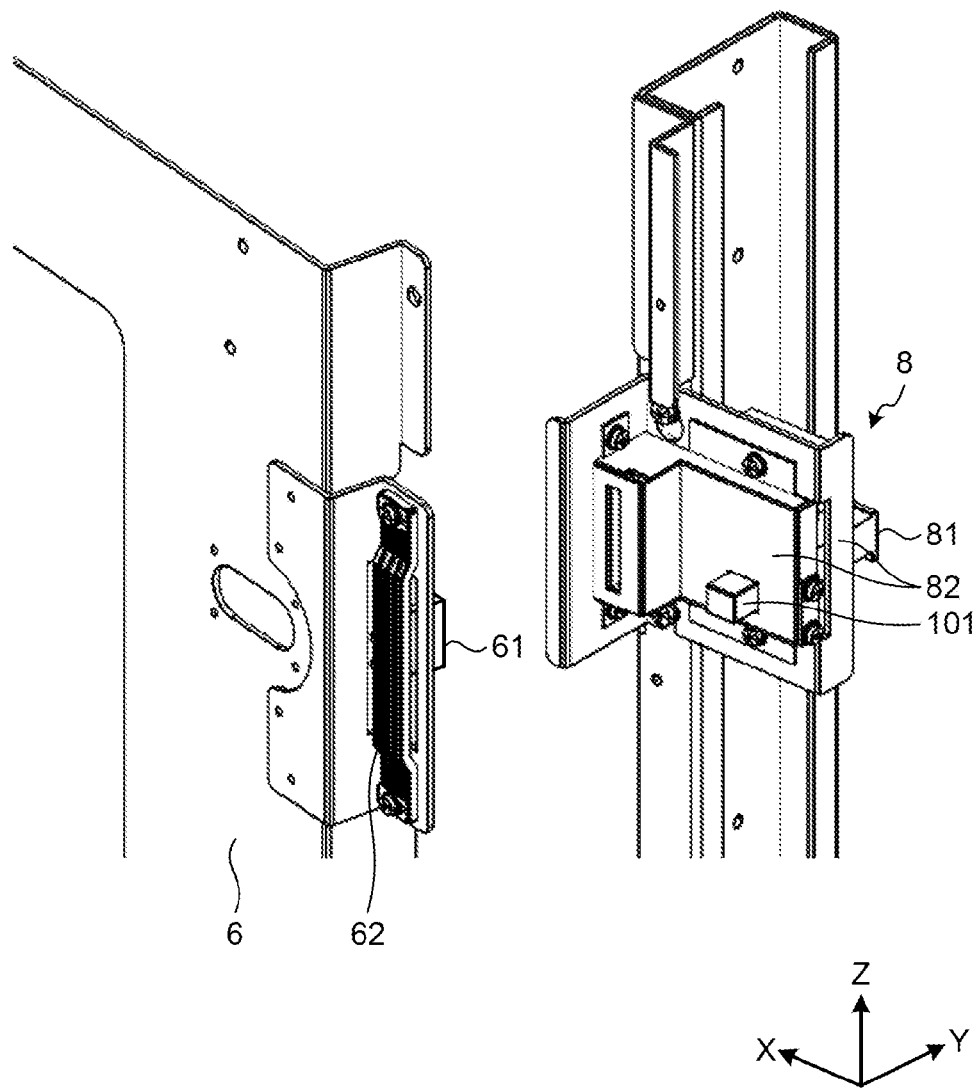
FIG. 3 is an external view of an interlock mechanism when the inner door is open according to the first embodiment.

FIG. 3 is an external view of the interlock mechanism when the inner door is open according to the first embodiment. FIG. 3 is a state in which the maintenance cover 7 is removed. A plate-like inner door claw 61 is provided in the rear of the inner door claw connection member 62 of the inner door 6.

When the maintenance cover 7 is removed in a state of FIG. 2, the interlock mechanism 8 in a state of FIG. 3 appears. An interlock cover 82 and a disabling button 101 are arranged on an accessible front surface of the interlock mechanism 8.

The interlock cover 82 is a cover that protects the inside of the interlock mechanism 8 from the front side in FIG. 3. A slit is provided in the interlock cover 82 in a position facing the inner door claw 61 in the X direction. When the inner door 6 is closed, the inner door claw 61 is inserted into the inside through the slit of the interlock cover 82.

The disabling button 101 is a button that disables the interlock. The details of the disabling button 101 will be described later.

The rear of the interlock mechanism 8 is covered by an interlock base 81. The interlock base 81 is a cover that protects the inside of the interlock mechanism 8 from the rear.

Figure 4:
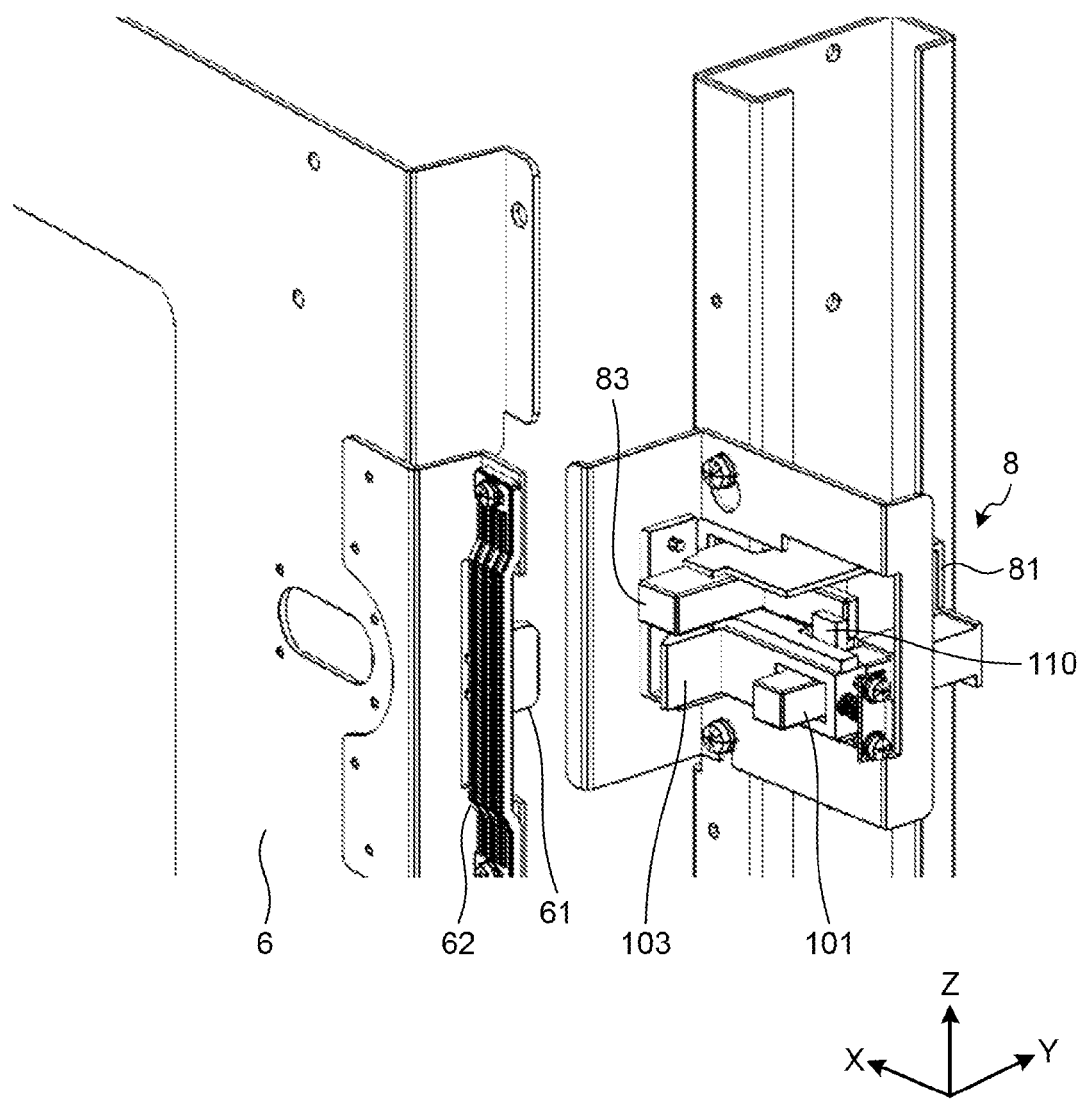
FIG. 4 is a perspective view for explaining an internal structure of the interlock mechanism according to the first embodiment.

FIG. 4 is a perspective view for explaining an internal structure of the interlock mechanism according to the first embodiment. FIG. 4 illustrates a state in which the interlock cover 82 is removed from the state of FIG. 3.

As illustrated in FIG. 4, the interlock mechanism 8 includes an interlock switch cam 83, the disabling button 101, and a slider 103.

The interlock switch cam 83 is pushed by the inner door claw 61 and pushed in the Y direction. When the interlock switch cam 83 moves in the Y direction, the power supply to the conveyance mechanism 4 is shut off.

The slider 103 is a mechanism that releases a pressed state of the disabling button 101 when the inner door 6 is closed in a state in which the disabling button 101 is pressed.

The disabling button 101 has a disabling lever 110 that protrudes in the Z direction.

The interlock switch cam 83, the disabling button 101, and the slider 103 are stored in the interlock base 81.

Figure 5:
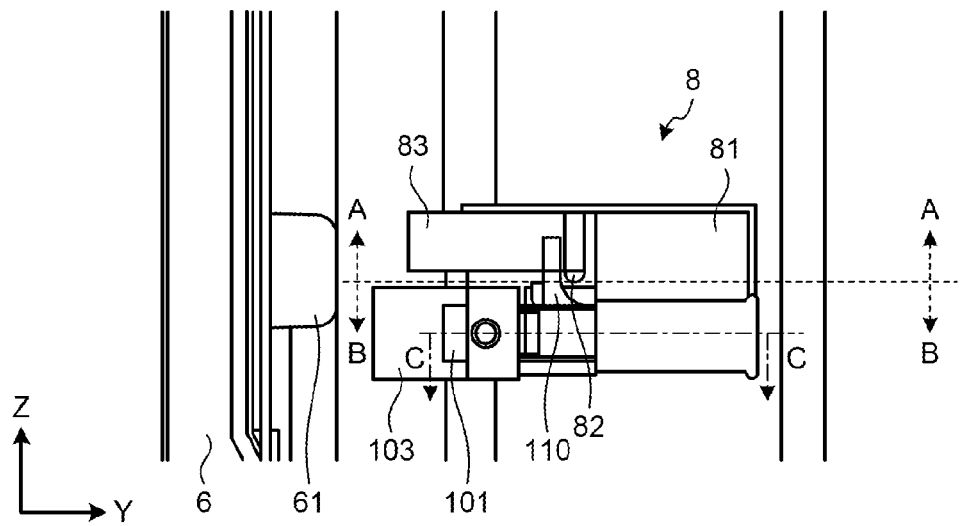
FIG. 5 is a side view of the interlock mechanism according to the first embodiment.

FIG. 5 is a side view of the interlock mechanism according to the first embodiment. A portion of the interlock mechanism 8 on the A-A side illustrated in FIG. 5 is referred to as an interlock portion. A portion of the interlock mechanism 8 on the B-B side illustrated in FIG. 5 is referred to as a disabling mechanism. Here, for ease of understanding, the interlock portion and the disabling mechanism are separately described and thereafter an operation in a case in which the interlock portion and the disabling mechanism are combined will be described.

Figure 6:
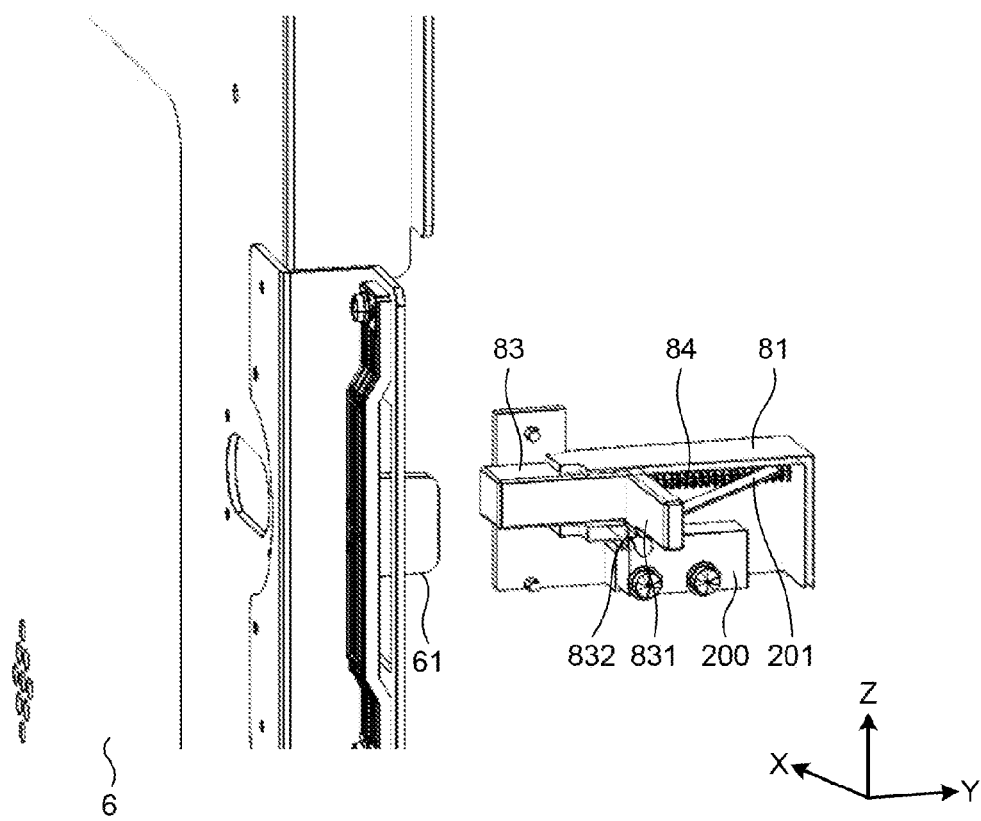
FIG. 6 is a transparent perspective view of an interlock portion when the inner door is open according to the first embodiment.

First, the structure and the operation of the interlock portion will be described with reference to FIGS. 6 to 8. FIG. 6 is a transparent perspective view of the interlock portion when the inner door is open according to the first embodiment. As illustrated in FIG. 6, a cam spring 84 is arranged between the interlock switch cam 83 and a rear wall of the interlock base 81. The interlock switch cam 83 is pressed by the cam spring 84 in the reverse Y direction, that is, in a direction toward the front. When the interlock switch cam 83 is pressed by the inner door claw 61, the interlock switch cam 83 is pushed in the Y direction. On the other hand, when the inner door claw 61 moves in a direction away from the interlock switch cam 83, the interlock switch cam 83 is pushed out in the reverse Y direction by the cam spring 84.

A disabling lever receiving portion 831 protrudes from the interlock switch cam 83 in the reverse X direction. The disabling lever receiving portion 831 extends to above the disabling button 101. Further, the interlock switch cam 83 is provided with a switch pressing portion 832 protruding in the reverse Z direction, that is to say, protruding downward.

An interlock switch 200 is arranged in the rear of the interlock switch cam 83 when the inner door is open.

In the interlock switch 200, a switch lever 201 is arranged on a pedestal. A force is applied to the switch lever 201 in a direction in which the switch lever 201 is raised by a spring with the front of the pedestal as a fulcrum.

The pedestal of the interlock switch 200 is fixed to the interlock base 81. A switch mechanism is stored inside the pedestal of the interlock switch 200.

When the interlock switch cam 83 is pressed by the cam spring 84 and moves in the reverse Y direction, that is, in a direction toward the front, and the switch pressing portion 832 comes off the switch lever 201, the switch lever 201 is rotated and raised by the spring with the front of the pedestal as a fulcrum. FIG. 6 illustrates a state in which the switch lever 201 is raised. In a state in which the switch lever 201 comes off the pedestal of the interlock switch, the interlock switch 200 is off. Thereby, the power supply to the conveyance mechanism 4 is shut off.

Figure 7:
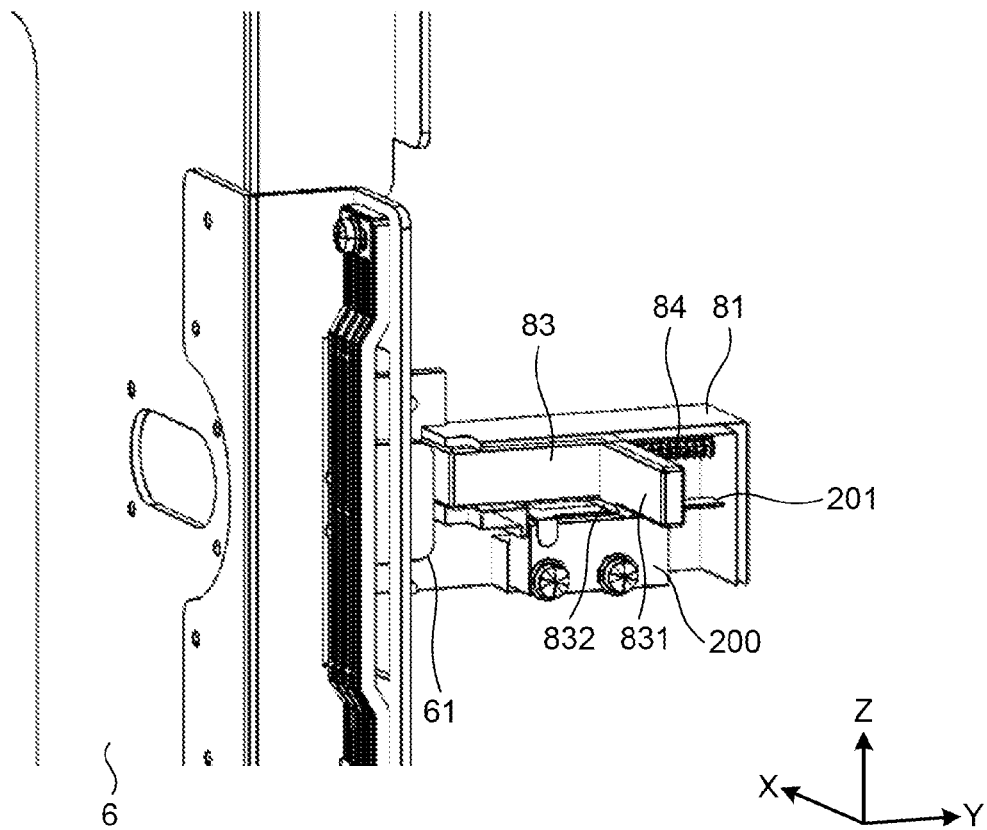
FIG. 7 is a transparent perspective view of the interlock portion when the inner door is closed according to the first embodiment.

FIG. 7 is a transparent perspective view of the interlock portion when the inner door is closed according to the first embodiment. FIG. 7 illustrates a state in which the interlock switch cam 83 is pressed by the inner door claw 61 and pushed in the Y direction from the state of FIG. 6.

When the interlock switch cam 83 is pressed by the inner door claw 61, the cam spring 84 contracts and the interlock switch cam 83 moves in the Y direction. Accordingly, the disabling lever receiving portion 831 of the interlock switch cam 83 that protrudes in the reverse X direction and the switch pressing portion 832 that protrudes in the reverse Z direction move in the Y direction, respectively.

When the switch pressing portion 832 moves in the Y direction, the switch pressing portion 832 runs on the switch lever 201 of the interlock switch 200 and presses the switch lever 201 against the pedestal of the interlock switch 200. When the switch lever 201 is pressed against the pedestal of the interlock switch, the interlock switch 200 turns on. Thereby, the power is supplied to the conveyance mechanism 4.

Figure 8:
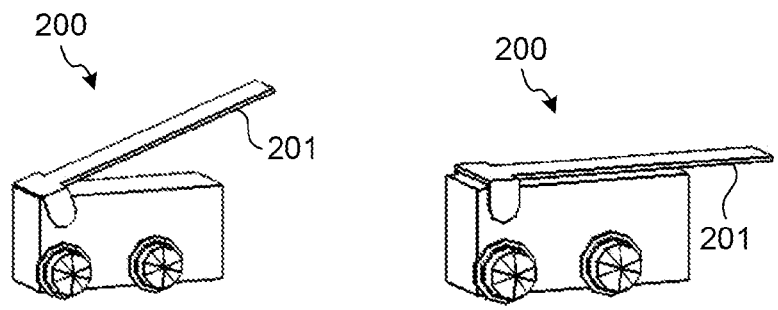
FIG. 8 is a diagram for explaining an operation of an interlock switch according to the first embodiment.

FIG. 8 is a diagram for explaining an operation of the interlock switch according to the first embodiment. The left figure in FIG. 8 illustrates a state in which the interlock switch 200 is off. The right figure in FIG. 8 illustrates a state in which the interlock switch 200 is on.

When the inner door claw 61 comes off and the interlock switch cam 83 moves in the reverse Y direction, the switch lever 201 rises and the interlock switch 200 goes into a state as illustrated by the left figure in FIG. 8. In this state, the interlock switch 200 turns off and the power supply to the conveyance mechanism 4 is shut off.

When the interlock switch cam 83 is pushed rearward by the inner door claw 61, the switch lever 201 is pushed down and the interlock switch 200 goes into a state as illustrated by the right figure in FIG. 8. In this state, the interlock switch 200 turns on and the power is supplied to the conveyance mechanism 4.

Figure 9:
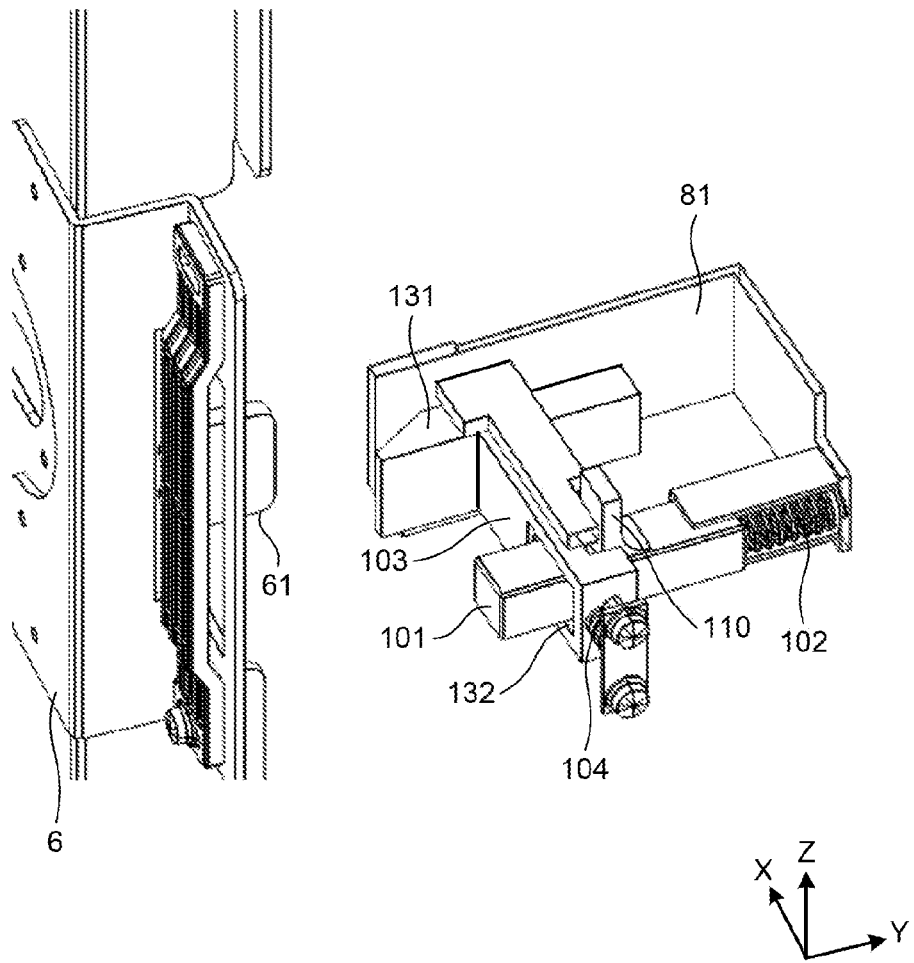
FIG. 9 is a transparent perspective view of a disabling mechanism when the inner door is open according to the first embodiment.

Next, the structure and the operation of the disabling mechanism will be described with reference to FIGS. 9 to 16. As described above, the disabling mechanism is the portion of the interlock mechanism 8 on the B-B side illustrated in FIG. 5. FIG. 9 is a transparent perspective view of the disabling mechanism when the inner door is open according to the first embodiment.

As illustrated in FIG. 9, the disabling mechanism includes the disabling button 101, a button spring 102, the slider 103, and a slider spring 104.

Figure 10:
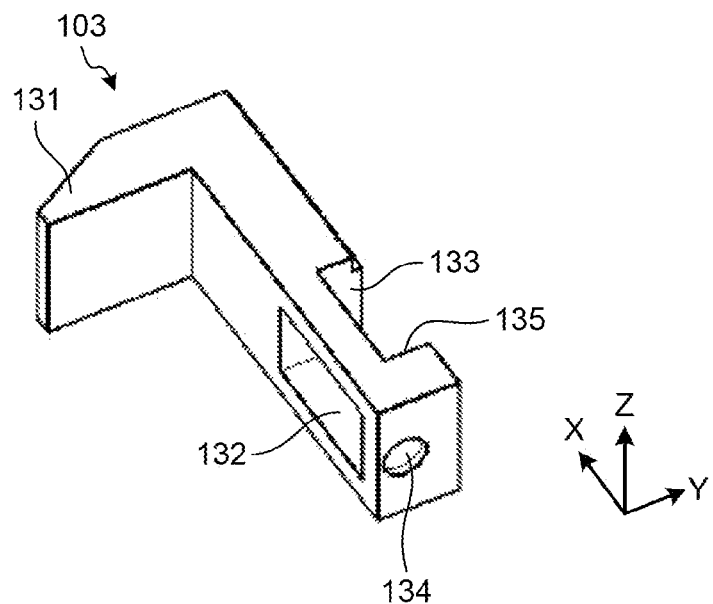
FIG. 10 is a perspective view of a slider according to the first embodiment.

FIG. 10 is a perspective view of the slider according to the first embodiment. The slider 103 includes an inner door claw receiving portion 131, a button insertion hole 132, a movable claw receiving portion 133, a spring receiving portion 134, and a button stopper 135. However, in FIG. 10, the button stopper 135 is hidden by a main body of the slider 103 and is not seen.

The description will be continued by returning to FIG. 9. The slider spring 104 is arranged between the spring receiving portion 134 of the slider 103 and the interlock base 81. The slider 103 is pressed in the X direction by the slider spring 104.

The inner door claw receiving portion 131 is arranged at a position which the inner door claw 61 enters when the inner door is open. The inner door claw receiving portion 131 protrudes in the reverse Y direction, that is to say, in a direction facing the inner door claw 61. Further, a wall of the inner door claw receiving portion 131 facing the reverse Y direction has a slope that goes in the reverse X direction as it goes in the Y direction. When the inner door claw 61 is inserted, the inner door claw 61 comes into contact with a tip portion of the slope of the wall of the inner door claw receiving portion 131 facing the reverse Y direction. When the inner door claw 61 is further inserted, the slope of the inner door claw receiving portion 131 is pushed in the reverse X direction by the inner door claw 61 and the slider 103 moves in the reverse X direction. On the other hand, when the inner door claw 61 moves in a direction of coming off from the state in which the inner door claw 61 is completely inserted, that is to say, in the reverse Y direction, the slider 103 moves in the X direction by receiving a pressure force in the X direction from the slider spring 104 while the inner door claw receiving portion 131 is in contact with the slope.

The button insertion hole 132 is a through hole that opens in the Y direction. The XZ cross-section of the button insertion hole 132 is larger than the XZ cross-section of the disabling button 101. As illustrated in FIG. 9, the disabling button 101 is inserted into the button insertion hole 132. In particular, the XZ cross-section of the button insertion hole 132 is formed so that the XZ cross-section has a margin in the X direction in a state in which the disabling button 101 is inserted. Specifically, the opening of the button insertion hole 132 is manufactured to be longer than a length in the X direction by which a movable claw 112 protrudes in the X direction in a state in which the button stopper 135 is in contact with a side surface of the disabling button 101 as described below.

The movable claw receiving portion 133 has a wall surface in parallel with the XZ plane facing the Y direction. The movable claw receiving portion 133 prevents the movable claw 112 of the disabling button 101 from moving in the reverse Y direction by the wall surface in parallel with the XZ plane. Further, the movable claw receiving portion 133 has a wall surface in parallel with the YZ plane facing the reverse X direction. The movable claw receiving portion 133 pushes the movable claw 112 into the inside of the disabling button 101 by the wall surface in parallel with the YZ plane.

The button stopper 135 protrudes in the X direction from the right inner wall of the button insertion hole 132. The button stopper 135 has a wall surface in parallel with the XY plane facing the Y direction. Further, the button stopper 135 has a slope that goes in the reverse X direction as the wall surface facing the reverse Y direction goes in the reverse Y direction.

Figure 11:
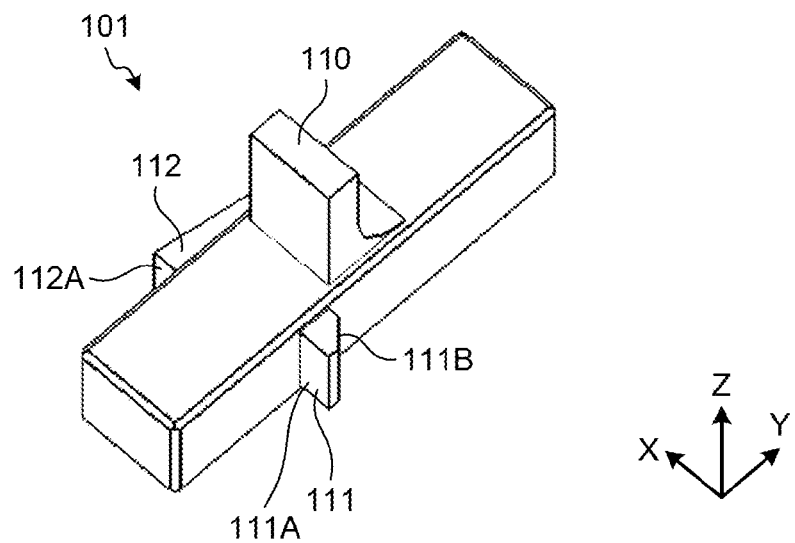
FIG. 11 is a perspective view of a disabling button when the inner door is open according to the first embodiment.

FIG. 11 is a perspective view of the disabling button when the inner door is open according to the first embodiment. The disabling button 101 includes the disabling lever 110, a stopper 111, and the movable claw 112.

The disabling lever 110 protrudes in the Z direction on the disabling button 101 and extends to a height that intersects a moving path of the disabling lever receiving portion 831.

The stopper 111 protrudes from the disabling button 101 in the reverse X direction. The stopper 111 has a wall surface 111A in parallel with the XZ plane facing the reverse Y direction. Further, the stopper 111 has a slope that goes in the reverse X direction as a wall surface 111B facing the Y direction goes in the reverse Y direction. In other words, the stopper 111 and the button stopper 135 have surfaces inclined in the same direction when the stopper 111 and the button stopper 135 face each other.

The movable claw 112 is movable in the X direction and when the movable claw 112 is pushed by the movable claw receiving portion 133 of the slider 103 in the reverse X direction, the movable claw 112 is stored in the disabling button 101. When the pressure force from the movable claw receiving portion 133 disappears, the movable claw 112 protrudes to the outside of the disabling button 101. The movable claw 112 has a wall surface 112A in parallel with the XZ plane facing the reverse Y direction in a state in which the movable claw 112 protrudes from the disabling button 101.

The wall surface 112A in the state in which the movable claw 112 protrudes from the disabling button 101 is located in front of the wall surface 111A of the stopper 111 facing the reverse Y direction. In other words, the wall surface 112A in the state in which the movable claw 112 protrudes from the disabling button 101 is located at a position closer to a pressing surface of the disabling button 101 than the wall surface 111A of the stopper 111 facing the reverse Y direction.

The description will be continued by returning to FIG. 9. The disabling button 101 is inserted into the button insertion hole 132 of the slider 103. The button spring 102 is arranged between the disabling button 101 and an inner wall of the interlock base 81 facing the Y direction.

When the disabling button 101 is pressed by an operator, the button spring 102 contracts and the disabling button 101 moves in the Y direction. When the pressure force to the disabling button 101 from the operator disappears, the disabling button 101 moves in the reverse Y direction by a pressure force from the button spring 102.

Figure 12:
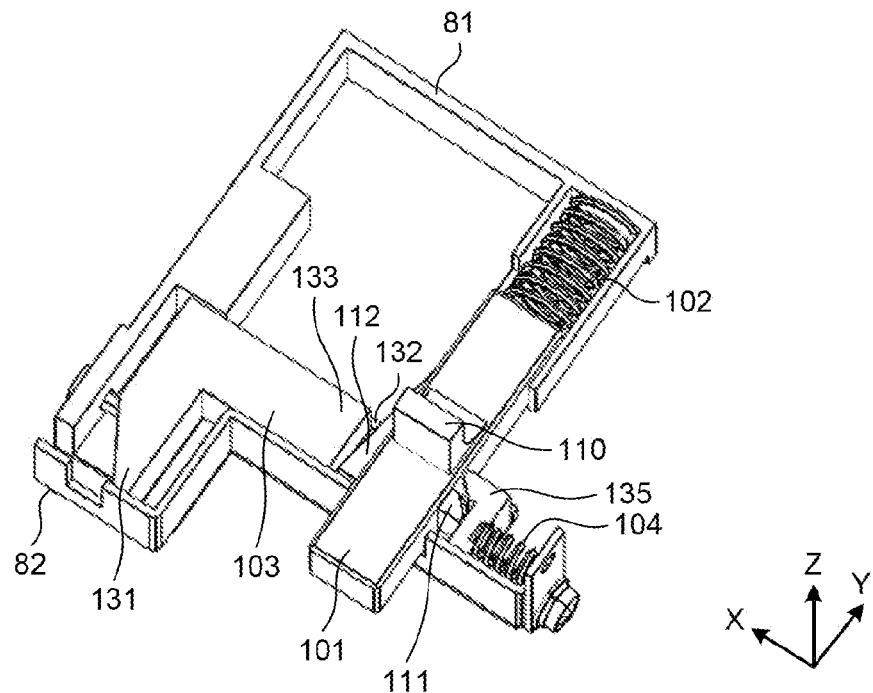
FIG. 12 is a transparent perspective view of the disabling mechanism before the disabling button is pressed when the inner door is open according to the first embodiment.

FIG. 12 is a transparent perspective view of the disabling mechanism before the disabling button is pressed when the inner door is open according to the first embodiment.

When the inner door is opened, the slider 103 receives a pressure force in the X direction from the slider spring 104 and moves in the X direction. The disabling button 101 receives the pressure force from the button spring 102 and is pushed out in the reverse Y direction.

In this case, the slider 103 is prevented from moving in the X direction by the button stopper 135 coming into contact with the side surface of the disabling button 101 facing the reverse X direction. The movable claw 112 and the stopper 111 of the disabling button 101 are stored in the button insertion hole 132 of the slider 103.

Before the disabling button 101 is pressed, the stopper 111 is located in front of the button stopper 135. In this state, the slope of the stopper 111 facing the Y direction and the slope of the button stopper 135 facing the reverse Y direction face each other.

The slider 103 moves in the reverse X direction, so that the pressure force to the movable claw 112 by the movable claw receiving portion 133 is released. Therefore, the movable claw receiving portion 133 protrudes to the outside of the disabling button 101 in the button insertion hole 132. The disabling button 101 is prevented from moving in the reverse Y direction by the movable claw 112 coming into contact with the inner wall of the interlock cover 82 facing the Y direction.

Figure 13:
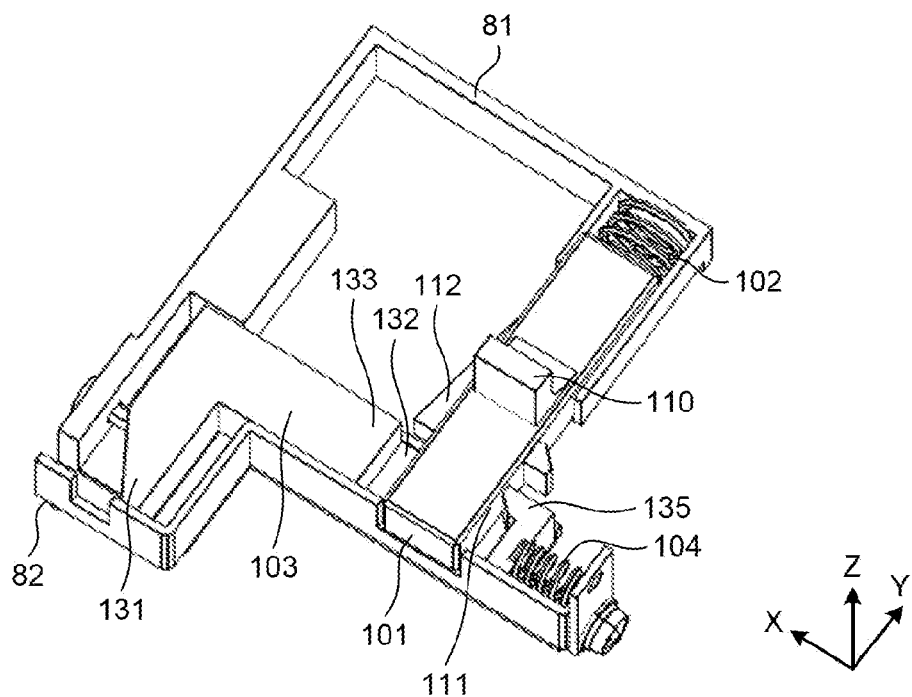
FIG. 13 is a transparent perspective view of the disabling mechanism after the disabling button is pressed when the inner door is open according to the first embodiment.

FIG. 13 is a transparent perspective view of the disabling mechanism after the disabling button is pressed when the inner door is open according to the first embodiment. FIG. 13 illustrates a state in which the disabling button 101 is pressed by the operator in the state of FIG. 12.

When the disabling button 101 is pressed in the state of FIG. 12, the disabling button 101 moves in the Y direction while compressing the button spring 102.

When the disabling button 101 is pressed, the slope of the stopper 111 facing the Y direction and the slope of the button stopper 135 facing the reverse Y direction are contact with each other and the stopper 111 pushes the button stopper 135 in the reverse X direction. The slider 103 moves in the reverse X direction by a pressure force in the reverse X direction from the stopper 111 to the button stopper 135. Thereafter, the stopper 111 moves to a position at which the slope of the stopper 111 facing the Y direction and the slope of the button stopper 135 facing the reverse Y direction are not contact with each other and the stopper 111 passes over the button stopper 135 and locates in the rear of the button stopper 135. At this time, the pressure force in the reverse X direction to the button stopper 135 disappears, so that the slider 103 moves in the X direction by the pressure from the slider spring 104. Then, the slider 103 returns to the original position at which the button stopper 135 is in contact with the side surface of the disabling button 101 facing the reverse X direction.

When the operator stops pressing the disabling button 101 and the pressure force from the operator disappears, the disabling button 101 moves in the reverse Y direction by receiving the pressure force from the button spring 102.

At this time, as illustrated in FIG. 13, the movable claw 112 protrudes to the outside of the disabling button 101. However, the button insertion hole 132 of the slider 103 has an opening longer than the length in the X direction by which the movable claw 112 protrudes in the X direction in the state in which the button stopper 135 is in contact with the side surface of the disabling button 101. Therefore, the movable claw 112 is inserted into the button insertion hole 132 without coming into contact with the slider 103 in the state in which the movable claw 112 protrudes to the outside of the disabling button 101.

At this time, the button stopper 135 is located at a position at which the button stopper 135 is in contact with the side surface of the disabling button 101. Therefore, when the disabling button 101 moves in the reverse Y direction, the wall surface of the stopper 111 facing the reverse Y direction and the wall surface of the button stopper 135 facing the Y direction come into contact with each other. Thereby, the disabling button 101 is prevented from moving in the reverse Y direction. Thus, the disabling lever 110 protruding over the disabling button 101 stops at the position at which the stopper 111 and the button stopper 135 come into contact with each other.

Figure 14:
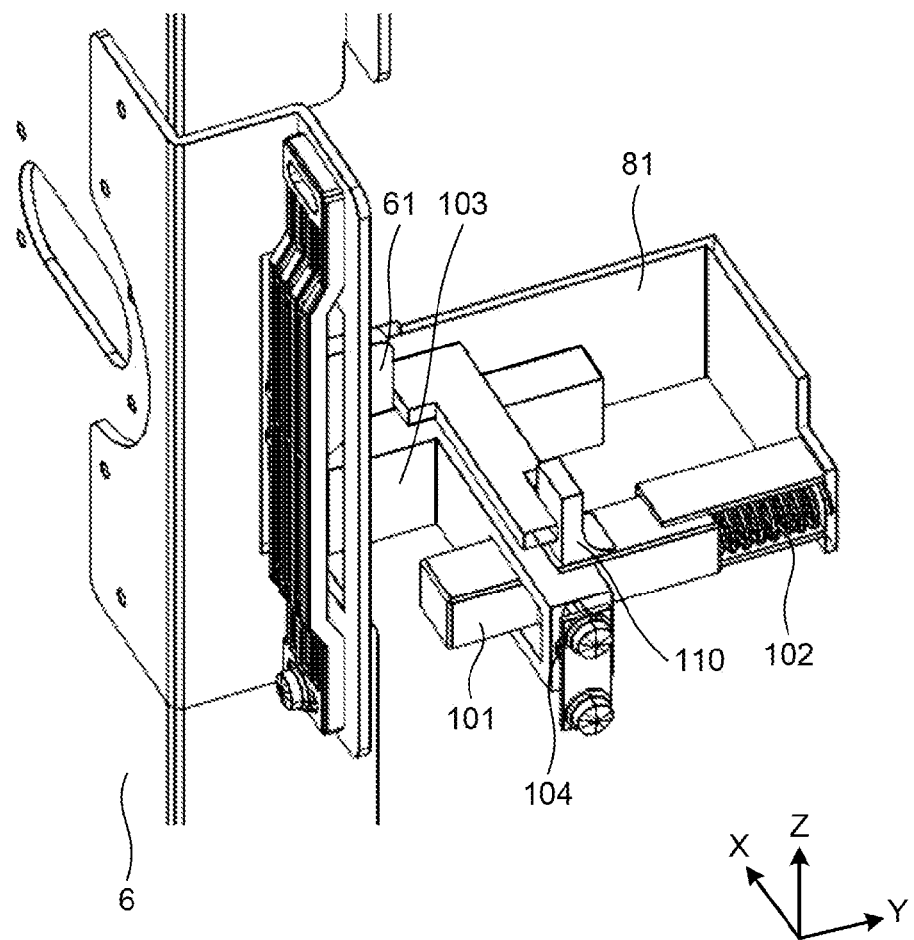
FIG. 14 is a transparent perspective view of the disabling mechanism when the inner door is closed according to the first embodiment.

FIG. 14 is a transparent perspective view of the disabling mechanism when the inner door is closed according to the first embodiment. When the inner door 6 is closed, the inner door claw 61 is inserted. Then, the inner door claw 61 moves in the Y direction while being in contact with the slope of the inner door claw receiving portion 131, so that the inner door claw 61 presses the inner door claw receiving portion 131 in the reverse X direction. Thereby, the slider 103 moves in the reverse X direction while compressing the slider spring 104. When the slider 103 moves in the reverse X direction, the contact between the stopper 111 and the button stopper 135 is released and the disabling button 101 moves in the reverse Y direction by receiving the pressure force of the button spring 102. Then, the stopper 111 comes into contact with the inner wall of the interlock cover 82 facing the Y direction and the disabling button 101 stops moving in the reverse Y direction.

Figure 15A:
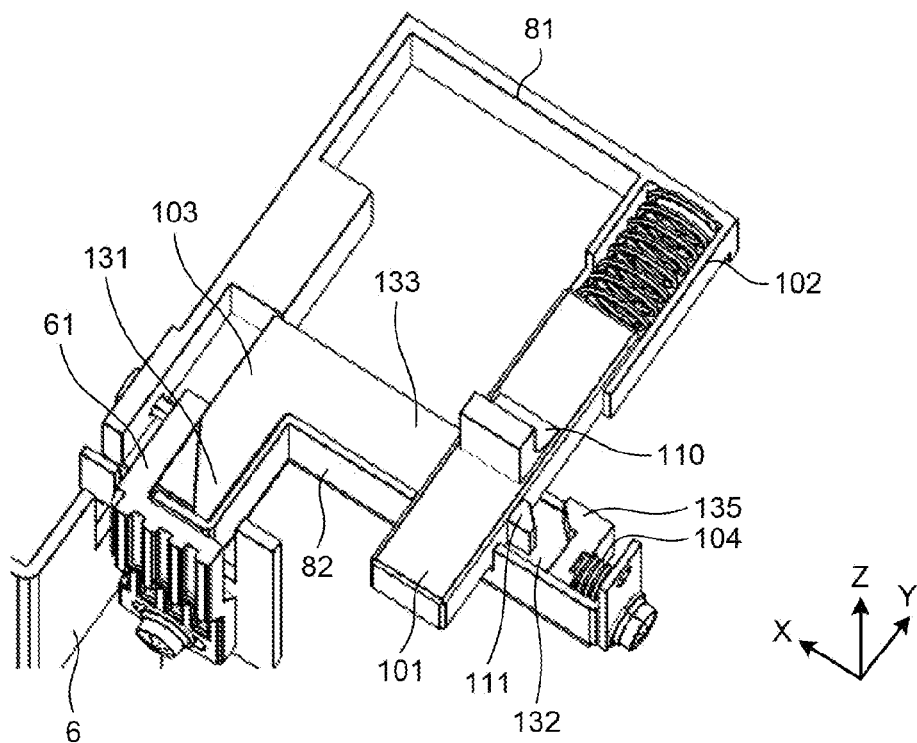
FIG. 15A is a transparent perspective view of the disabling mechanism before the disabling button is pressed when the inner door is closed according to the first embodiment.
Figure 15B:
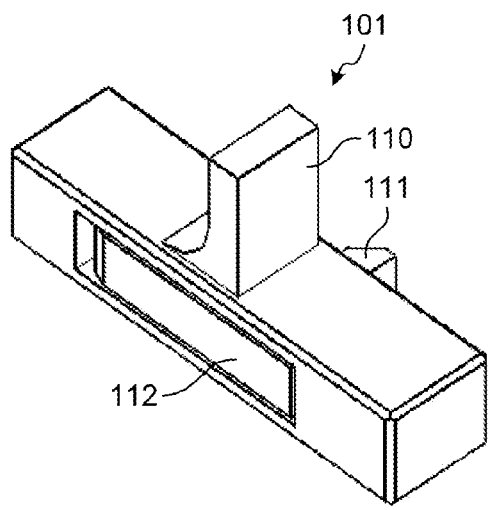
FIG. 15B is a diagram illustrating a state of the disabling button in a state of FIG. 15A.

FIG. 15A is a transparent perspective view of the disabling mechanism before the disabling button is pressed when the inner door is closed according to the first embodiment. When the inner door is closed, the slider 103 moves in the reverse X direction by a length corresponding to the thickness of the inner door claw 61 in the X direction. At this time, the movable claw receiving portion 133 presses the movable claw 112 in the reverse X direction. Thereby, as illustrated in FIG. 15B, the movable claw 112 is stored inside the disabling button 101. FIG. 15B is a diagram illustrating a state of the disabling button in a state of FIG. 15A.

When the movable claw 112 is stored inside the disabling button 101 as illustrated in FIG. 15B, the disabling button 101 is not prevented from moving in the Y direction by the movable claw 112 coming into contact with the slider 103.

At this time, the stopper 111 is stored in the button insertion hole 132 of the slider 103. In other words, the stopper 111 is located in front of the button stopper 135. In this state, the button stopper 135 is located at a position where the stopper 111 does not hit the button stopper 135 even when the stopper 111 moves in the Y direction. In other words, in a state in which the inner door 6 is closed, the distance between the side surface of the disabling button 101 facing the reverse Y direction and the button stopper 135 is greater than the length in the reverse X direction by which the stopper 111 protrudes. More specifically, in the present embodiment, in a state in which the movable claw receiving portion 133 is in contact with a wall of the disabling button 101, it is manufactured so that the distance between the side surface of the disabling button 101 facing the reverse Y direction and the button stopper 135 is longer than the length in the reverse X direction by which the stopper 111 protrudes.

Here, in the present embodiment, the movable claw receiving portion 133 pushes the movable claw 112 into the disabling button 101 so that the movable claw 112 is completely stored inside the disabling button 101. However, the movable claw receiving portion 133 may push the movable claw 112 halfway into the disabling button 101. In this case, the movable claw 112 protrudes a little from the disabling button 101, so that the movable claw 112 comes into contact with the inner wall of the interlock cover 82 facing the Y direction earlier than the stopper 111 and stops moving of the disabling button 101 in the reverse Y direction.

Figure 16:
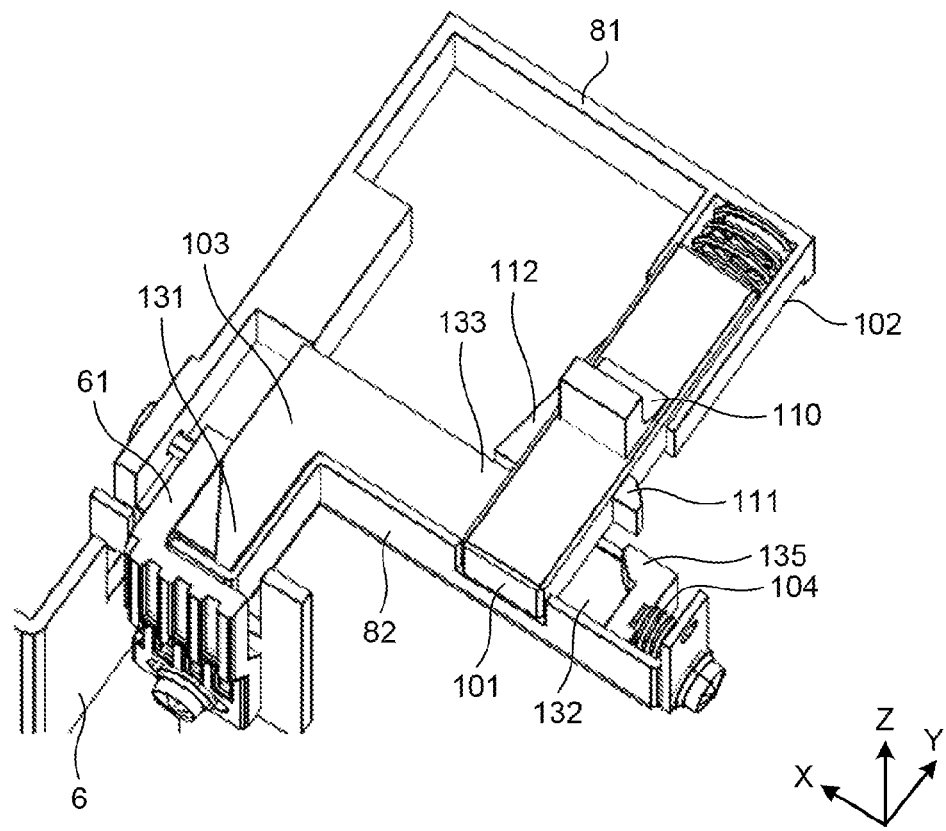
FIG. 16 is a transparent perspective view of the disabling mechanism after the disabling button is pressed when the inner door is closed according to the first embodiment.

FIG. 16 is a transparent perspective view of the disabling mechanism after the disabling button is pressed when the inner door is closed according to the first embodiment. FIG. 16 illustrates a state in which the disabling button 101 is pressed by the operator in the state of FIG. 15.

When the disabling button 101 is pressed in the state of FIG. 15, the disabling button 101 moves in the Y direction while compressing the button spring 102.

At this time, the movable claw 112 is pushed into the disabling button 101 by the movable claw receiving portion 133, so that the movable claw 112 does not prevent the disabling button 101 from moving in the Y direction.

The button stopper 135 is located in a position where the stopper 111 does not hit the button stopper 135 even when the stopper 111 moves in the Y direction, so that even when the disabling button 101 moves in the Y direction, the stopper 111 does not come into contact with the button stopper 135 and moves to a position in the rear of the button stopper 135.

When the disabling button 101 moves in the Y direction and the movable claw 112 and the movable claw receiving portion 133 are not in contact with each other, the pressure force to the movable claw 112 disappears, so that the movable claw 112 protrudes to the outside of the disabling button 101.

When the operator stops pressing the disabling button and the pressure force from the operator disappears, the disabling button 101 moves in the reverse Y direction by receiving the pressure force from the button spring 102.

At this time, as illustrated in FIG. 16, the movable claw 112 protrudes to the outside of the disabling button 101. The slider 103 is pushed by the inner door claw 61 and moves in the reverse X direction and the wall surface of the movable claw receiving portion 133 facing the Y direction is located in a position facing the wall surface of the movable claw 112 facing the reverse Y direction. Therefore, when the disabling button 101 moves in the reverse Y direction, the wall surface of the movable claw receiving portion 133 facing the Y direction comes into contact with the wall surface of the movable claw 112 facing the reverse Y direction and stops moving of the disabling button 101 in the reverse Y direction.

Figure 17A:
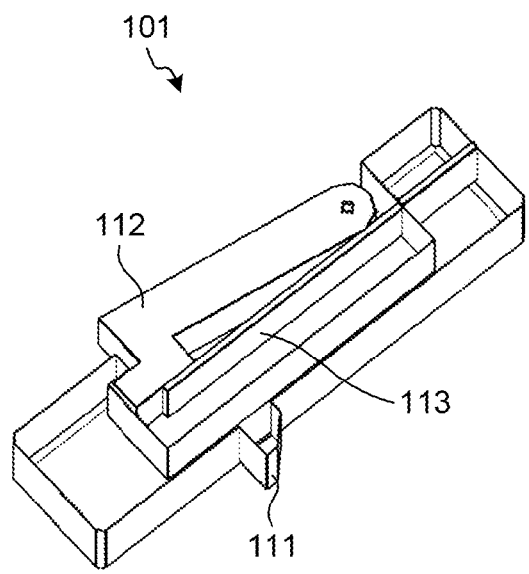
FIG. 17A is a cross-sectional view of the disabling button in a movable claw protruding state according to the first embodiment.
Figure 17B:
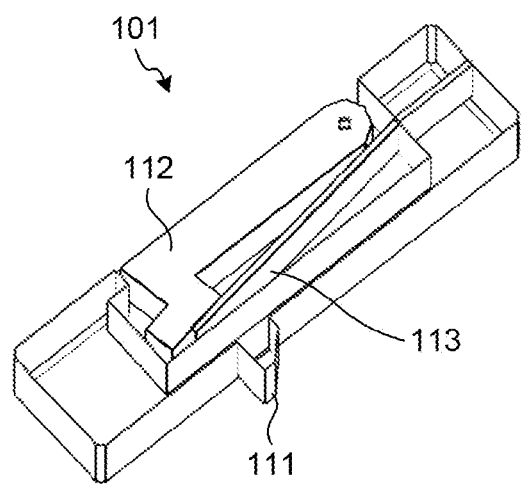
FIG. 17B is a cross-sectional view of the disabling button in a movable claw stored state according to the first embodiment.

Next, the mechanism of the movable claw 112 will be described with reference to FIGS. 17A and 17B. FIG. 17A is a cross-sectional view of the disabling button in a movable claw protruding state according to the first embodiment. FIG. 17B is a cross-sectional view of the disabling button in a movable claw stored state according to the first embodiment. FIG. 17A illustrates a C-C cross section in FIG. 5. FIG. 17B is a cross-section in the same position as FIG. 17A and illustrates a state in which the movable claw protrudes.

As illustrated in FIG. 17A, the disabling button 101 includes a flat spring 113 inside. The movable claw 112 has a substantially L-shape protruding inside the disabling button 101. Further, a tip portion of the movable claw 112 protruding inside the disabling button 101 is bent. When the movable claw 112 is pushed out of the disabling button 101, the tip portion comes into contact with the disabling button 101 and the movement of the movable claw 112 is stopped.

The flat spring 113 is arranged in parallel with the longitudinal direction of the disabling button, that is to say, in parallel with the Y direction in FIG. 1 when the disabling button is arranged in the tape library device 1. When a force is applied to the flat spring 113 in a short direction of the disabling button 101, the flat spring 113 applies a repulsive force to an object which applies the force to the flat spring 113.

In other words, when no force is applied to the movable claw 112 from the outside in the short direction of the disabling button 101, as illustrated in FIG. 17A, the movable claw 112 receives a pressure force from the flat spring 113 and protrudes to the outside of the disabling button 101.

On the other hand, as illustrated in FIG. 17B, when a force is applied to the movable claw 112 from the outside in the short direction of the disabling button 101, the movable claw 112 pushes down the flat spring 113 and is stored inside the disabling button 101.

Next, the entire operation of the interlock mechanism will be described with reference to FIGS. 18A to 21B.

Figure 18A:
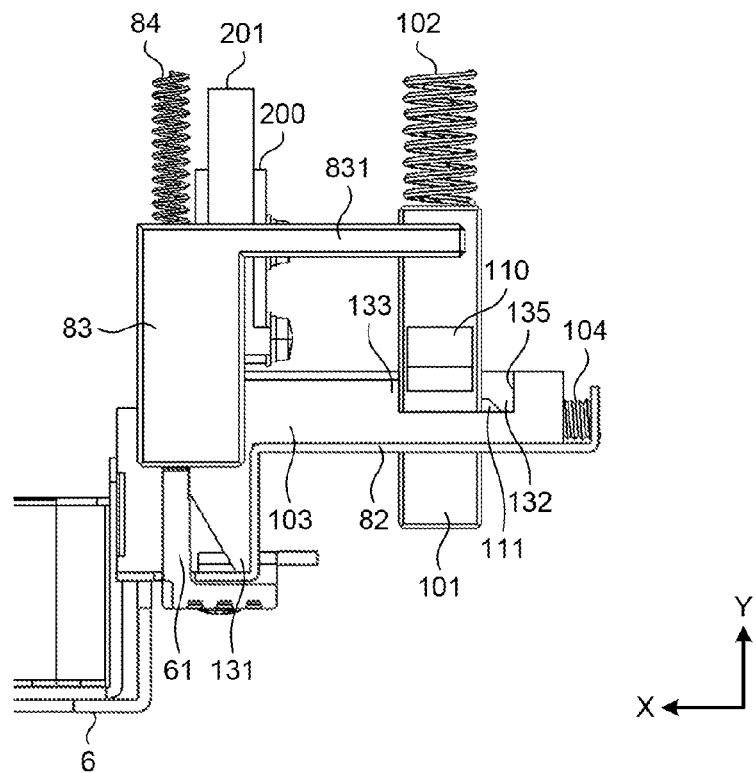
FIG. 18A is a top view of the interlock mechanism before the disabling button is pressed when the inner door is closed according to the first embodiment.
Figure 18B:
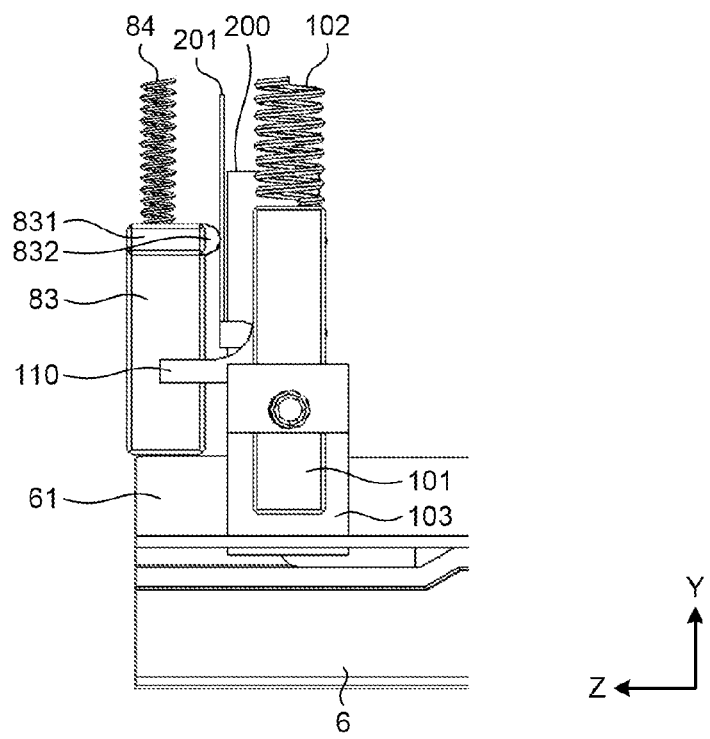
FIG. 18B is a side view of the interlock mechanism before the disabling button is pressed when the inner door is closed according to the first embodiment.

FIG. 18A is a top view of the interlock mechanism before the disabling button is pressed when the inner door is closed according to the first embodiment. FIG. 18B is a side view of the interlock mechanism before the disabling button is pressed when the inner door is closed according to the first embodiment.

When the inner door 6 is closed, the inner door claw 61 enters into the interlock mechanism 8 and pushes the interlock switch cam 83 in the Y direction. Further, the inner door claw 61 moves the slider 103 in the reverse X direction.

When the interlock switch cam 83 moves in the Y direction, the interlock switch cam 83 pushes the switch lever 201 against the pedestal of the interlock switch 200 and turns on the interlock switch 200. Thereby, the power is supplied to the conveyance mechanism 4.

At this time, the movable claw receiving portion 133 of the slider 103 pushes the movable claw 112 inside the disabling button 101. The button stopper 135 is moved to a position where the stopper 111 does come into contact with the button stopper 135 even when the stopper 111 moves in the Y direction. Then, the stopper 111 is stored in the button insertion hole 132.

In this state, as illustrated in FIGS. 18A and 18B, the disabling lever receiving portion 831 of the interlock switch cam 83 and the disabling lever 110 of the disabling button 101 are not in contact with each other. In other words, the disabling mechanism does not act on the interlock switch cam 83.

Figure 19A:
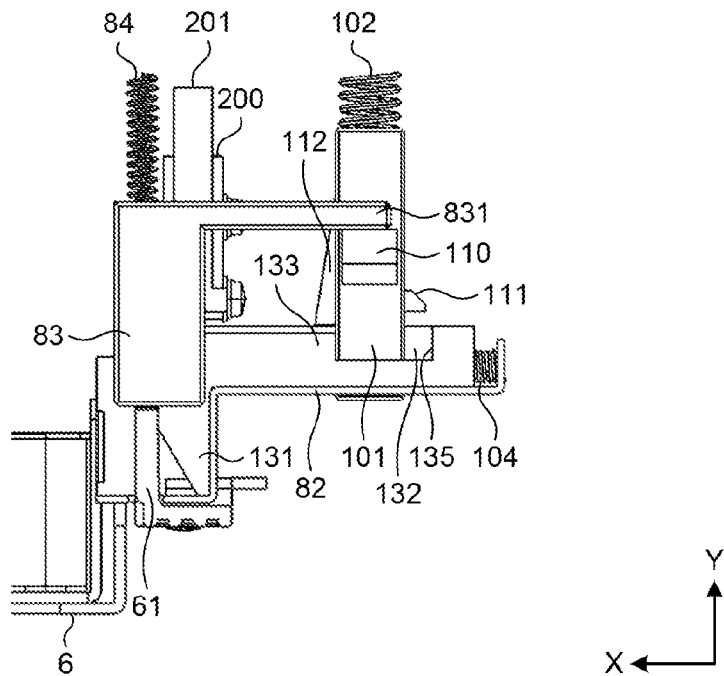
FIG. 19A is a top view of the interlock mechanism after the disabling button is pressed when the inner door is closed according to the first embodiment.
Figure 19B:
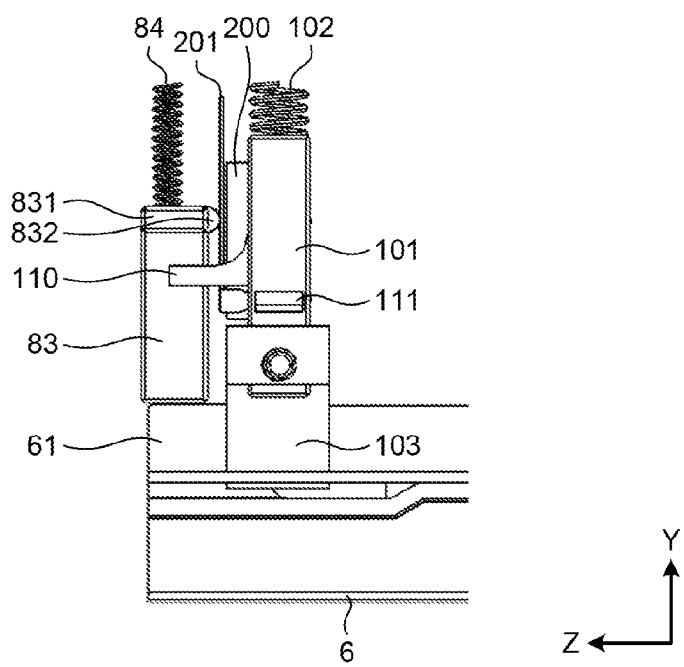
FIG. 19B is a side view of the interlock mechanism after the disabling button is pressed when the inner door is closed according to the first embodiment.

FIG. 19A is a top view of the interlock mechanism after the disabling button is pressed when the inner door is closed according to the first embodiment. FIG. 19B is a side view of the interlock mechanism after the disabling button is pressed when the inner door is closed according to the first embodiment. FIGS. 19A and 19B illustrate states in which the operator presses the disabling button 101 in the states of FIGS. 18A and 18B.

When the disabling button 101 is pressed by the operator, the disabling button 101 moves in the Y direction. When the disabling button 101 moves to a position where the movable claw 112 protrudes, the movable claw 112 protrudes from the disabling button 101 to the outside.

Thereafter, when the operator stops pressing the disabling button 101 and the pressure force from the operator disappears, the disabling button 101 moves in the reverse Y direction by receiving the pressure force from the button spring 102. When the movable claw 112 comes into contact with the movable claw receiving portion 133, the disabling button 101 stops.

At this time, the interlock switch cam 83 is pushed by the inner door claw 61 and moved in the Y direction. Therefore, as illustrated in FIGS. 19A and 19B, the disabling lever receiving portion 831 is located in the rear of the disabling lever 110 and the disabling lever receiving portion 831 and the disabling lever 110 are not in contact with each other. In other words, the disabling mechanism does not yet act on the interlock switch cam 83. However, when the movable claw 112 prevents the disabling button 101 from moving in the reverse Y direction, even if the inner door 6 is closed, it is possible to maintain a state in which the disabling button 101 is pushed in.

Figure 20A:
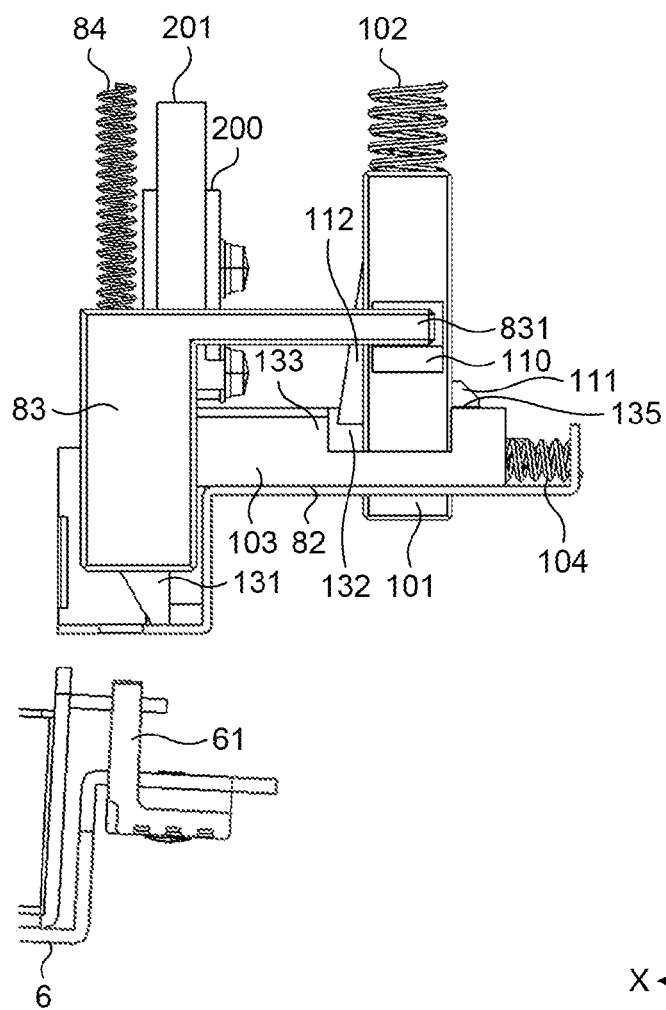
FIG. 20A is a top view of the interlock mechanism when the inner door is opened in a state in which the disabling button is pressed according to the first embodiment.
Figure 20B:
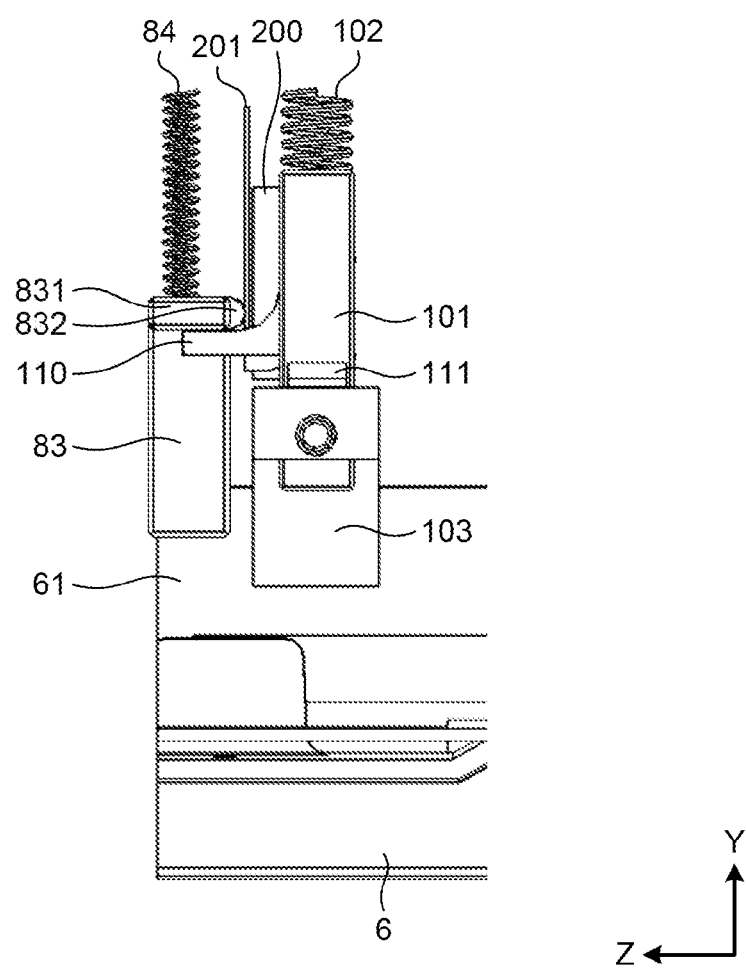
FIG. 20B is a side view of the interlock mechanism when the inner door is opened in a state in which the disabling button is pressed according to the first embodiment.

FIG. 20A is a top view of the interlock mechanism when the inner door is opened in a state in which the disabling button is pressed according to the first embodiment. FIG. 20B is a side view of the interlock mechanism when the inner door is opened in a state in which the disabling button is pressed according to the first embodiment. FIGS. 20A and 20B illustrate states in which the operator opens the inner door 6 in the states of FIGS. 19A and 19B.

When the inner door 6 is opened, the slider 103 moves in the X direction by the pressure force of the slider spring 104. When the slider 103 moves in the X direction, the contact between the movable claw receiving portion 133 and the movable claw 112 is released. Then, the disabling button 101 receives the pressure force from the button spring 102 and moves in the reverse Y direction. At this time, the movable claw 112 is inserted into the button insertion hole 132 in the state in which the movable claw 112 protrudes from the disabling button 101.

Thereafter, the stopper 111 comes into contact with the button stopper 135 and the disabling button 101 stops moving. The stopper 111 and the button stopper 135 are in contact with each other, so that in this state, the disabling button 101 does not move in the Y direction any more.

When the inner door 6 is further opened and the inner door claw 61 comes off the interlock mechanism 8, the interlock switch cam 83 receives the pressure force from the cam spring 84 and moves in the reverse Y direction. Here, if there were not the disabling mechanism, the interlock switch cam 83 would move to a position at which the interlock switch 200 is turned off. However, in the present embodiment, the disabling button 101 stops at a position where the stopper 111 and the button stopper 135 are in contact with each other. Therefore, when the disabling lever receiving portion 831 moves in the reverse Y direction, the disabling lever receiving portion 831 comes into contact with the disabling lever 110 and stops. At this time, as illustrated in FIG. 20B, the interlock switch cam 83 stops at a position where the switch pressing portion 832 does not come off the switch lever 201. In other words, the position of the disabling lever 110 in the state in which the stopper 111 and the button stopper 135 are in contact with each other is determined so that the switch pressing portion 832 is located on the switch lever 201 when the disabling lever receiving portion 831 comes into contact with the disabling lever 110.

In this state, the switch lever 201 is pushed against the pedestal of the interlock switch 200 by the switch pressing portion 832, so that the interlock switch 200 is still on. Therefore, in this state, the power is continuously supplied to the conveyance mechanism 4. As a result, even when the inner door 6 is opened, the power supply to the conveyance mechanism 4 is not shut off and the operation of the conveyance mechanism 4 continues.

Figure 21A:
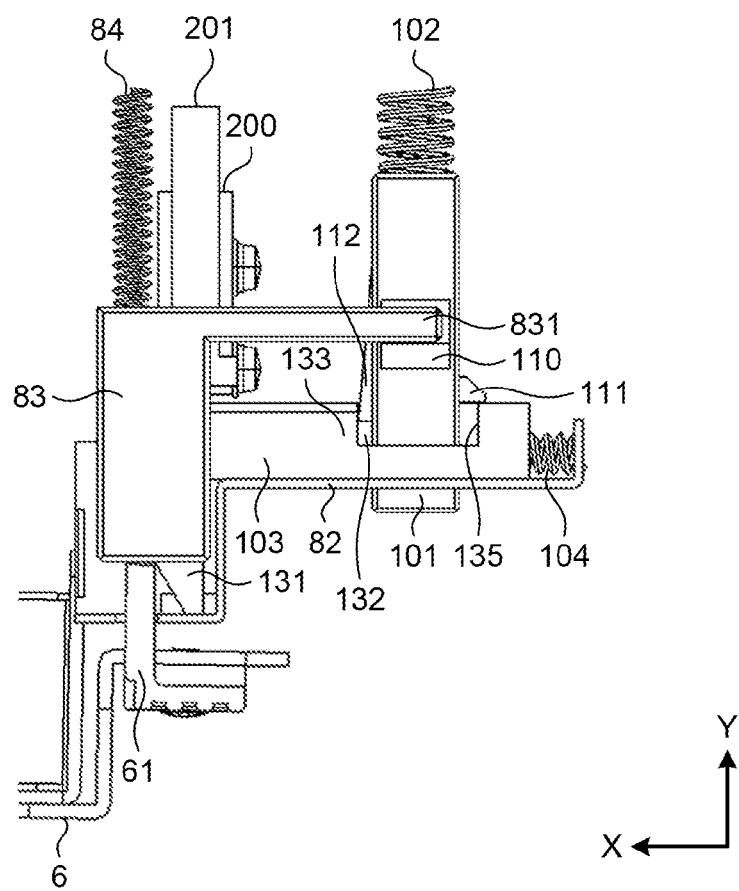
FIG. 21A is a top view of the interlock mechanism while the inner door is being closed in a state in which the disabling button is pressed according to the first embodiment.
Figure 21B:
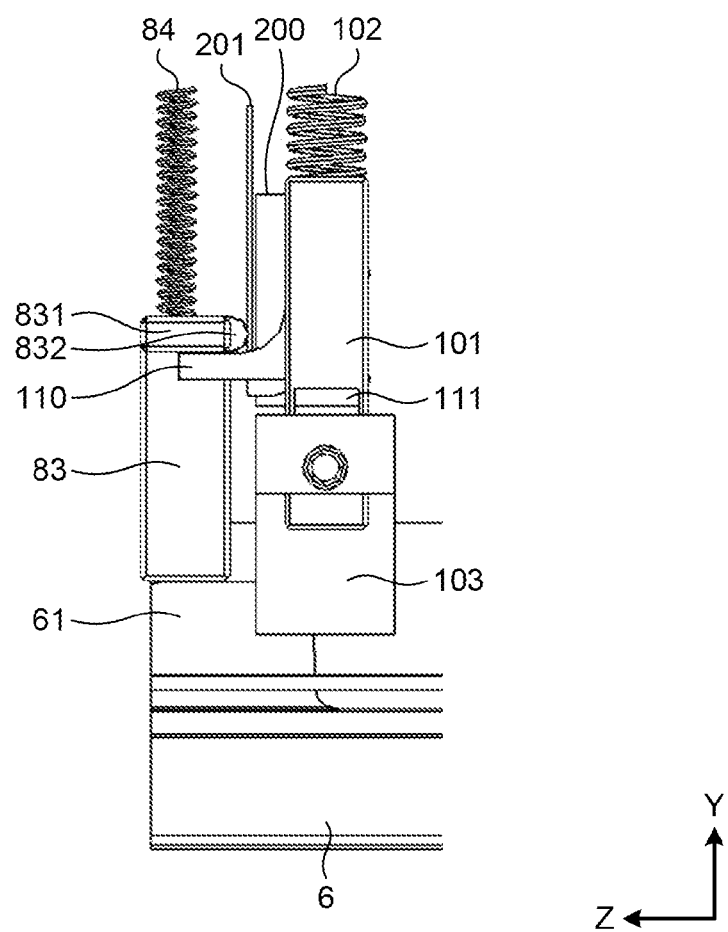
FIG. 21B is a side view of the interlock mechanism while the inner door is being closed in a state in which the disabling button is pressed according to the first embodiment.

FIG. 21A is a top view of the interlock mechanism while the inner door is being closed in a state in which the disabling button is pressed according to the first embodiment. FIG. 20B is a side view of the interlock mechanism while the inner door is being closed in a state in which the disabling button is pressed according to the first embodiment. FIGS. 21A and 21B illustrate states in which the operator closes the inner door 6 in the states of FIGS. 20A and 20B.

When the inner door 6 is closed, the inner door claw 61 enters into the interlock mechanism. Then, the inner door claw 61 pushes the interlock switch cam 83 in the Y direction. Further, the inner door claw 61 pushes the slider 103 in the reverse X direction.

The interlock switch cam 83 receives the pressure force from the inner door claw 61 and moves in the reverse Y direction. When the inner door 6 is closed, the interlock switch cam 83 stops at a position where the interlock switch cam 83 is pushed by the inner door claw 61 and moves in the reverse Y direction. At this time, the switch pressing portion 832 pushes the switch lever 201 against the pedestal of the interlock switch 200, so that the interlock switch 200 is in an on state. Therefore, in this state, the power is continuously supplied to the conveyance mechanism 4.

When the slider 103 moves in the reverse X direction, the movable claw receiving portion 133 pushes the movable claw 112 and stores the movable claw 112 inside the disabling button 101.

When the slider 103 further moves in the reverse X direction, the contact between the stopper 111 and the button stopper 135 is released. Thereby, the disabling button 101 moves in the reverse Y direction. When the stopper 111 comes into contact with the inner wall of the interlock cover 82 facing the Y direction, the disabling button 101 stops moving in the reverse Y direction.

Thereby, the state of the tape library device returns to the state in which the inner door 6 is closed and the disabling button 101 is not pressed.

Figure 22:
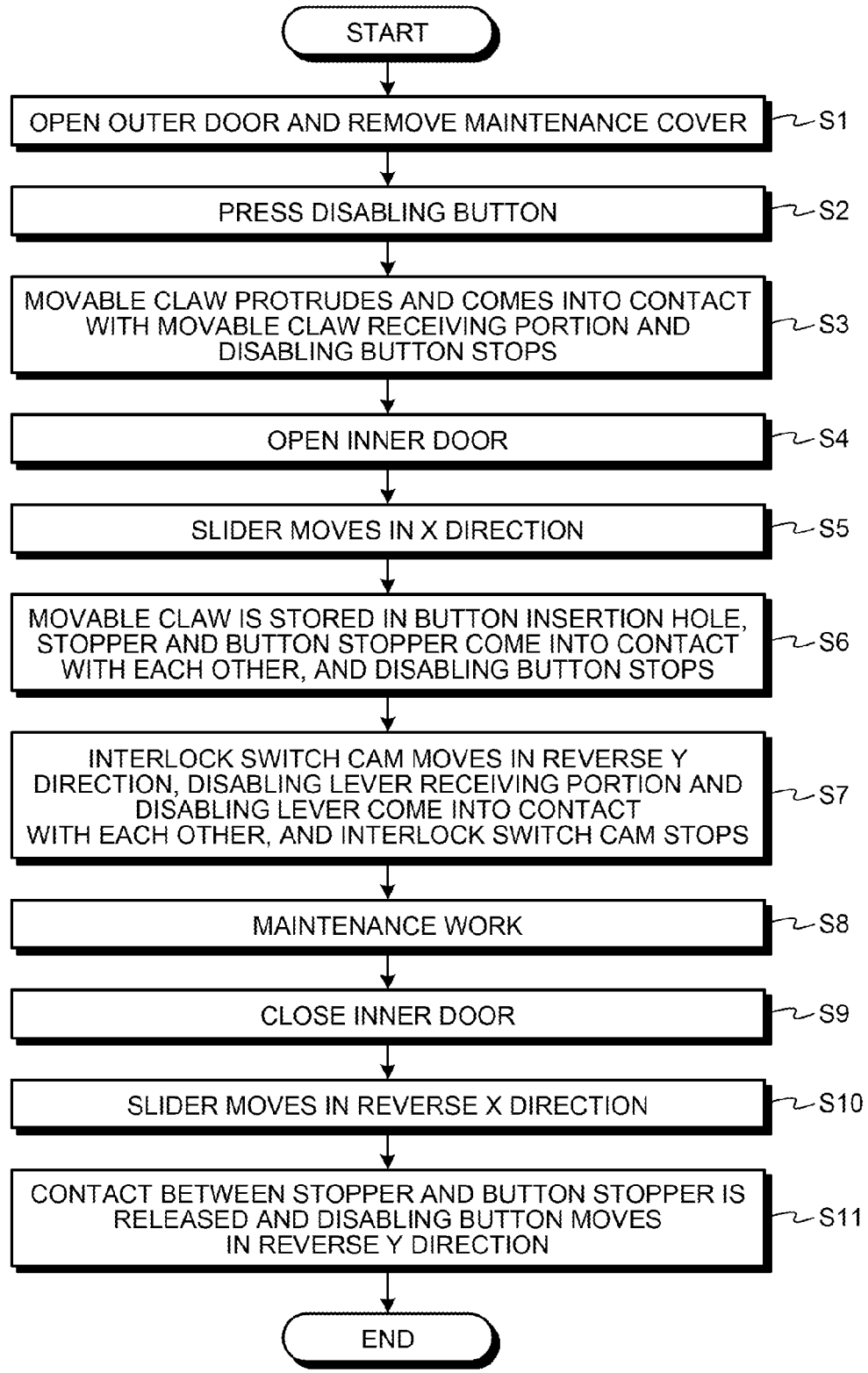
FIG. 22 is a flowchart of a maintenance work and an operation of the disabling mechanism in the tape library device according to the first embodiment.

Next, the operation of the disabling mechanism in the tape library device according to the present embodiment will be described with reference to FIG. 22. FIG. 22 is a flowchart of a maintenance work and the operation of the disabling mechanism in the tape library device according to the first embodiment.

An operator opens the outer door 5 and removes the maintenance cover 7 (step S1).

Then, the operator presses the disabling button 101 (step S2).

The disabling button 101 receives the pressure force from the inner door claw 61 and moves in the Y direction. When the disabling button 101 moves to a position where the contact of the movable claw 112 with the movable claw receiving portion 133 disappears, the movable claw 112 protrudes from the disabling button 101 to the outside. When the pressure force from the operator disappears, the disabling button 101 moves in the reverse Y direction and stops at a position where the movable claw 112 and the movable claw receiving portion 133 come into contact with each other (step S3).

The operator opens the inner door 6 (step S4).

The inner door claw 61 comes off the interlock mechanism 8 and the slider 103 moves in the X direction (step S5).

When the slider 103 moves in the X direction, the contact between the movable claw 112 and the movable claw receiving portion 133 is released. Then, the movable claw 112 is stored in the button insertion hole 132. Thereby, the disabling button 101 starts moving in the reverse Y direction. Thereafter, the stopper 111 and the button stopper 135 come into contact with each other and the disabling button 101 stops (step S6). Thereby, the disabling lever 110 moves on the moving path of the disabling lever receiving portion 831 and the interlock switch is disabled.

The interlock switch cam 83 moves in the reverse Y direction. Thereafter, the disabling lever receiving portion 831 and the disabling lever 110 come into contact with each other and the interlock switch cam 83 stops (step S7). At this time, the switch pressing portion 832 pushes the switch lever 201 against the pedestal of the interlock switch 200, so that the interlock switch 200 is in an on state and the power supply to the conveyance mechanism 4 continues.

The operator performs maintenance work (step S8). In this case, the initialization operation of the conveyance mechanism 4 is not performed, so that the operator can check an operation of the conveyance mechanism 4 in a state in which a failure occurs without change.

When the maintenance work is completed, the operator closes the inner door 6 (step S9).

The slider 103 receives the pressure force from the inner door claw 61 and moves in the reverse X direction (step S10).

When the slider 103 moves in the reverse X direction, the contact between the stopper 111 and the button stopper 135 is released. Then, the stopper 111 is stored in the button insertion hole 132 and the disabling button 101 moves in the reverse Y direction (step S11). Thereby, the disabling lever 110 retreats from the moving path of the disabling lever receiving portion 831 and the disabled state of the interlock switch 200 is released.

As described above, the tape library device according to the present embodiment can disable the interlock mechanism so that the interlock switch does not operate when the inner door is opened by pressing the disabling button in a state in which the inner door is closed. Thereby, an operator such as a maintenance person can open the inner door without stopping the conveyance mechanism and the robot mechanism, so that the operator can check the state of when a failure occurs before performing the initialization. Further, when the operator performs maintenance of the device, the operator can stop only the robot mechanism which is an object of the maintenance and continue the operation of the conveyance mechanism. Specifically, when the tape library devices are connected, it is possible to stop only an operation of a specific tape library device and continue operations of the other tape library devices by using the interlock mechanism according to the present embodiment.

In a state in which the disabling button is pressed and the interlock mechanism is disabled, if the inner door is opened and thereafter closed, the disabled state of the interlock mechanism is automatically released by closing the inner door. Thereby, it is possible to prevent the disabled state of the interlock switch from being forgotten to be released, so that it is possible to improve safety.

In the above description, while the conveyance mechanism interlock mechanism 8 is described as an example, the robot mechanism interlock mechanism 9 has the same structure. The disabling mechanism need not be mounted in both the conveyance mechanism interlock mechanism 8 and the robot mechanism interlock mechanism 9, but the disabling mechanism may be mounted in either one of the mechanisms.

Second Embodiment

Figure 23:
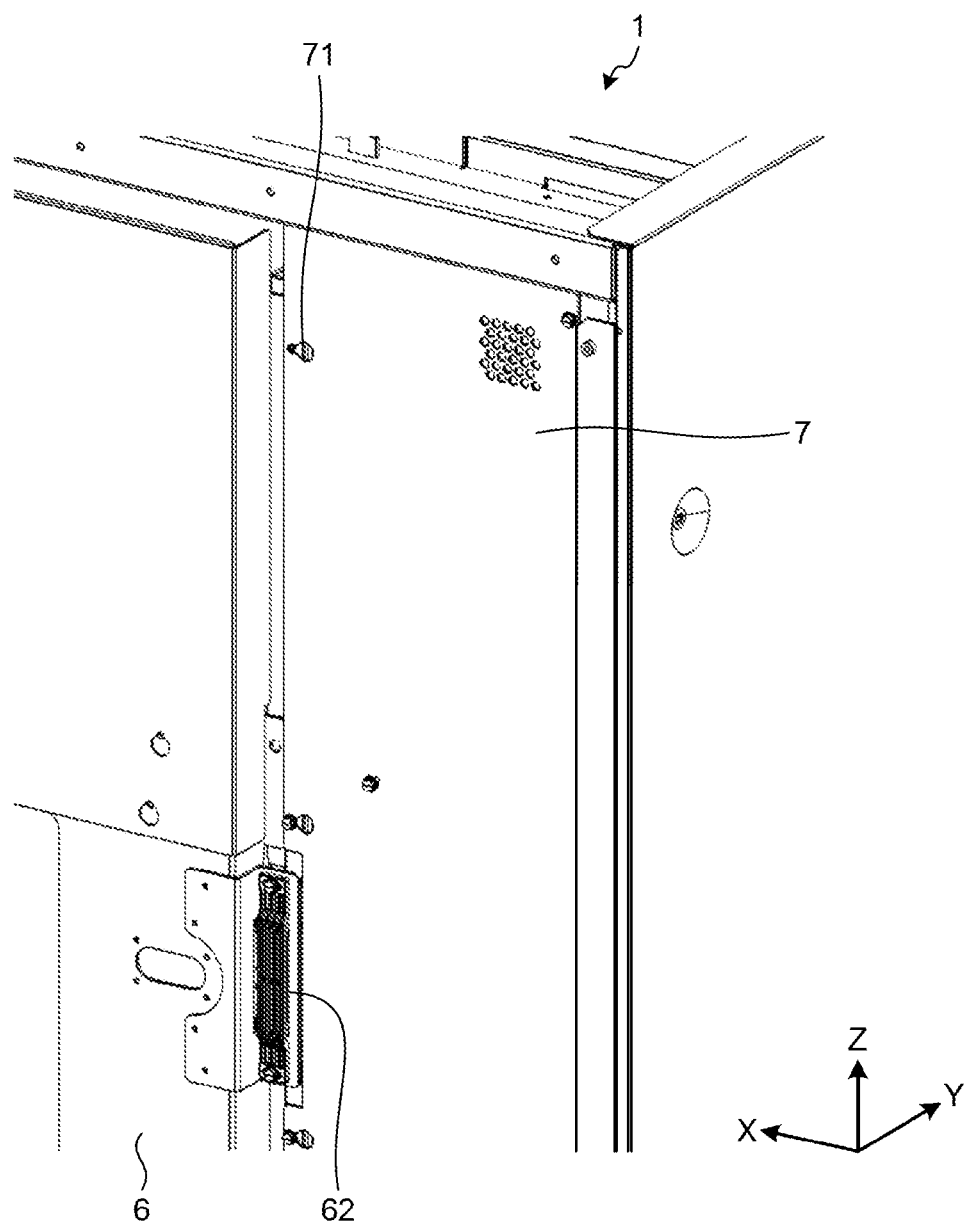
FIG. 23 is an enlarged view of a conveyance mechanism interlock portion when an inner door is closed according to a second embodiment.

FIG. 23 is an enlarged view of a conveyance mechanism interlock portion when an inner door is closed according to a second embodiment. As illustrated in FIG. 23, the tape library device 1 according to the present embodiment also has the inner door 6 and the maintenance cover 7.

The maintenance cover 7 is attached to the housing of the tape library device 1 by a screw 71. An operator can remove the maintenance cover 7 from the tape library device 1 by removing the screw 71.

The inner door 6 has the inner door claw connection member 62 that protrudes toward the maintenance cover 7.

Figure 24:
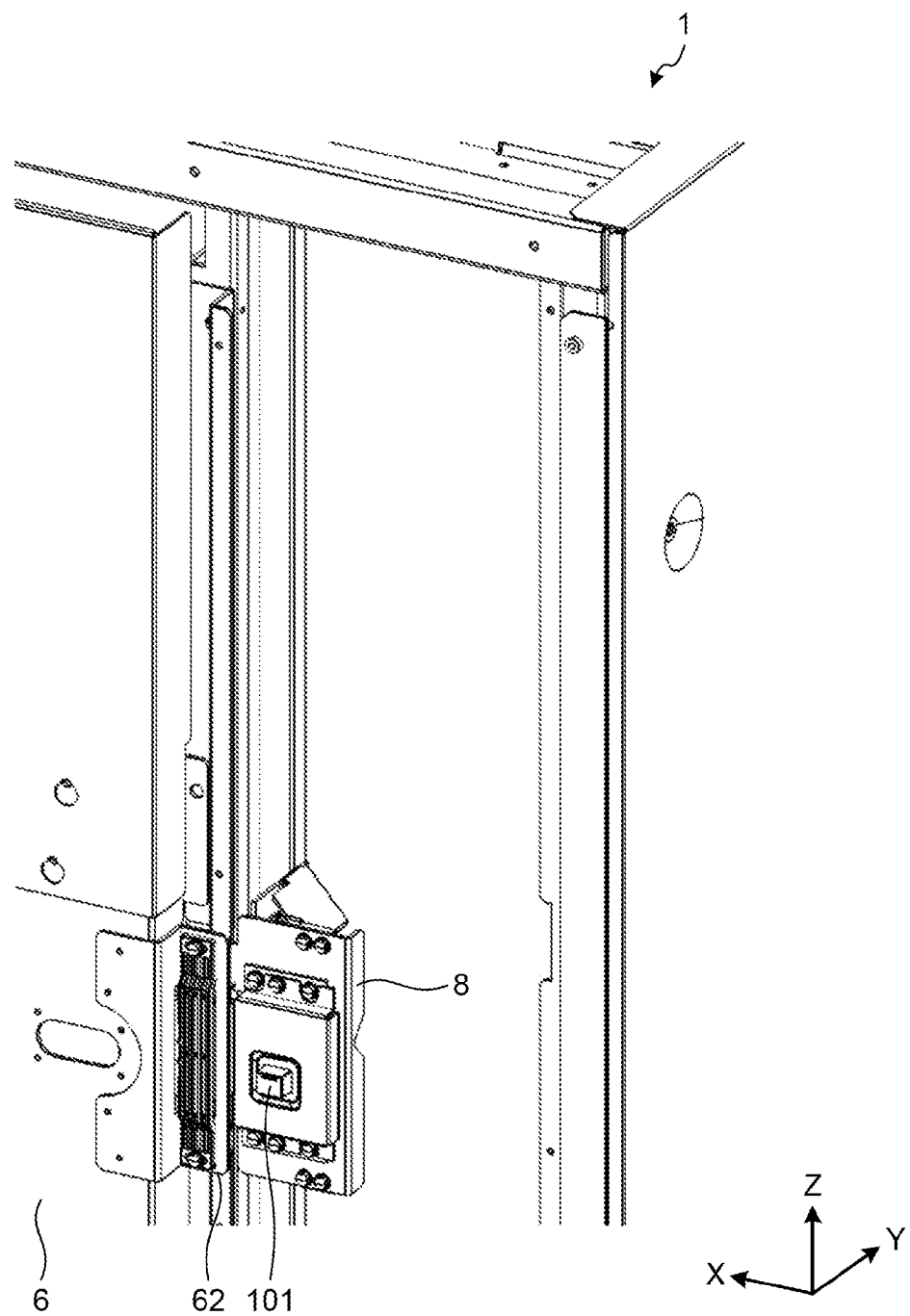
FIG. 24 is an external view of an interlock mechanism according to the second embodiment.

FIG. 24 is an external view of the interlock mechanism according to the second embodiment. FIG. 24 is a state in which the maintenance cover 7 is removed from the state of FIG. 23. When the maintenance cover 7 is removed from the interlock mechanism 8 according to the present embodiment, the disabling button 101 appears to be able to be accessed.

Figure 25:
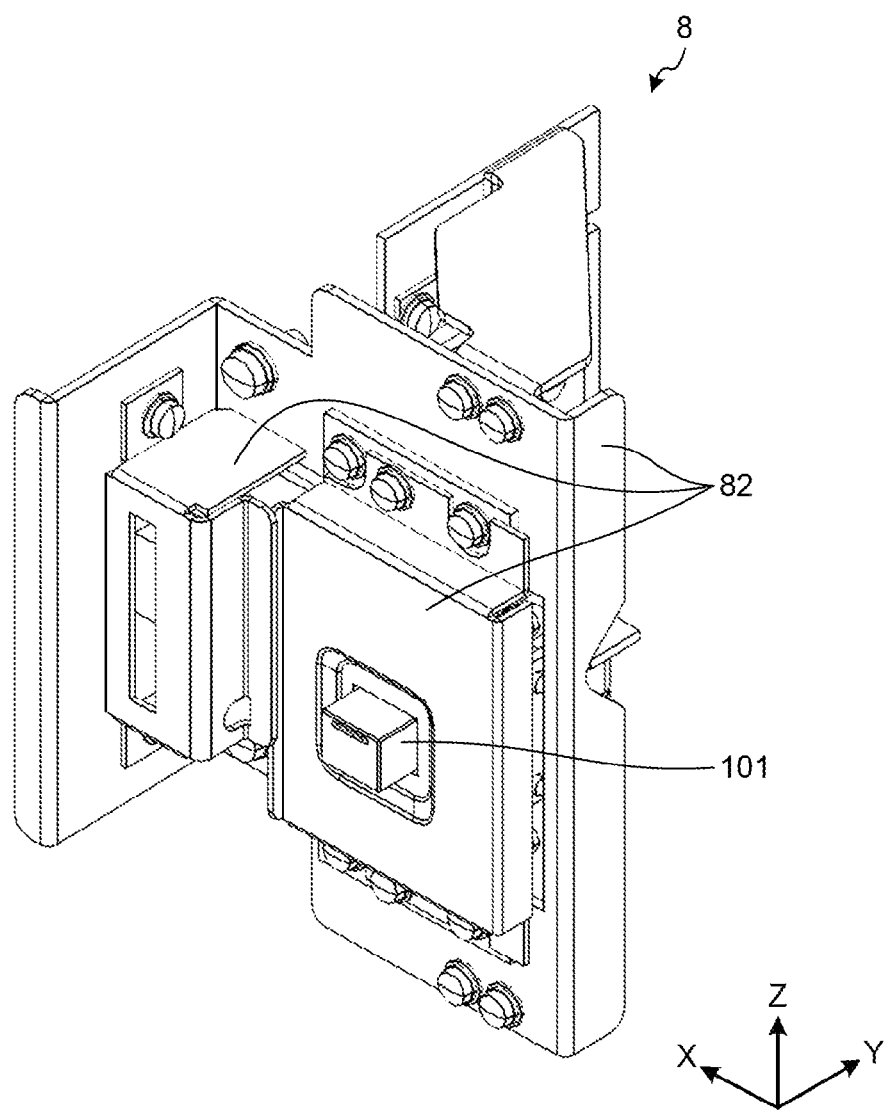
FIG. 25 is a front perspective view of the interlock mechanism according to the second embodiment.

FIG. 25 is a front perspective view of the interlock mechanism according to the second embodiment. A front surface of the interlock mechanism 8 facing the reverse Y direction is covered by the interlock cover 82. The interlock cover 82 is provided with a slit into which the inner door claw 61 fits.

Figure 26:
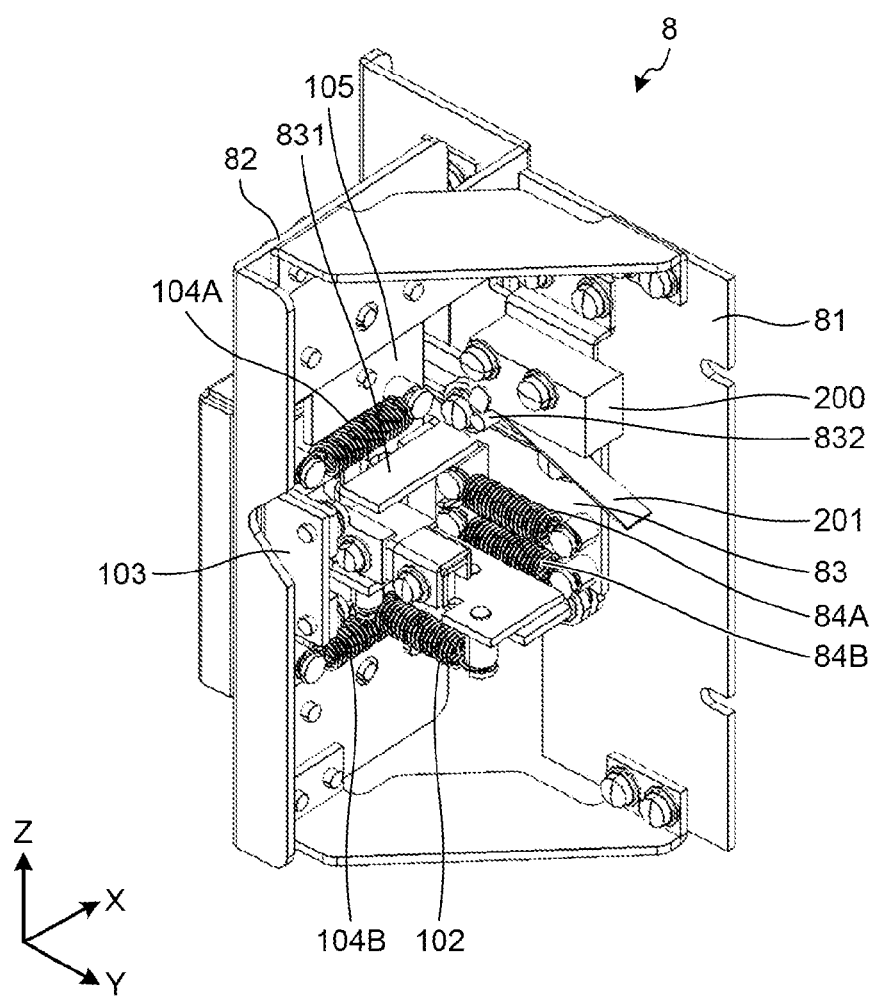
FIG. 26 is a rear perspective view of the interlock mechanism according to the second embodiment.

FIG. 26 is a rear perspective view of the interlock mechanism according to the second embodiment. While the interlock switch cam 83 receives a restoring force by a pushing force of the cam spring 84 in the first embodiment, in the present embodiment, the interlock switch cam 83 receives a restoring force by a pulling force of cam springs 84A and 84B. A force pulling the interlock switch cam 83 is increased by arranging two springs which are the cam springs 84A and 84B, so that a sufficient restoring force is obtained. However, if a sufficient force can be obtained by one spring, only either one of the cam springs 84A and 84B may be arranged.

While the disabling button 101 receives a restoring force by a pushing force of the button spring 102 in the first embodiment, in the present embodiment, the disabling button 101 receives a restoring force by a pulling force of the button spring 102.

While the slider 103 receives a restoring force by a pushing force of the slider spring 104 in the first embodiment, in the present embodiment, the slider 103 receives a restoring force by a pulling force of slider springs 104A and 104B. A force pulling the slider 103 is increased by arranging two springs which are the slider springs 104A and 104B, so that a sufficient restoring force is obtained and the slider 103 is equally pulled from above and below. However, if a sufficient force can be obtained by one spring and the slider 103 can be pulled appropriately, only either one of the slider springs 104A and 104B may be arranged.

In the present embodiment, the interlock switch 200 is arranged so that the switch lever 201 faces downward, that is to say, the switch lever 201 faces the reverse Z direction. When the switch lever 201 is pushed against the pedestal of the interlock switch 200 by the switch pressing portion 832 of the interlock switch cam 83, the interlock switch 200 is turned on and the power is supplied to the conveyance mechanism 4.

The members such as the interlock switch cam 83, the disabling button 101, and the slider 103 according to the present embodiment have structures that can be manufactured by almost metal plates. On this point, the structures of the members such as the interlock switch cam 83, the disabling button 101, and the slider 103 according to the first embodiment require a machining process in addition to the processes in the present embodiment. Therefore, the members according to the present embodiment can have less number of machined parts, so that the cost can be reduced.

Further, while the interlock base 81 covers all the members in the first embodiment, in the present embodiment, the interlock base 81 is used to fix or hold the interlock portion such as the interlock switch cam 83. On the other hand, in the present embodiment, a disabling base 105 is used to fix or hold the disabling mechanism such as the disabling button 101 and the slider 103. The interlock base 81 and the disabling base 105 are fixed to the housing of the tape library device 1.

In the description below, in the same manner as in the first embodiment, first, the interlock portion including the interlock switch cam 83 and the disabling mechanism including the disabling button 101 and the slider 103 are separately described, and thereafter an operation in a state in which the interlock portion and the disabling mechanism are combined will be described. However, the interlock portion and the disabling mechanism according to the present embodiment are not simply separated vertically as illustrated in FIG. 5 of the first embodiment, but the interlock portion and the disabling mechanism represent functional sections.

Figure 27:
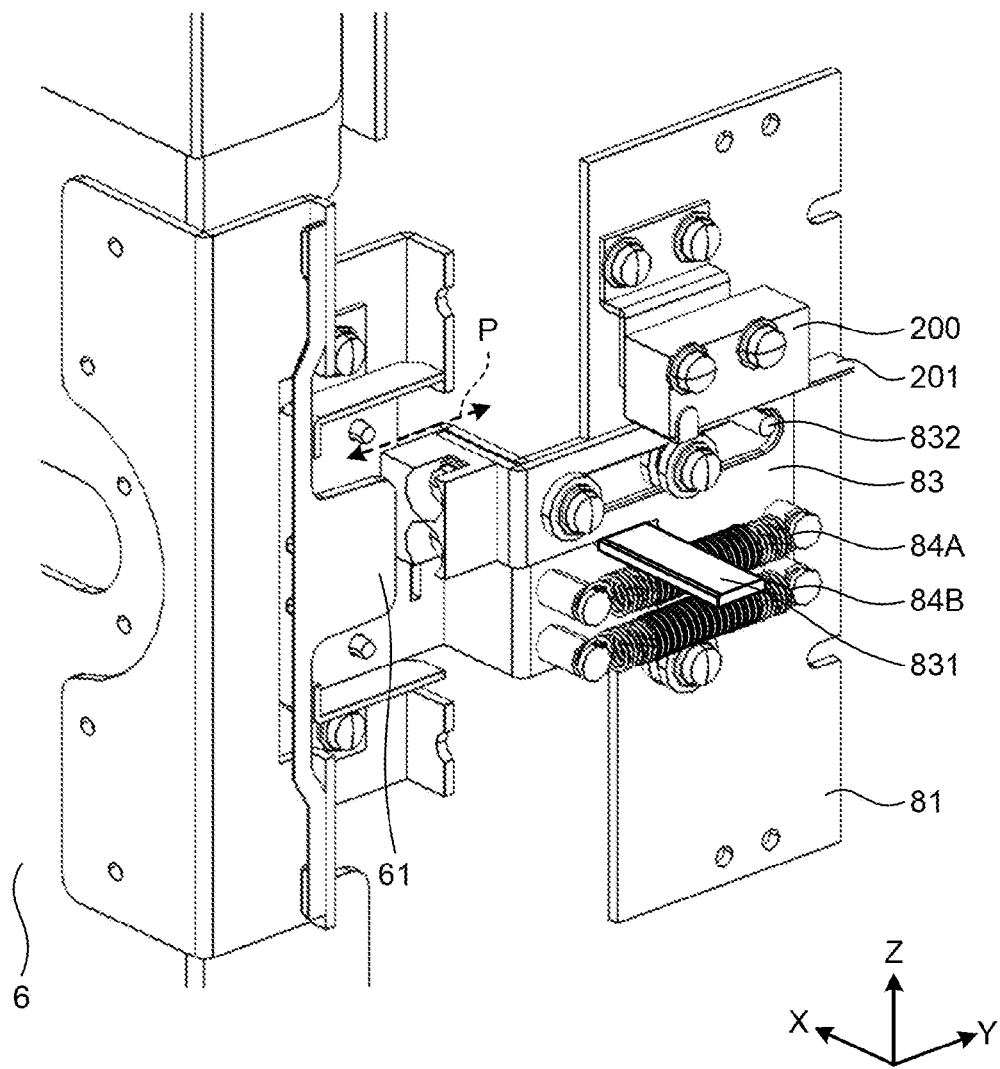
FIG. 27 is a perspective view of an interlock portion when the inner door is closed according to the second embodiment.

FIG. 27 is a perspective view of the interlock portion when the inner door is closed according to the second embodiment. The interlock switch 200 is fixed to the interlock base 81 so that the switch lever 201 is located downward. One end of each of the cam springs 84A and 84B is fixed to the interlock base 81 and the other end is fixed to the interlock switch cam 83.

The interlock switch cam 83 moves in the Y direction as indicated by arrow P. When the inner door 6 is closed, the interlock switch cam 83 receives the pressure force from the inner door claw 61 and moves in the Y direction. At this time, the interlock switch cam 83 moves in the Y direction while stretching the cam springs 84A and 84B.

When the interlock switch cam 83 moves in the Y direction, the switch pressing portion 832 comes into contact with the switch lever 201, pushes up the switch lever 201, and presses the switch lever 201 against the pedestal of the interlock switch 200. Thereby, the interlock switch 200 turns on and the power is supplied to the conveyance mechanism 4.

Figure 28:
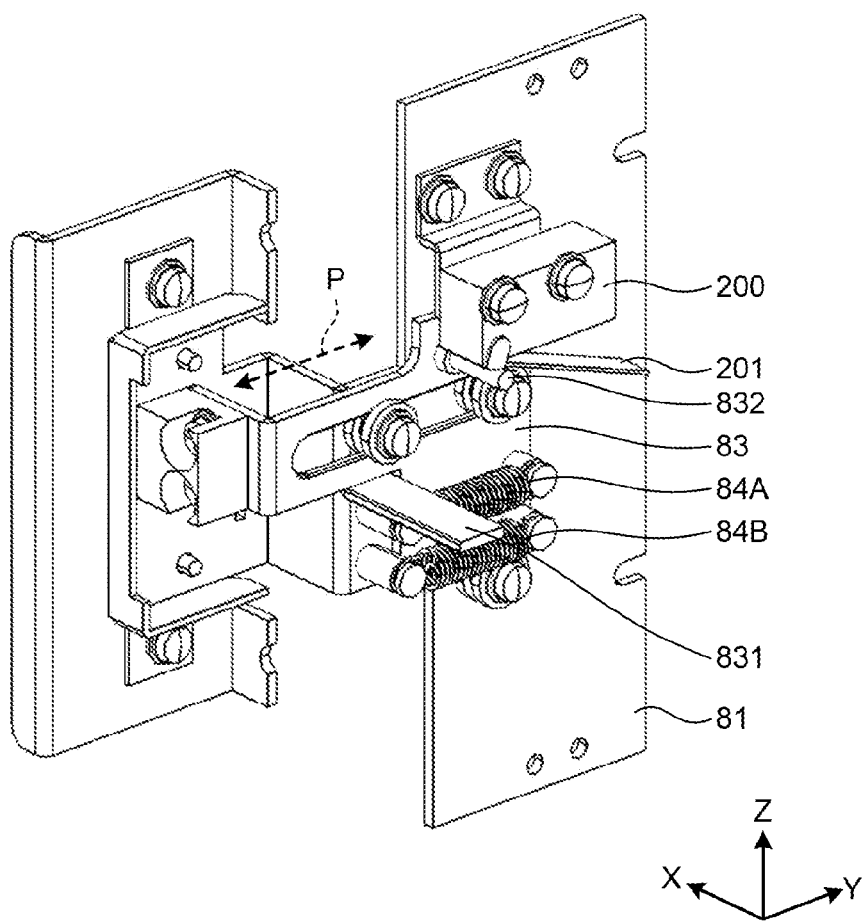
FIG. 28 is a perspective view of the interlock portion when the inner door is open according to the second embodiment.

FIG. 28 is a perspective view of the interlock portion when the inner door is open according to the second embodiment. When the inner door 6 is opened and the pressure force of the inner door claw 61 disappears, the interlock switch cam 83 receives the pulling force of the cam springs 84A and 84B and moves in the reverse Y direction.

When the interlock switch cam 83 moves in the reverse Y direction, the switch pressing portion 832 comes off the position where the switch pressing portion 832 is in contact with the switch lever 201. The switch lever 201 moves in a direction going away from the pedestal of the interlock switch 200. Thereby, the interlock switch 200 turns off and the power supply to the conveyance mechanism 4 is shut off.

Figure 29A:
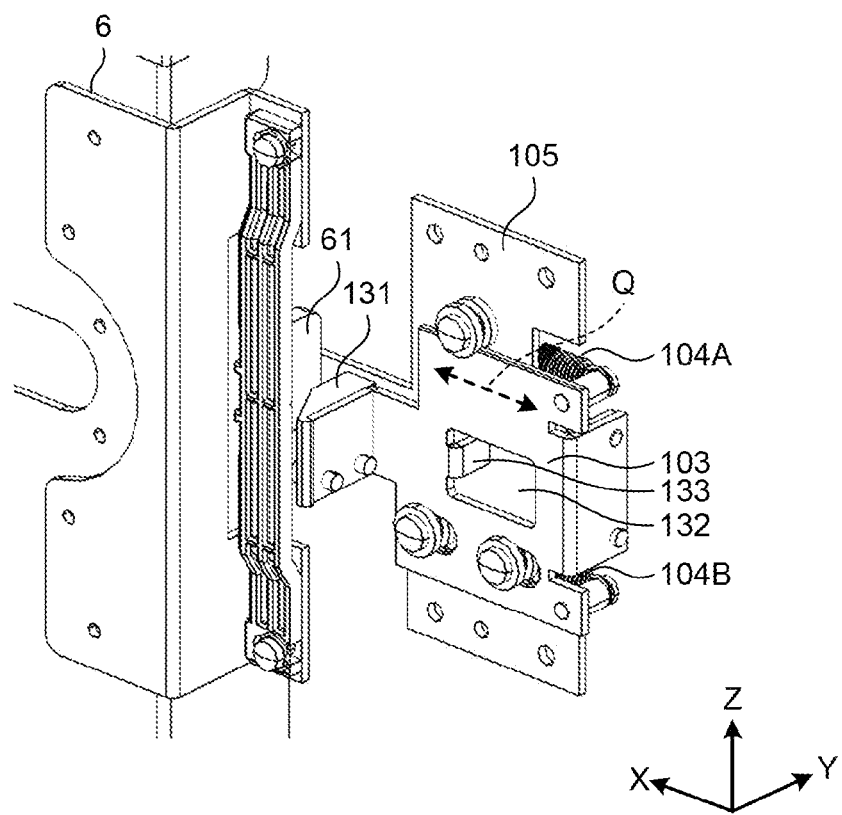
FIG. 29A is a front perspective view of a slider when the inner door is closed according to the second embodiment.
Figure 29B:
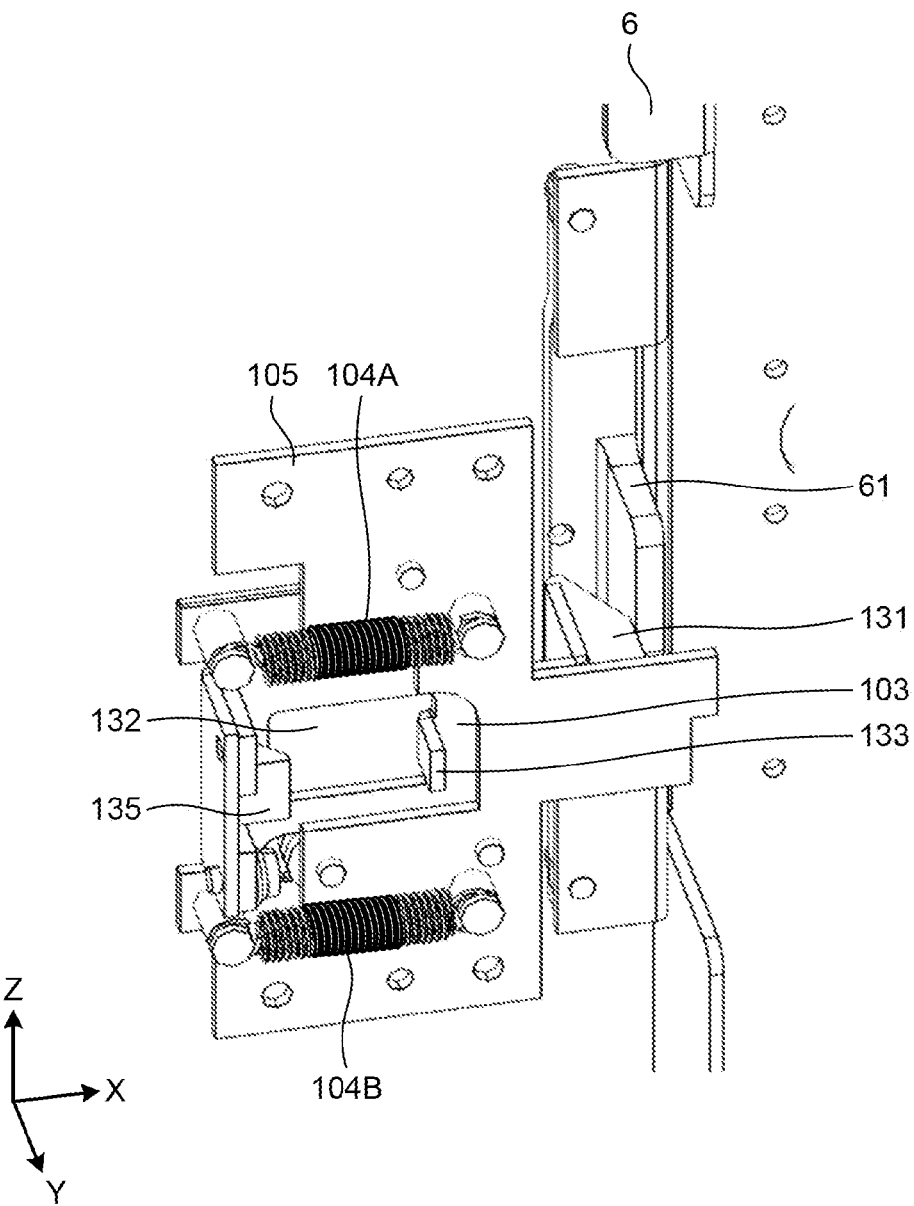
FIG. 29B is a rear perspective view of the slider when the inner door is closed according to the second embodiment.

FIG. 29A is a front perspective view of the slider when the inner door is closed according to the second embodiment. FIG. 29B is a rear perspective view of the slider when the inner door is closed according to the second embodiment.

One end of each of the slider springs 104A and 104B is fixed to the disabling base 105 and the other end is fixed to the slider 103. In the present embodiment, the button insertion hole 132 is an opening whose thickness in the Y direction is small. The movable claw receiving portion 133 according to the present embodiment is a plate-like member that protrudes from a part of the X-direction side surface of the opening of the button insertion hole 132.

The slider 103 moves in the X direction as indicated by arrow Q. When the inner door 6 is closed, the inner door claw 61 comes into contact with the inner door claw receiving portion 131, and when the inner door claw 61 is further inserted in the Y direction, the inner door claw receiving portion 131 is pushed by the inner door claw 61 in the reverse X direction. The slider 103 moves in the reverse X direction while stretching the slider springs 104A and 104B by the pressure force from the inner door claw 61.

Figure 30:
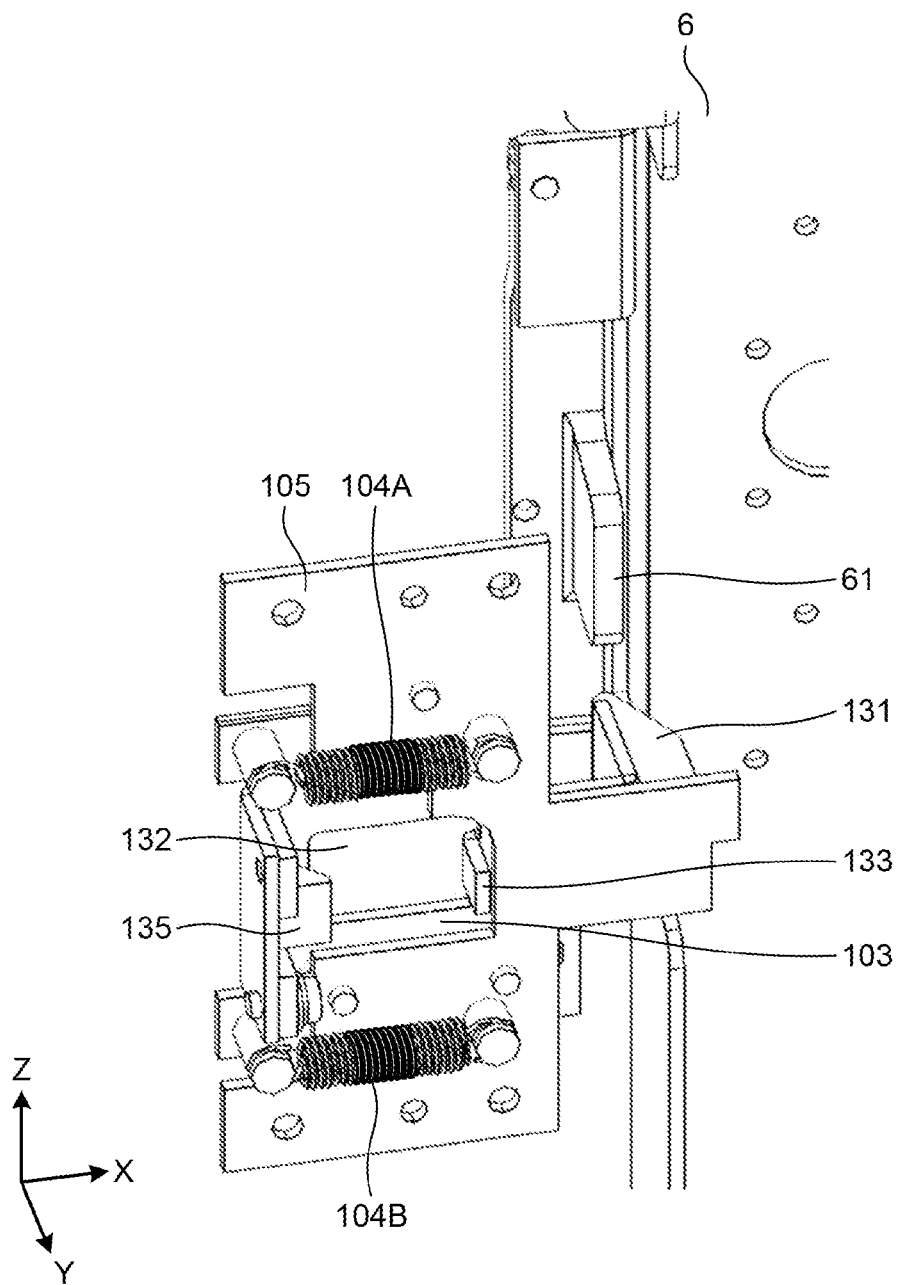
FIG. 30 is a rear perspective view of the slider when the inner door is open according to the second embodiment.

FIG. 30 is a rear perspective view of the slider when the inner door is open according to the second embodiment. When the inner door 6 is opened, the inner door claw 61 moves in a direction going away from the inner door claw receiving portion 131, that is, in the reverse Y direction. Thereby, the pressure force from the inner door claw 61 disappears, so that the slider 103 moves in the X direction by receiving the pulling force from the slider springs 104A and 104B.

Figure 31:
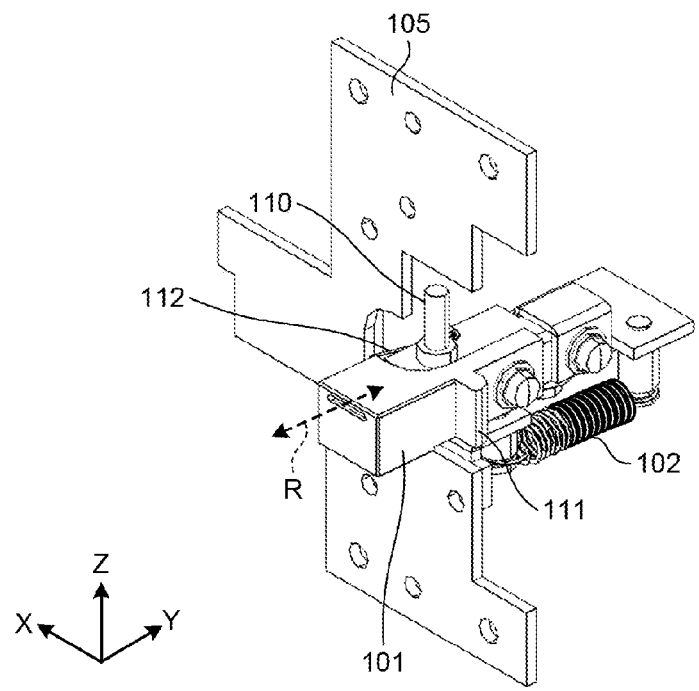
FIG. 31 is a perspective view of a disabling button before it is pressed according to the second embodiment.

FIG. 31 is a perspective view of the disabling button before it is pressed according to the second embodiment. The disabling button 101 according to the present embodiment also includes the disabling lever 110, the stopper 111, and the movable claw 112. One end of the button spring 102 is fixed to the disabling base 105 and the other end is fixed to the disabling button 101.

When the disabling button 101 does not receive a pressure force in the Y direction, the disabling button 101 receives a pulling force from the button spring 102 and moves in the reverse Y direction.

Figure 32:
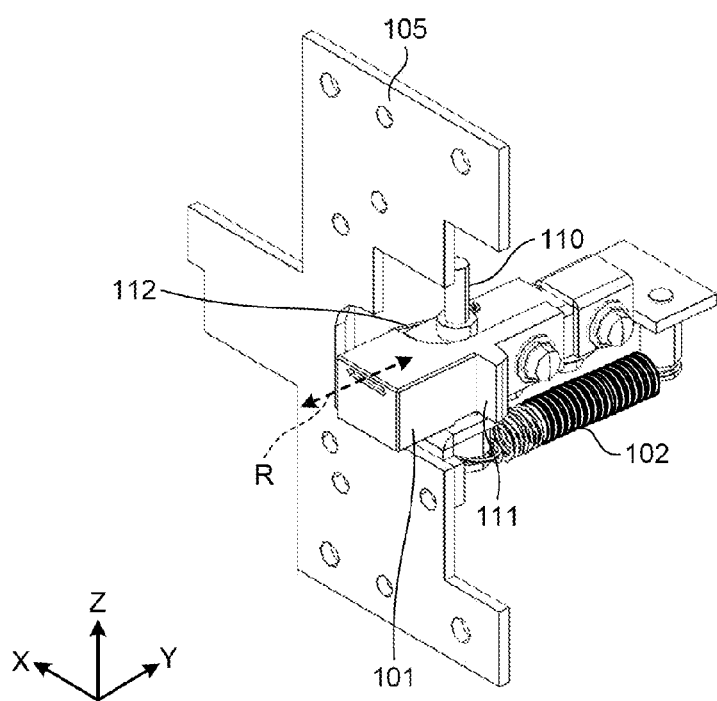
FIG. 32 is a perspective view of the disabling button after it is pressed according to the second embodiment.

FIG. 32 is a perspective view of the disabling button after it is pressed according to the second embodiment. When the disabling button 101 receives a pressure force in the Y direction from the state of FIG. 31, the disabling button 101 moves in the Y direction while stretching the button spring 102. That is, the disabling button 101 moves in a direction indicated by arrow R.

Figure 33A:
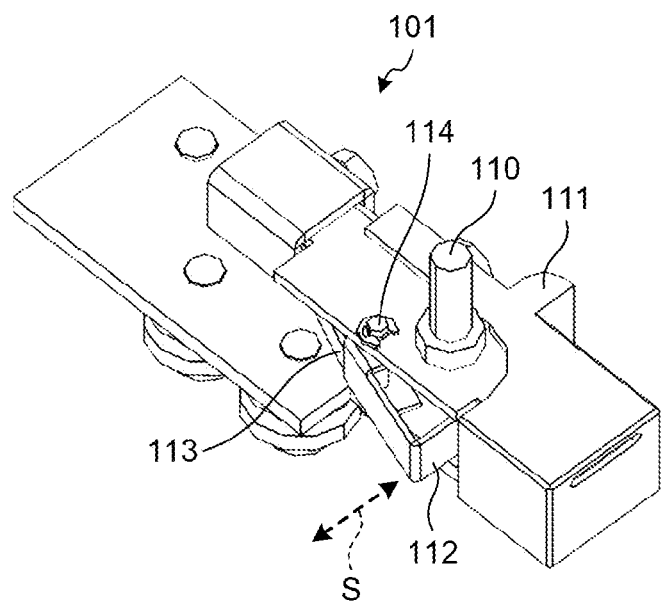
FIG. 33A is a perspective view of the disabling button in a movable claw protruding state according to the second embodiment.
Figure 33B:
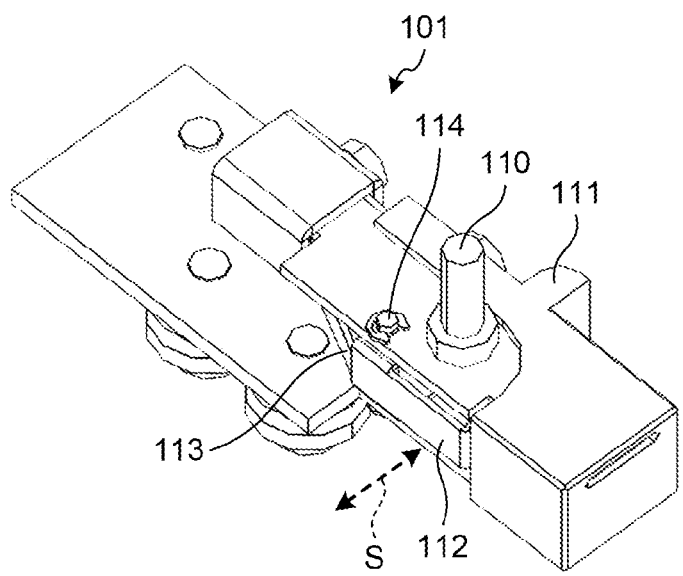
FIG. 33B is a perspective view of the disabling button in a movable claw stored state according to the second embodiment.

FIG. 33A is a perspective view of the disabling button in a movable claw protruding state according to the second embodiment. FIG. 33B is a perspective view of the disabling button in a movable claw stored state according to the second embodiment.

The movable claw 112 according to the present embodiment is movable in a direction indicated by arrow S, that is, in the X direction. Specifically, the movable claw 112 rotates around a fulcrum 114.

A torsion coil spring is arranged at the fulcrum 114 and the torsion coil spring applies a force to the movable claw 112 in a direction pushing the movable claw 112 out of the disabling button 101. Therefore, if no pressure force is applied to the movable claw 112 from the outside in a direction toward the disabling button 101, the movable claw 112 rotates in a direction in which the movable claw 112 is pushed out of the disabling button 101 by the force of the coil spring. Then, as illustrated in FIG. 33A, the movable claw 112 protrudes from the disabling button 101.

On the other hand, if a pressure force is applied to the movable claw 112 from the outside in a direction toward the disabling button 101, the torsion coil spring is twisted and the movable claw 112 rotates in a direction in which the movable claw 112 is pushed into the disabling button 101. Then, as illustrated in FIG. 33B, the movable claw 112 is stored inside the disabling button 101.

Figure 34:
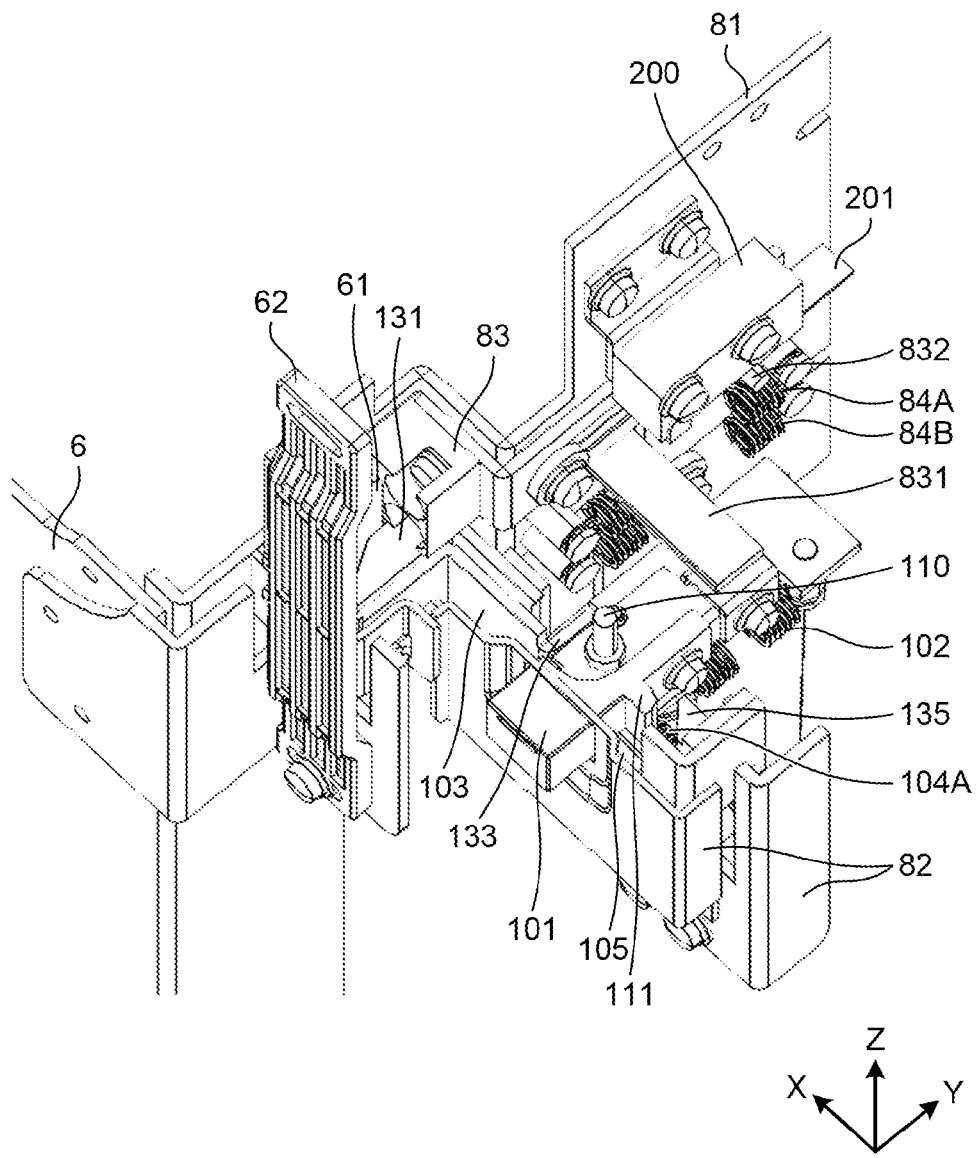
FIG. 34 is a perspective view of the interlock mechanism before the disabling button is pressed when the inner door is closed according to the second embodiment.
Figure 35:
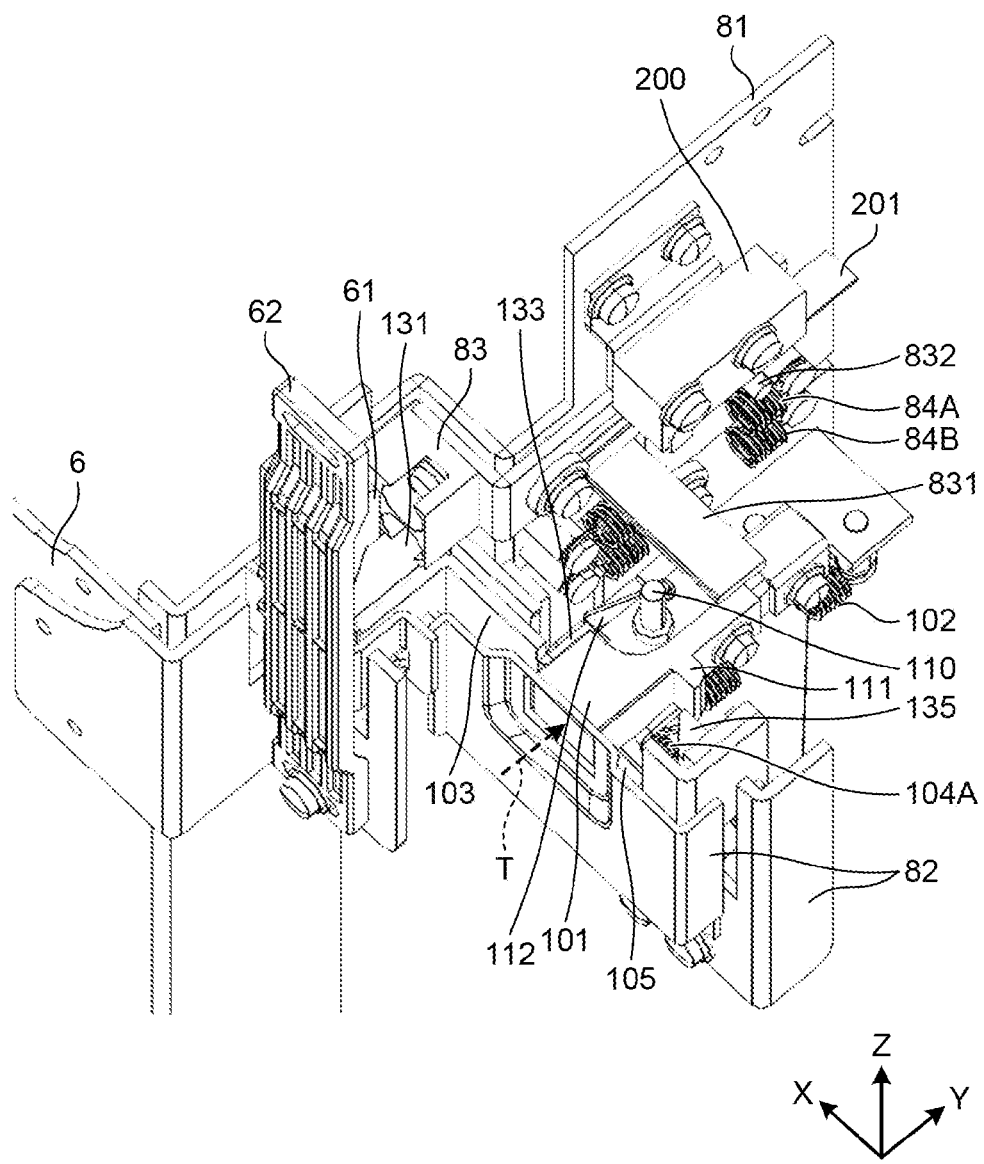
FIG. 35 is a perspective view of the interlock mechanism after the disabling button is pressed when the inner door is closed according to the second embodiment.
Figure 36:
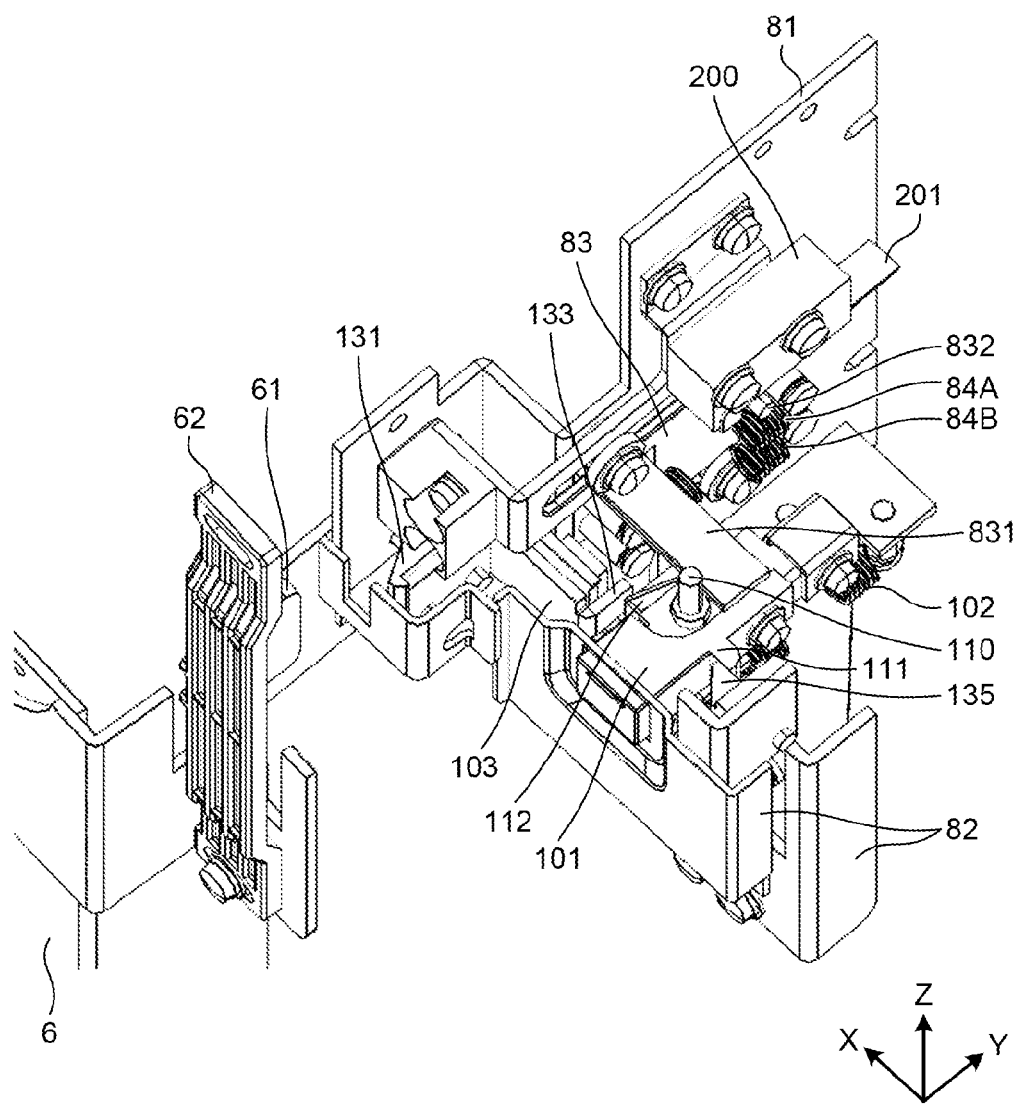
FIG. 36 is a perspective view of the interlock mechanism when the inner door is opened in a state in which the disabling button is pressed according to the second embodiment.

Next, the entire operation of the interlock mechanism according to the present embodiment will be described with reference to FIGS. 34 to 36. In FIGS. 34 to 36, for ease of seeing, intermediate portions of the cam springs 84A and 84B, the button spring 102, and the slider springs 104A and 104B are omitted.

FIG. 34 is a perspective view of the interlock mechanism before the disabling button is pressed when the inner door is closed according to the second embodiment. When the inner door 6 is closed, the inner door claw 61 enters into the interlock mechanism 8 and pushes the interlock switch cam 83 in the Y direction. Further, the inner door claw 61 comes into contact with the inner door claw receiving portion 131 and moves the slider 103 in the reverse X direction.

When the interlock switch cam 83 moves in the Y direction, the interlock switch cam 83 pushes the switch lever 201 against the pedestal of the interlock switch 200 and turns on the interlock switch 200. Thereby, the power is supplied to the conveyance mechanism 4.

At this time, the slider 103 moves in the reverse X direction while stretching the slider springs 104A and 104B. Then, the movable claw receiving portion 133 pushes the movable claw 112 inside the disabling button 101. When the slider 103 moves to a limit position in the reverse X direction, the button stopper 135 moves to a position where the stopper 111 does not come into contact with the button stopper 135 even when the stopper 111 moves in the Y direction. At this time, the stopper 111 is located in the reverse Y direction of the button stopper 135. In other words, the stopper 111 is located in front of the button stopper 135.

In this state, as illustrated in FIG. 34, the disabling lever receiving portion 831 of the interlock switch cam 83 and the disabling lever 110 of the disabling button 101 are not in contact with each other. In other words, the disabling mechanism does not act on the interlock switch cam 83.

FIG. 35 is a perspective view of the interlock mechanism after the disabling button is pressed when the inner door is closed according to the second embodiment. FIG. 35 illustrates a state in which an operator presses the disabling button 101 in the state of FIG. 34.

When the disabling button 101 is pressed by the operator, the disabling button 101 moves in the direction of arrow T. When the disabling button 101 moves to a position where the movable claw 112 protrudes, the movable claw 112 protrudes from the disabling button 101 to the outside.

Thereafter, when the operator stops pressing the disabling button 101 and the pressure force from the operator disappears, the disabling button 101 moves in the reverse Y direction by receiving the pulling force from the button spring 102. When the movable claw 112 comes into contact with the movable claw receiving portion 133, the disabling button 101 stops.

At this time, the interlock switch cam 83 is pushed by the inner door claw 61 and moved in the Y direction. Therefore, as illustrated in FIG. 35, the disabling lever receiving portion 831 is located in the rear of the disabling lever 110 and the disabling lever receiving portion 831 and the disabling lever 110 are not in contact with each other.

FIG. 36 is a top view of the interlock mechanism when the inner door is opened in a state in which the disabling button is pressed according to the second embodiment. FIG. 36 illustrates a state in which an operator opens the inner door 6 in the state of FIG. 35.

When the inner door 6 is opened, the slider 103 moves in the X direction by the pulling force of the slider springs 104A and 104B. When the slider 103 moves in the X direction, the contact between the movable claw receiving portion 133 and the movable claw 112 is released. Then, the disabling button 101 receives the pulling force from the button spring 102 and moves in the reverse Y direction. At this time, the movable claw 112 is stored in the button insertion hole 132 in the state in which the movable claw 112 protrudes from the disabling button 101.

Thereafter, the stopper 111 comes into contact with the button stopper 135 and the disabling button 101 stops moving. The stopper 111 and the button stopper 135 are in contact with each other, so that in this state, the disabling button 101 does not move in the Y direction any more.

When the inner door 6 is further opened and the inner door claw 61 comes off the interlock mechanism, the interlock switch cam 83 receives the pulling force from the cam springs 84A and 84B and moves in the reverse Y direction. When the disabling lever receiving portion 831 moves in the reverse Y direction, the disabling lever receiving portion 831 comes into contact with the disabling lever 110 and stops. At this time, as illustrated in FIG. 35, the interlock switch cam 83 stops at a position where the switch pressing portion 832 presses the switch lever 201 against the pedestal.

In this case, the interlock switch 200 is still on. Therefore, in this state, the power is continuously supplied to the conveyance mechanism 4. As a result, even when the inner door 6 is opened, the power supply to the conveyance mechanism 4 is not shut off and the operation of the conveyance mechanism 4 continues.

As described above, by using the tape library device according to the present embodiment, an operator such as a maintenance person can open the inner door without stopping the conveyance mechanism and the robot mechanism, so that the operator can check the state of when a failure occurs before performing the initialization. Further, when the operator performs maintenance of the device, the operator can stop only the robot mechanism which is an object of the maintenance and continue the operation of the conveyance mechanism. Specifically, when the tape library devices are connected, it is possible to stop only an operation of a specific tape library device and continue operations of the other tape library devices by using the interlock mechanism according to the present embodiment.

Further, also in the tape library device according to the present embodiment, it is possible to prevent the disabled state of the interlock switch from being forgotten to be released, so that it is possible to improve safety.

Further, the members of the tape library device according to the present embodiment can have a smaller number of machined parts than the members of the first embodiment, so that the cost can be reduced.

Third Embodiment

Next, a third embodiment will be described. A tape library device according to the present embodiment is different from the first and second embodiments in that a mechanism is provided to release the disabled state of the interlock when the maintenance cover is attached. Since a disabling mechanism of the interlock is the same as in the first and second embodiments, a function of each portion which is the same as in the first and second embodiments will not be described in the following description.

First, a summary of the present embodiment will be described. In the tape library device 1 of the first and second embodiments, when the maintenance is completed by returning the maintenance cover 7 to an original state without opening the inner door 6 after the maintenance cover 7 is removed and the disabling button 101 is pressed in a state in which the inner door 6 is closed, the disabling state of the interlock is continued. In this state, even when the user opens the inner door 6, the interlock mechanism does not act, resulting in a dangerous state. Thus, the tape library device 1 according to the present embodiment is provided with a mechanism which releases the disabled state of the interlock when the maintenance cover 7 is attached. Hereinafter, an example will be described below in which the mechanism for releasing the disabled state of the interlock is added to the tape library device 1 of the second embodiment 2.

Figure 37:
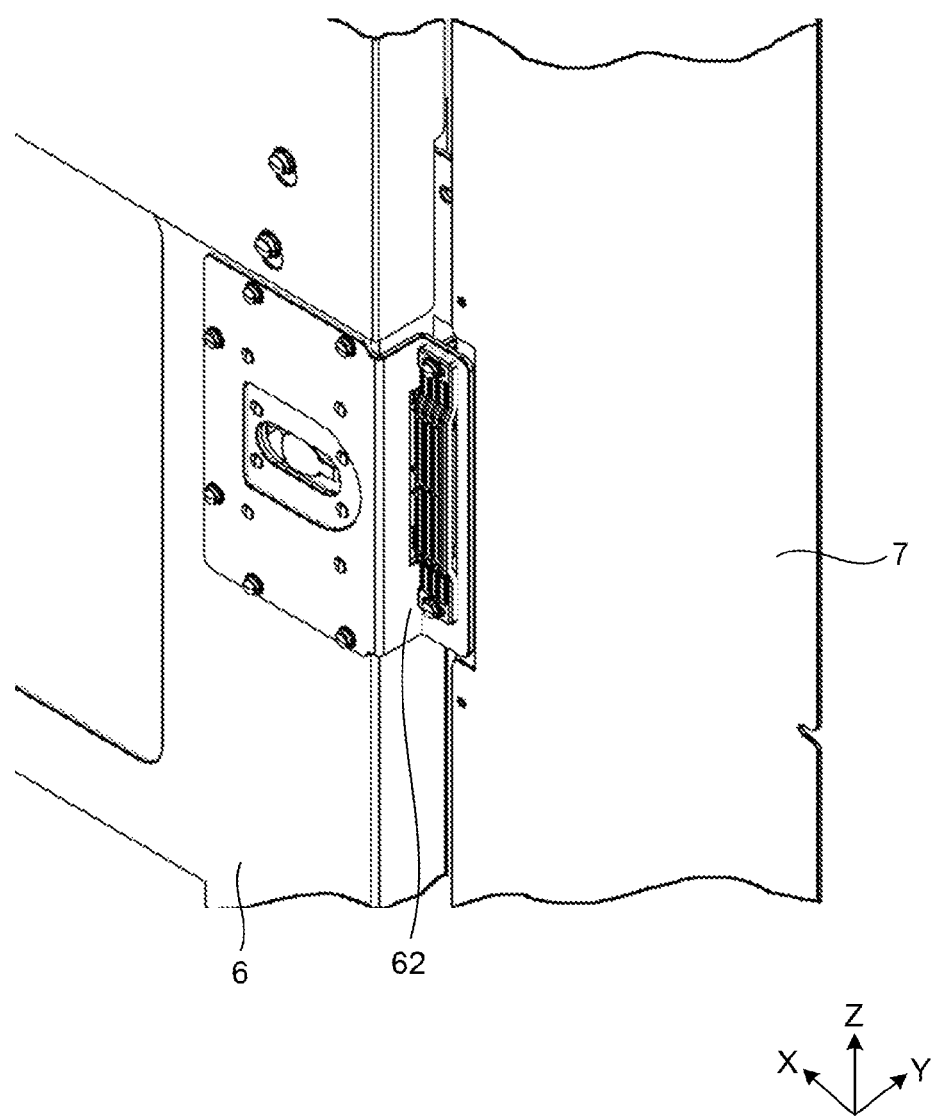
FIG. 37 is a perspective view illustrating a state in which the maintenance cover is attached.

FIG. 37 is a perspective view illustrating a state in which the maintenance cover is attached. As illustrated in FIG. 37, in the state in which outer door 5 is opened and the maintenance cover 7 is attached, the inner door 6 and the inner door claw connection member 62 appear and other mechanisms related to the interlock are hidden in the maintenance cover 7 which are the same state as in the second embodiment.

Figure 38:
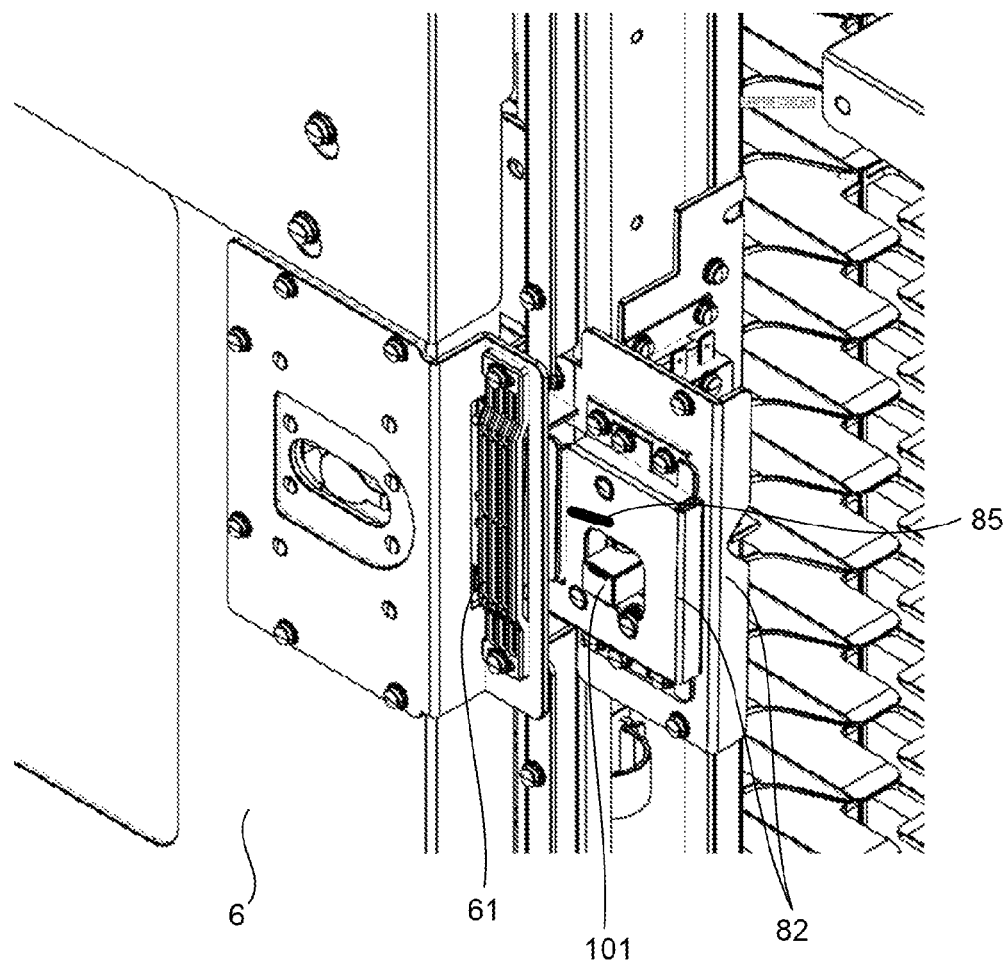
FIG. 38 is a perspective view illustrating a state in which the maintenance cover is removed.

FIG. 38 is a perspective view illustrating a state in which the maintenance cover is removed. When the maintenance cover 7 is removed, the state of FIG. 37 becomes a state of FIG. 38. When the maintenance cover 7 is removed, the disabling button 101 and the interlock cover 82 appear. In the present embodiment, a through hole 85 is opened to the interlock cover 82.

Figure 39:
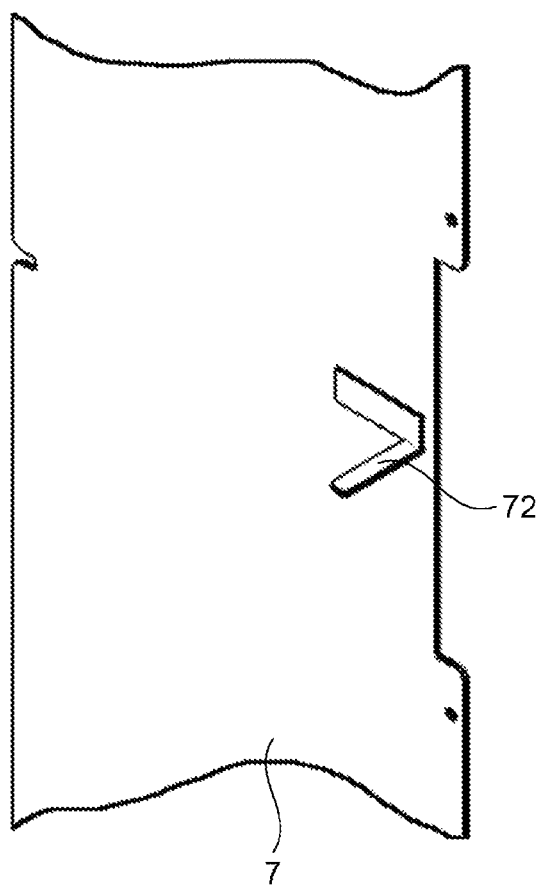
FIG. 39 is a rear view of a maintenance cover according to a third embodiment.

FIG. 39 is a rear view of the maintenance cover according to the third embodiment. In a case where a front surface is defined as a surface appearing outside when the maintenance cover 7 is attached to the tape library device 1, the maintenance cover 7 includes a disabling-releasable claw 72 at a rear surface. The disabling-releasable claw 72 is a projection extending in the Y direction when the maintenance cover 7 is attached to the tape library device 1.

Figure 40:
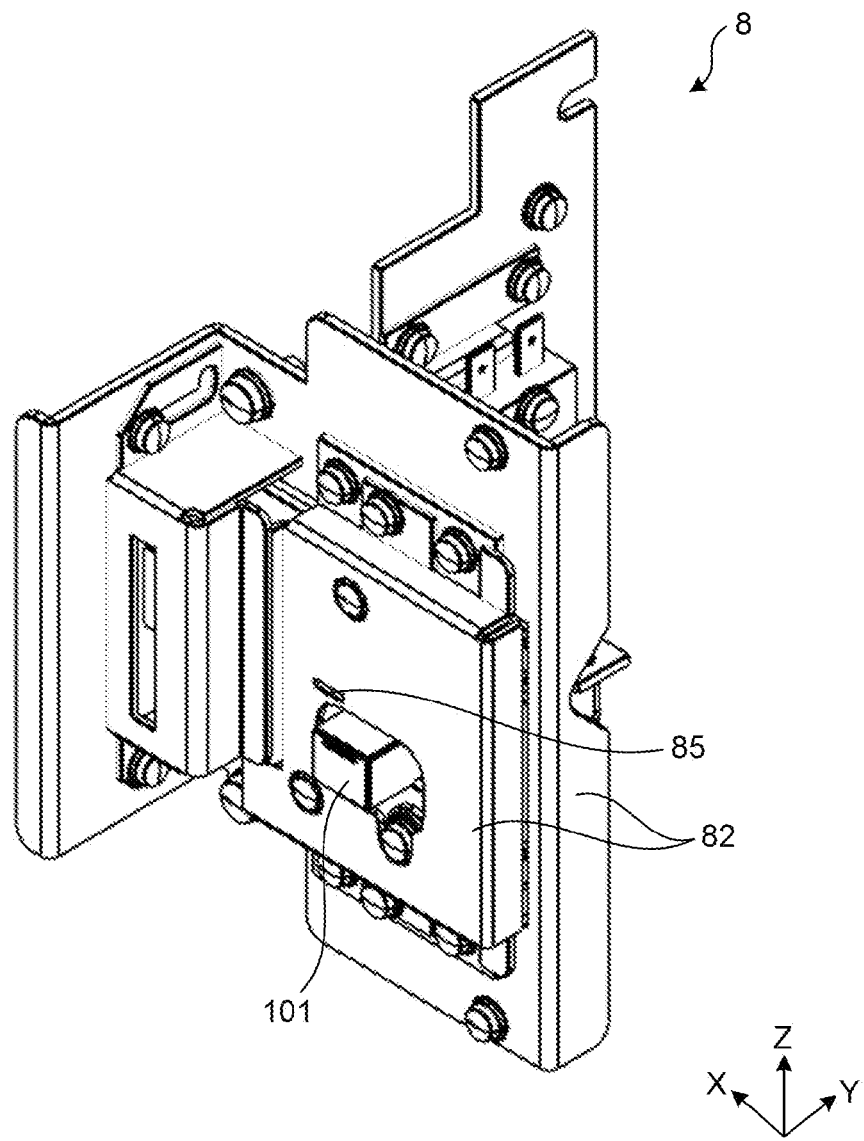
FIG. 40 is a front perspective view of an interlock mechanism according to the third embodiment.

FIG. 40 is a front perspective of the interlock mechanism according to the third embodiment. As described above, apart from the hole through which the disabling button 101 passes, the through hole 85 is provided on the interlock cover 82 of the interlock mechanism 8 for the conveyance mechanism according to the present embodiment. The disabling-releasable claw 72 is fitted with the through hole 85 provided on the interlock cover 82 when the maintenance cover 7 is attached to the tape library device 1. In the present embodiment, the through hole 85 is provided apart from the hole through which the disabling button 101 passes, but the hole through which the disabling button 101 passes may function as the through hole 85 by enlarging the size thereof.

Figure 41:
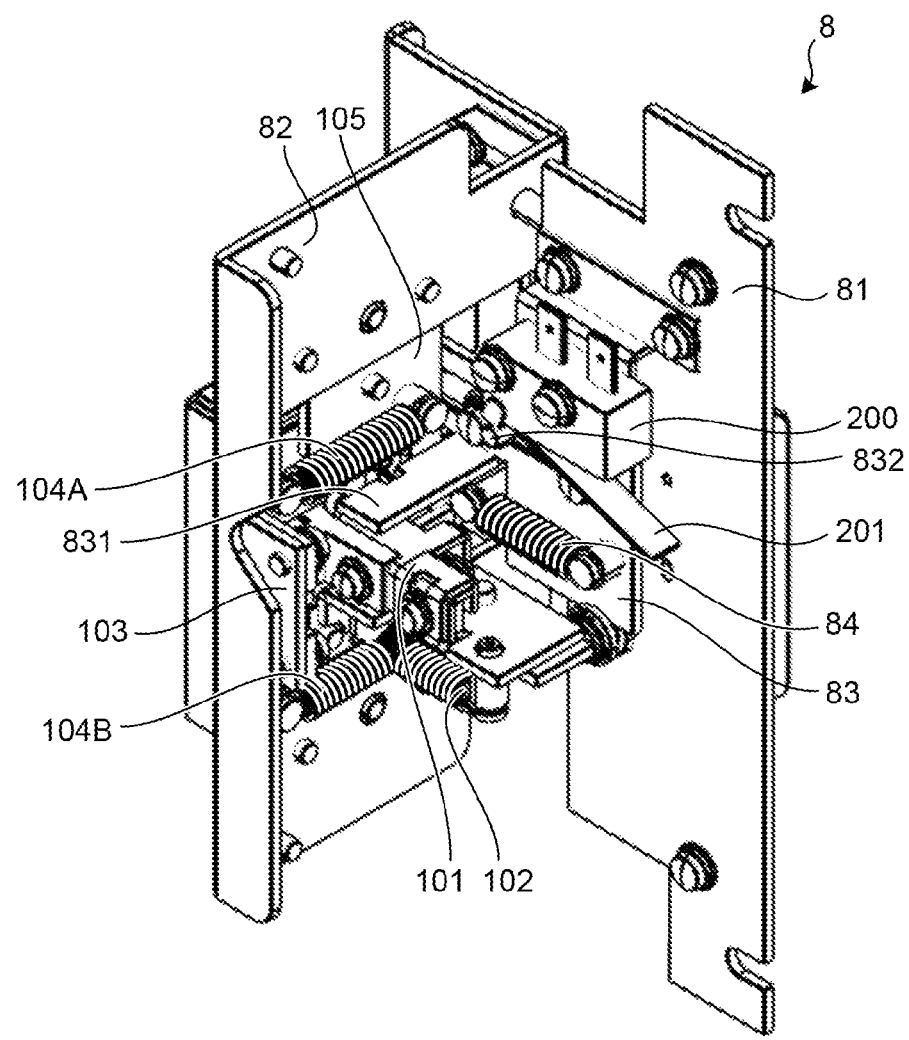
FIG. 41 is a rear perspective view of the interlock mechanism according to the third embodiment.
Figure 41:
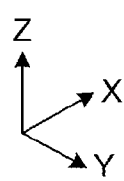

FIG. 41 is a rear perspective view of the interlock mechanism according to the third embodiment. As illustrated in FIG. 41, the present embodiment is configured such that the restoring force is obtained using a contracting force of the spring as in the second embodiment. In order to easily clarify the illustration, however, unlike the second embodiment, only one cam spring 84 is arranged as the spring which applies the restoring force to the interlock switch cam 83. Furthermore, in FIG. 41, since it is difficult to illustrate the mechanism for releasing the disabled state of the interlock in detail, the appearance seems like the rear perspective view of the conventional interlock mechanism 8 for the conveyance mechanism. Thus, the mechanism for releasing the disabled state of the interlock will be described below in detail.

Figure 42A:
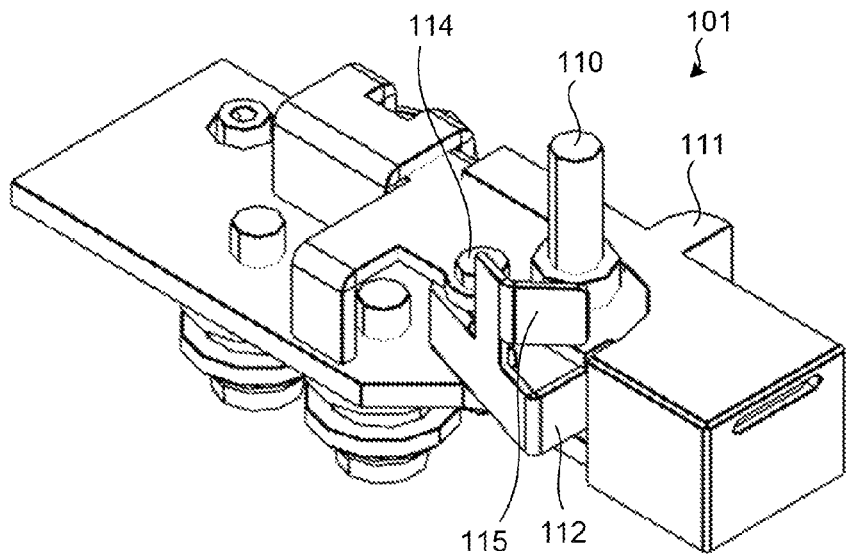
FIG. 42A is a perspective view of a disabling button in a state in which a movable claw according to the third embodiment protrudes.
Figure 42B:
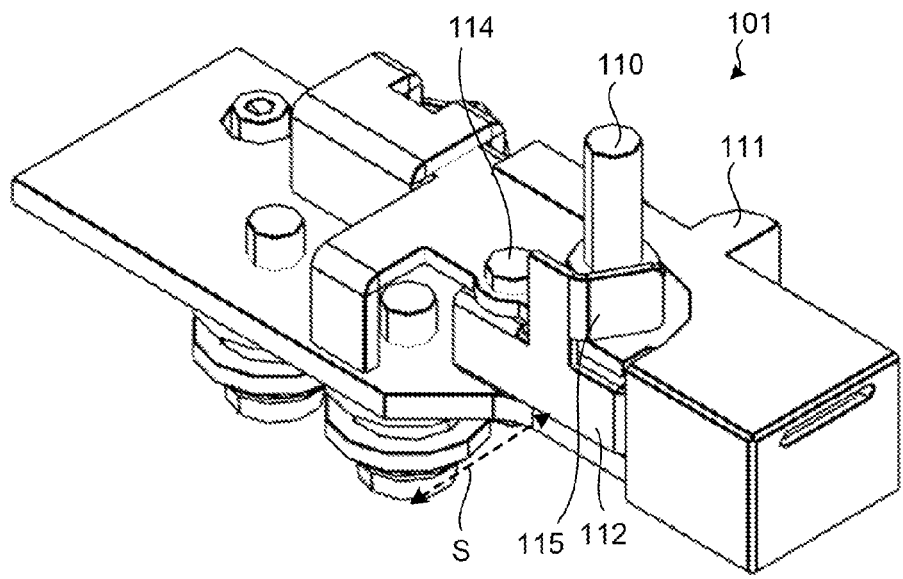
FIG. 42B is a perspective view of the disabling button in a state the movable claw according to the third embodiment is stored.

FIG. 42A is a perspective view of the disabling button in a state in which the movable claw according to the third embodiment protrudes. In addition, FIG. 42B is a perspective view of the disabling button in a state in which the movable claw according to the third embodiment is stored.

The disabling button 101 according to the present embodiment includes the movable claw 112 which rotates around a fulcrum 114 as a center in a direction as indicated by arrow S. In the present embodiment, the movable claw 112 obtains the restoring force by the torsion coil spring (not illustrated) arranged around the fulcrum 114.

The movable claw 112 according to the present embodiment includes a disabling-releasable claw receiving portion 115. The disabling-releasable claw receiving portion 115 includes a surface, which intersects with a moving direction of the disabling button 101 with an inclination, in a state in which the movable claw 112 protrudes from the disabling button 101. Hereinafter, this surface is referred to as a "slope of the disabling-releasable claw receiving portion 115". The slope of the disabling-releasable claw receiving portion 115 is a surface going away from the disabling button 101 toward a direction in which the disabling button 101 is pushed. In addition, the disabling-releasable claw receiving portion 115 includes a surface parallel to the moving direction of the disabling button 101 in a state in which the movable claw 112 is stored in the disabling button 101. Hereinafter, this surface is referred to as a "parallel surface of the disabling-releasable claw receiving portion 115".

When a member comes in contact with the slope of the disabling-releasable claw receiving portion 115 and the force is applied to the direction in which the disabling button 101 is pushed against the slope, the movable claw 112 is stored in the disabling button 101. In the state in which the movable claw 112 is stored in the disabling button 101, the member coming in contact with the slope of the disabling-releasable claw receiving portion 115 finishes the contact with the slope and comes in contact with a parallel surface of the disabling button 101. For this reason, the protrusion of the movable claw 112 is inhibited, and thus the state in which the movable claw 112 is stored in the disabling button 101 is maintained. The disabling-releasable claw 72 is a member which presses the disabling-releasable claw receiving portion 115.

That is, when the disabling-releasable claw 72 presses the slope of the disabling-releasable claw receiving portion 115 which is provided at the movable claw 112 to protrude from the disabling button 101, the movable claw 112 is stored in the disabling button 101. Thus, the contact between the movable claw 112 and the movable claw receiving portion 133 is released. That is, the pressed state of the disabling button 101, which is maintained by the contact between the movable claw 112 and the movable claw receiving portion 133, is released, the disabling button 101 moves in the reverse Y direction by the restoring force of the button spring 102, and thus the interlock is released.

Figure 43:
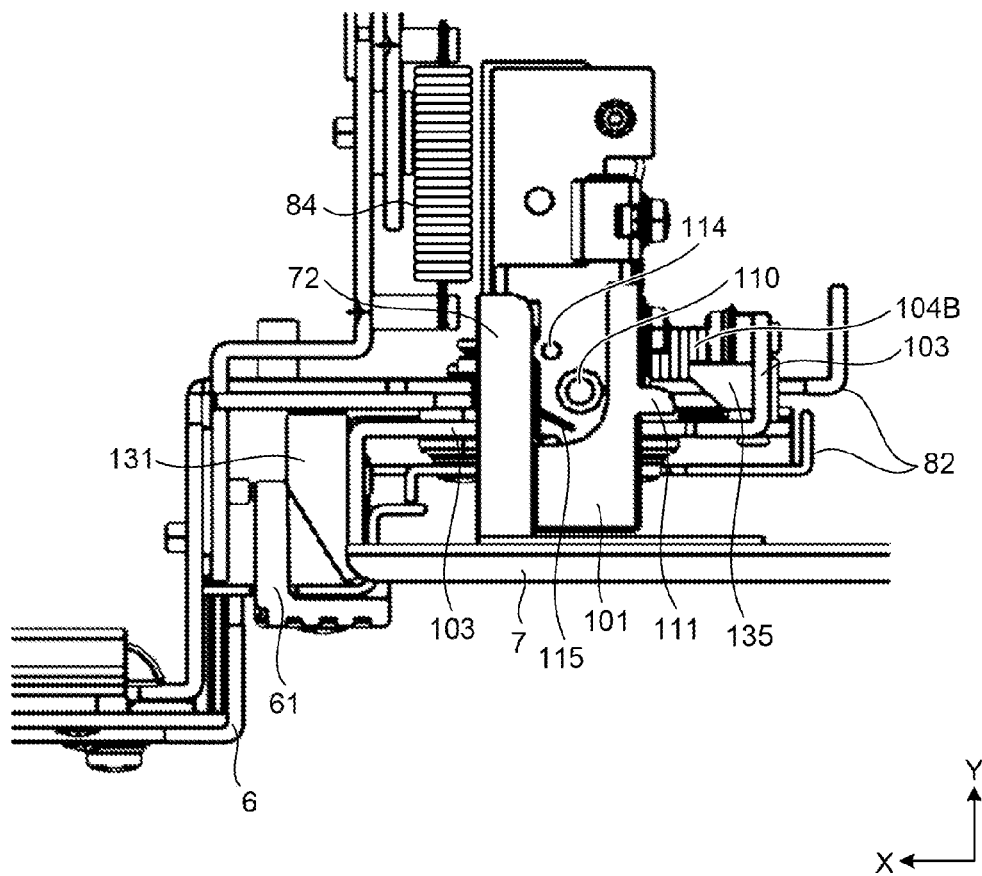
FIG. 43 is a schematic diagram illustrating a state in which the maintenance cover according to the third embodiment is attached.
Figure 44:
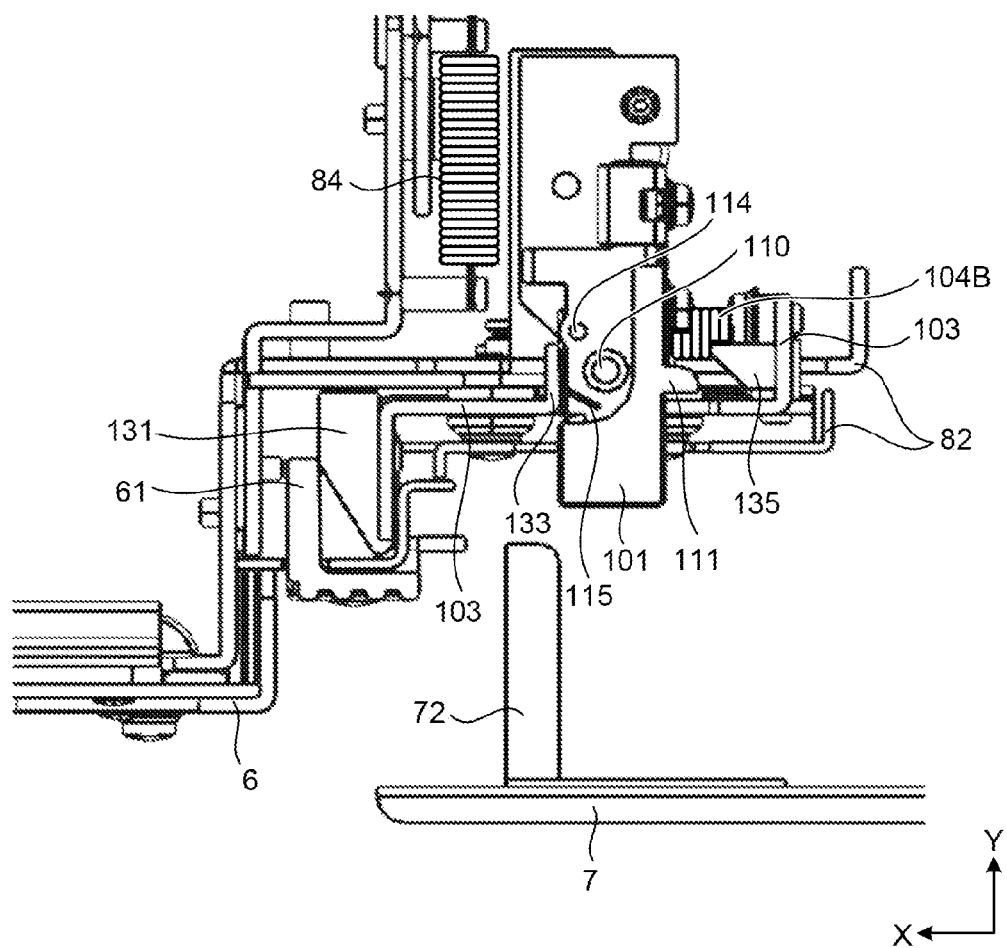
FIG. 44 is a schematic diagram illustrating a state immediately after the maintenance cover according to the third embodiment is removed.
Figure 45:
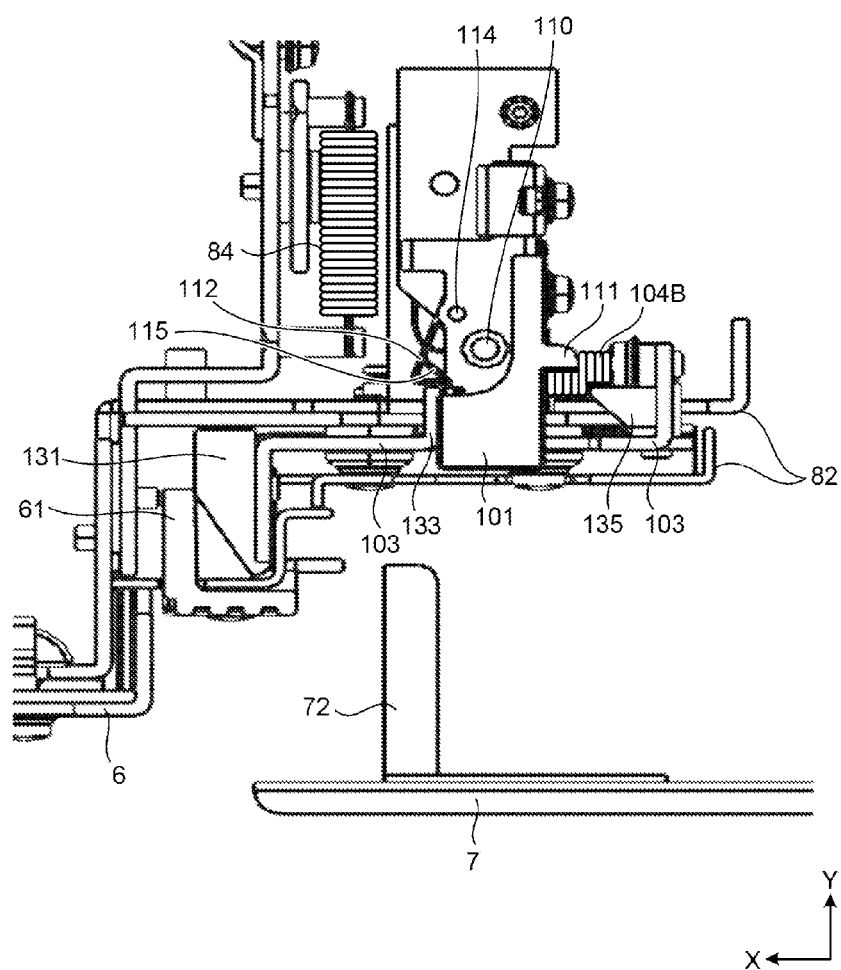
FIG. 45 is a schematic diagram illustrating a state in which the maintenance cover according to the third embodiment is removed and the disabling button is pressed.
Figure 46:
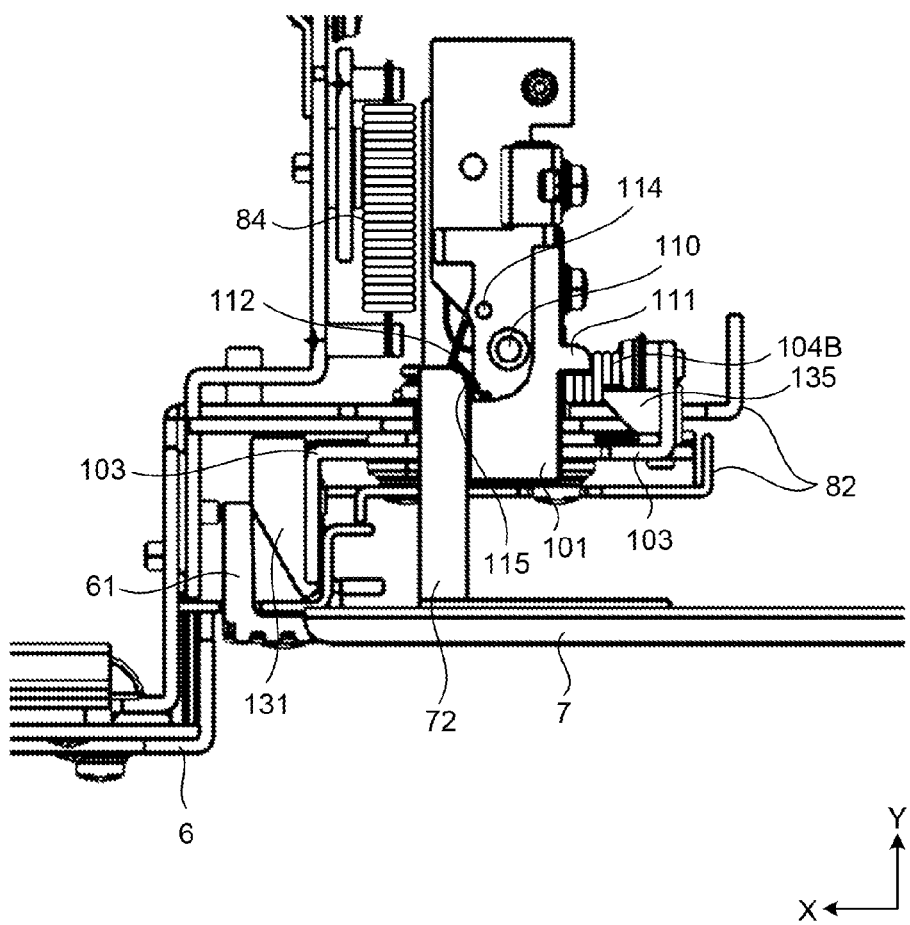
FIG. 46 is a schematic view illustrating a state in the middle of attaching the maintenance cover by pressing the maintenance cover from the state in which the disabling button according to the third embodiment is pressed.

Next, an operation of a mechanism for releasing the disabled state of the interlock according to the present embodiment will be described with reference to FIGS. 43 to 46. FIG. 43 is a schematic diagram illustrating a state in which the maintenance cover according to the third embodiment is attached. FIG. 44 is a schematic diagram illustrating a state immediately after the maintenance cover according to the third embodiment is removed. FIG. 45 is a schematic diagram illustrating a state in which the maintenance cover according to the third embodiment is removed and the disabling button is pressed. FIG. 46 is a schematic view illustrating a state in the middle of attaching the maintenance cover by pressing the maintenance cover from the state in which the disabling button according to the third embodiment is pressed.

In the state in which the maintenance cover 7 is attached, as illustrated in FIG. 43, the disabling-releasable claw 72 comes in contact with the parallel surface of the disabling-releasable claw receiving portion 115 from the reverse X direction, and the state in which the movable claw 112 is stored in the disabling button 101 is maintained.

When the maintenance cover 7 is removed from the state of FIG. 43, as in FIG. 44, the movable claw receiving portion 133 comes in contact with the movable claw 112 from the reverse X direction, and the state in which the movable claw 112 (not illustrated) is stored in the disabling button 101 is maintained.

When the disabling button 101 is pressed in the state of FIG. 44, the disabling button 101 moves in the reverse Y direction. Thus, the contact between the movable claw 112 and the movable claw receiving portion 133 disappears, and the movable claw 112 protrudes from the disabling button 101. Thereafter, as in FIG. 45, the movable claw 112 comes in contact with the movable claw receiving portion 133 from the reverse Y direction to inhibit the disabling button 101 from moving to the reverse Y direction and to stop the disabling button 101. Even though the inner door 6 is opened in this state, the stopper 111 and the button stopper 135 come in contact with each other, and the disabling state of the interlock is maintained. That is, in this state without change, there is a dangerous possibility that an operator for performing the next work opens the inner door 6 and performs the work without knowing the disabled state of the interlock. Therefore, the following operations are performed by attaching the maintenance cover 7.

When the maintenance cover 7 is attached in the state of FIG. 45, as illustrated in FIG. 46, the disabling-releasable claw 72 enters into the interlock mechanism 8 for the conveyance mechanism along the through hole 85. Thus, the disabling-releasable claw 72 comes in contact with the slope of the disabling-releasable claw receiving portion 115. Thereafter, the disabling-releasable claw 72 moves in the Y direction while adding the pressure force to the slope of the disabling-releasable claw receiving portion 115 to move the movable claw 112 to the inside of the disabling button 101. Then, when the contact between the disabling-releasable claw 72 and the slope of the disabling-releasable claw receiving portion 115 is completed, the movable claw 112 is stored in the disabling button 101. Thereafter, the disabling-releasable claw 72 comes in contact with the parallel surface of the disabling-releasable claw receiving portion 115 from the reverse X direction. The disabling button 101 moves in the reverse Y direction by the restoring force of the button spring 102. Then, when the attachment of the maintenance cover 7 is completed, it is returned to the state of FIG. 43. In this state, the disabling button 101 is not pressed, and thus the power supply to the conveyance mechanism 4 is shut off when the operator opens the inner door 6 and the operator can perform maintenance work in a safety state.

Figure 47:
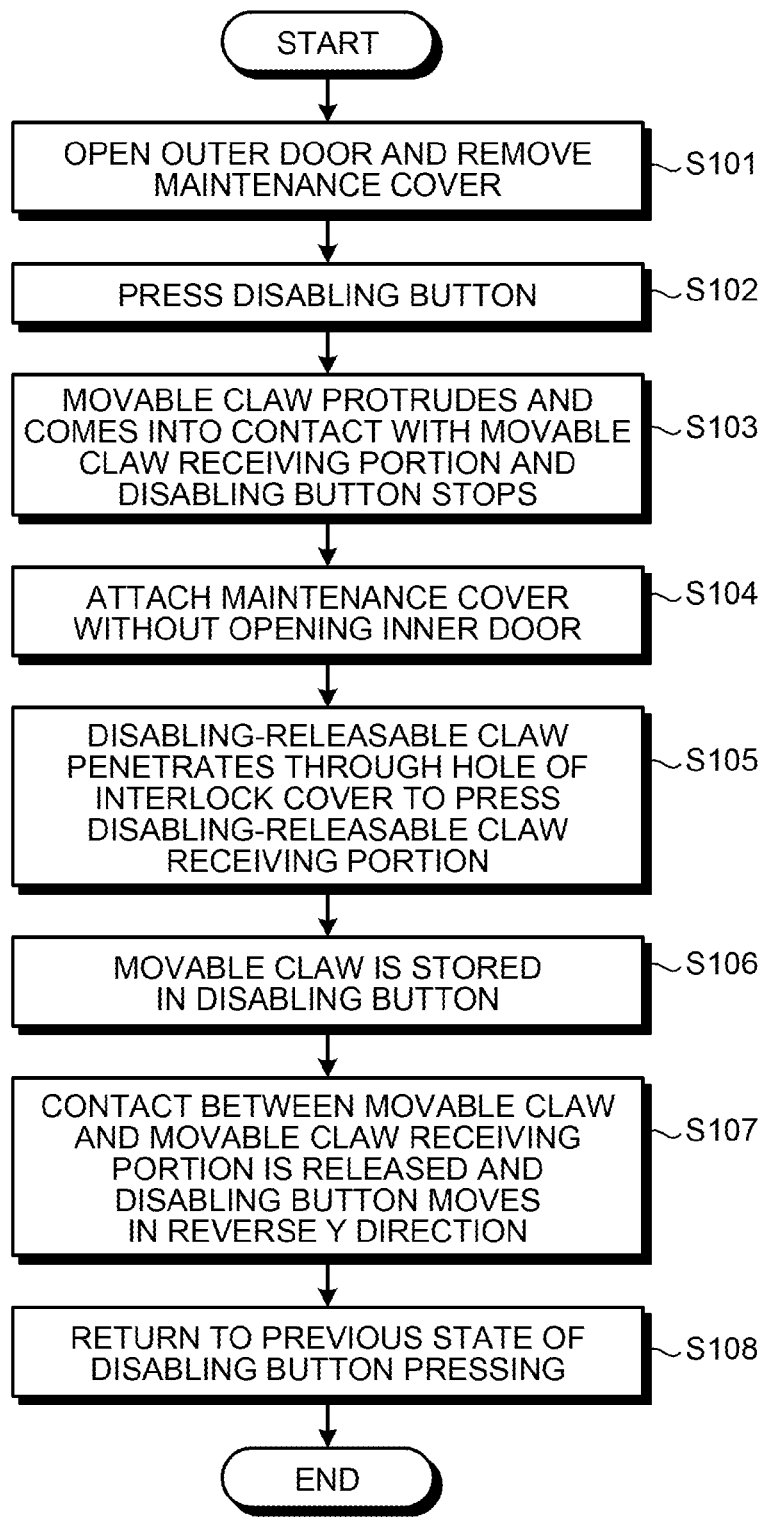
FIG. 47 is a flowchart of an operation of a disabling release in a tape library device according to the third embodiment.

Next, an operation of the disabling release of the interlock in the tape library device 1 according to the third embodiment will be described with reference to FIG. 47. FIG. 47 is a flowchart of the operation of the disabling release in the tape library device according to the third embodiment.

The operator opens the outer door 5 and removes the maintenance cover 7 (step S101). Moreover, the operator presses the disabling button 101 (step S102).

The movable claw 112 protrudes from the disabling button 101 and comes in contact with the movable claw receiving portion 133 to stop the movement of the disabling button 101 to the reverse Y direction (step S103).

The operator attaches the maintenance cover 7 without opening the inner door 6 (step S104).

The disabling-releasable claw 72 penetrates the through hole 85 of the interlock cover 82 to press the disabling-releasable claw receiving portion 115 (step S105).

The movable claw 112 is stored in the disabling button 101 (step S106).

The contact between the movable claw 112 and the movable claw receiving portion 133 is released and the disabling button 101 moves in the reverse Y direction (step S107).

The disabling button 101 is returned to the state before being pressed (step S108). Thus, the disabled state of the interlock is released.

As described above, in the tape library device according to the present embodiment, when the maintenance cover is returned without opening the inner door in the state in which the disabling button is pressed and the interlock is disabled, the disabled state of the interlock is released. For this reason, even when the work is completed without opening the inner door while pressing the disabling button, the disabled state of the interlock is released, and thus the operator can perform the work in safety in a case of performing the next work.

Furthermore, the mechanism for releasing the disabled state of the interlock according to the present embodiment can be also added to the first embodiment. Even in this case, the same effects can be obtained.

Fourth Embodiment

Next, a fourth embodiment will be described. A tape library device according to the present embodiment is different from the third embodiment in terms of a structure of the mechanism for releasing the disabled state of the interlock. With respect to the disabling mechanism of the interlock, the present embodiment is the same as in the first and second embodiments. A function of each portion which is the same as in the first and second embodiments will not be described in the following description. Even in the present embodiment, a case where the mechanism for releasing the disabled state of the interlock is added to the second embodiment will be described as an example.

Figure 48:
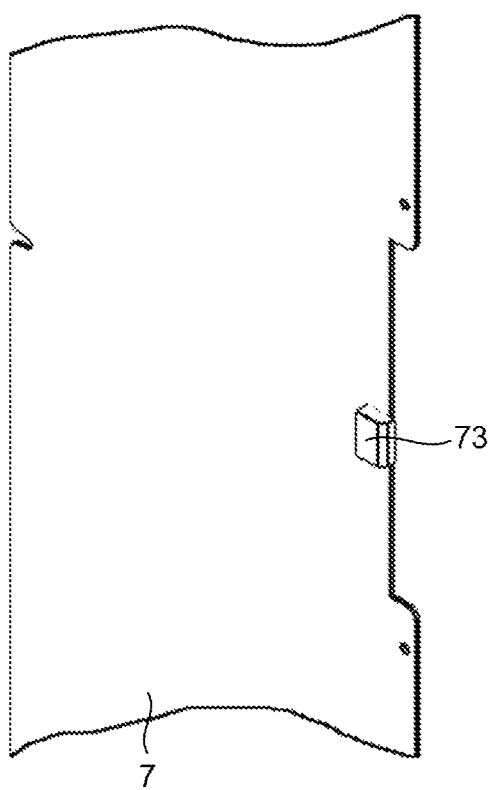
FIG. 48 is a rear view of a maintenance cover according to a fourth embodiment.

FIG. 48 is a rear view of a maintenance cover according to the fourth embodiment. In a case where a front surface is defined as a surface appearing outside when the maintenance cover 7 according to the present embodiment is attached to the tape library device 1, the maintenance cover 7 includes a disabling-releasable block 73 at a rear surface. The disabling-releasable block 73 is a projection protruding toward the Y direction when the maintenance cover 7 is attached to the tape library device 1. Unlike the disabling-releasable claw 72 of the third embodiment, the disabling-releasable block 73 does not enter up to the inside of the interlock mechanism 8 for the conveyance mechanism. Therefore, the disabling-releasable block 73 may be shorter than the disabling-releasable claw 72 in a length protruding toward the Y direction.

Figure 49:
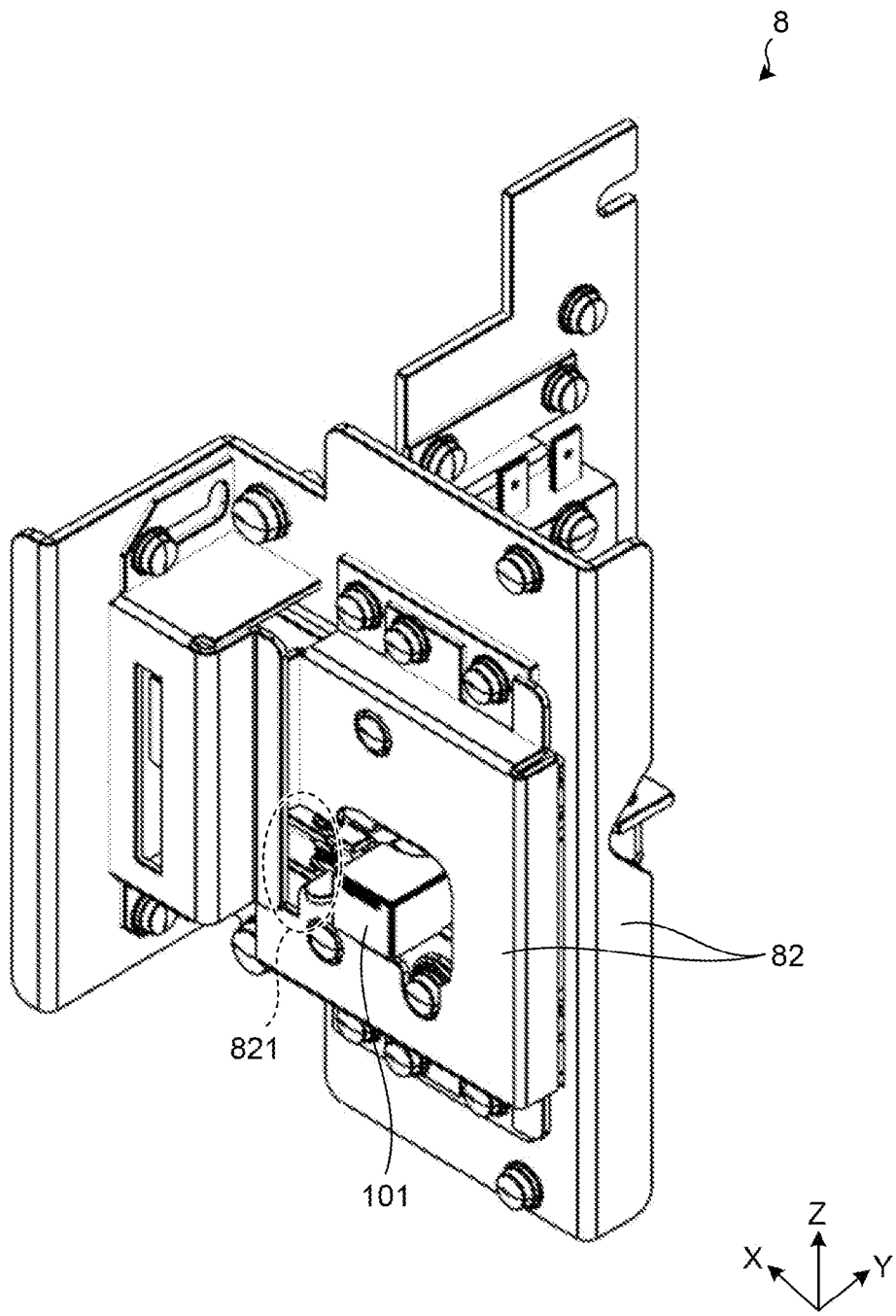
FIG. 49 is a front perspective view of an interlock mechanism according to the fourth embodiment.

FIG. 49 is a front perspective view of an interlock mechanism according to the fourth embodiment. In the interlock cover 82 of the interlock mechanism 8 for the conveyance mechanism according to the present embodiment, a notch 821 is provided in the hole through which the disabling button 101 passes. The disabling-releasable block 73 is fitted with the notch 821 provided on the interlock cover 82 when the maintenance cover 7 is attached to the tape library device 1. Here, in the present embodiment, the notch 821 is provided by enlarging the hole through which the disabling button 101 passes, but a hole having a function of the notch 821 may be provided apart from the hole through which the disabling button 101 passes.

Figure 50A:
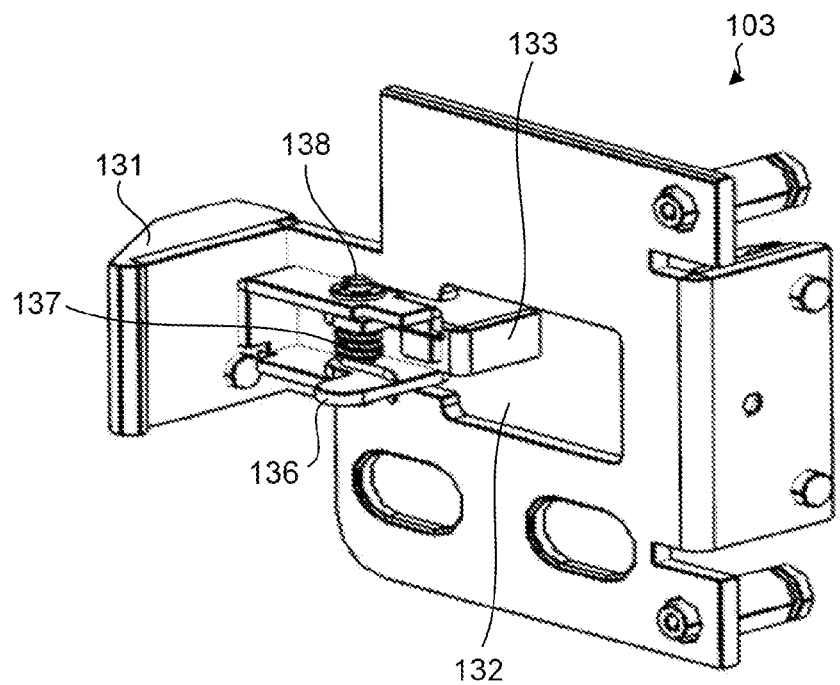
FIG. 50A is a perspective view of a slider in a state in which a movable claw receiving portion according to the fourth embodiment is not pressed against a disabling-releasable block.
Figure 50B:
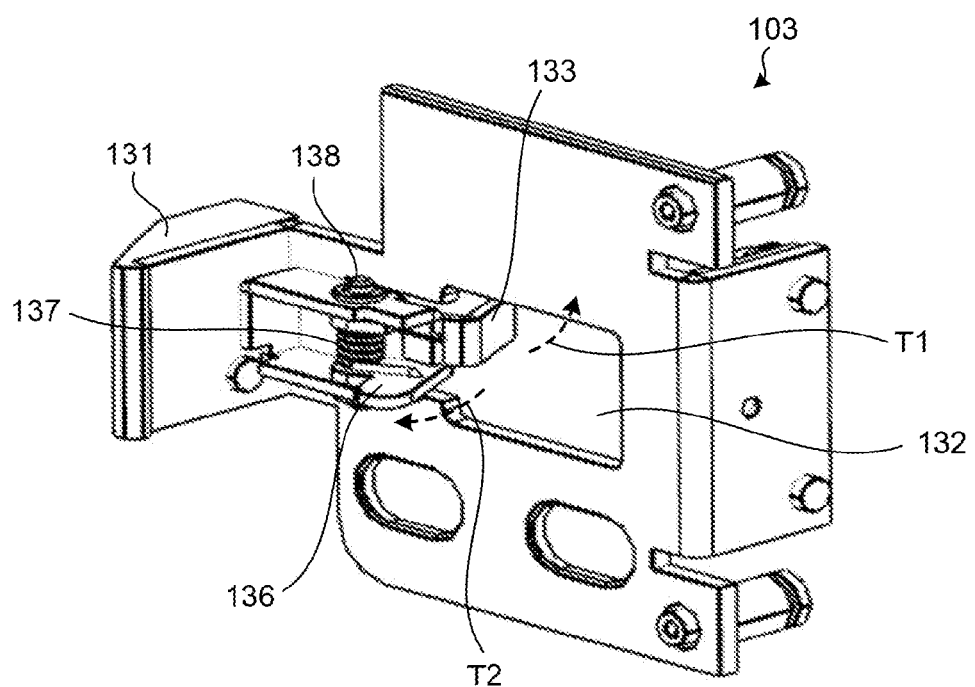
FIG. 50B is a perspective view of the slider in a state in which the movable claw receiving portion according to the fourth embodiment is pressed against the disabling-releasable block.

FIG. 50A is a perspective view of a slider in a state in which a movable claw receiving portion according to the fourth embodiment is not pressed against a disabling-releasable block. Further, FIG. 50B is a perspective view of the slider in a state in which the movable claw receiving portion according to the fourth embodiment is pressed against the disabling-releasable block.

The slider 103 according to the present embodiment includes the movable claw receiving portion 133 which rotates around the fulcrum 138 as a center in directions indicated by arrows T1 and T2. The movable claw receiving portion 133 is connected to the projection 136 which protrudes toward a direction opposite to the direction toward which the movable claw receiving portion 133 protrudes. The movable claw receiving portion 133 and the projection 136 obtain the restoring force in the T2 direction by the torsion coil spring 137 arranged around the fulcrum 138 as a center. The restoring force by the torsion coil spring 137 is greater than that of the movable claw 112.

In a case where the slider 103 is combined with the interlock cover 82, the projection 136 passes through the notch 821 and protrudes toward a front side of the interlock cover 82, that is, a side facing the maintenance cover 7.

When a member comes in contact with the tip of the projection 136, the projection 136 is pressed against the member, and thus the projection 136 and the movable claw receiving portion 133 rotate in the T1 direction. When the pressure force toward the projection 136 from the member is eliminated, the projection 136 and the movable claw receiving portion 133 rotate in the T2 direction by the restoring force of the torsion coil spring 137. The disabling-releasable block 73 is a member which presses the projection 136.

Figure 51:
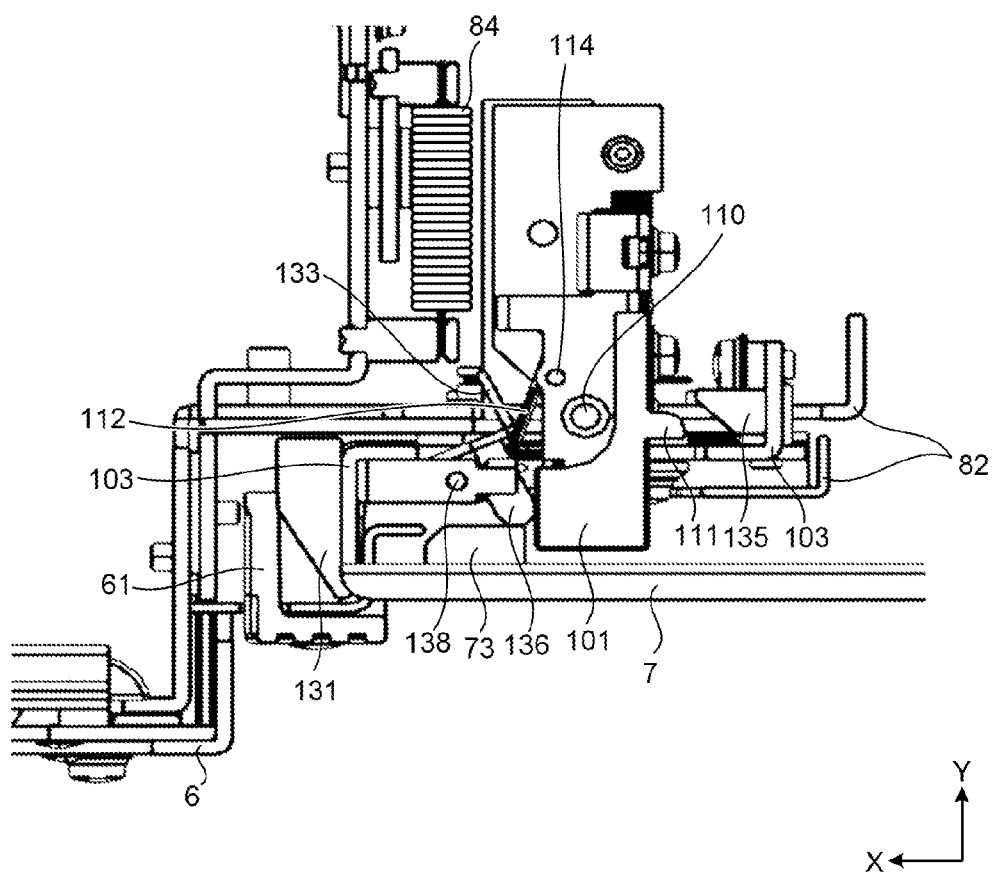
FIG. 51 is a schematic view illustrating a state in which the maintenance cover according to the fourth embodiment is attached.
Figure 52:
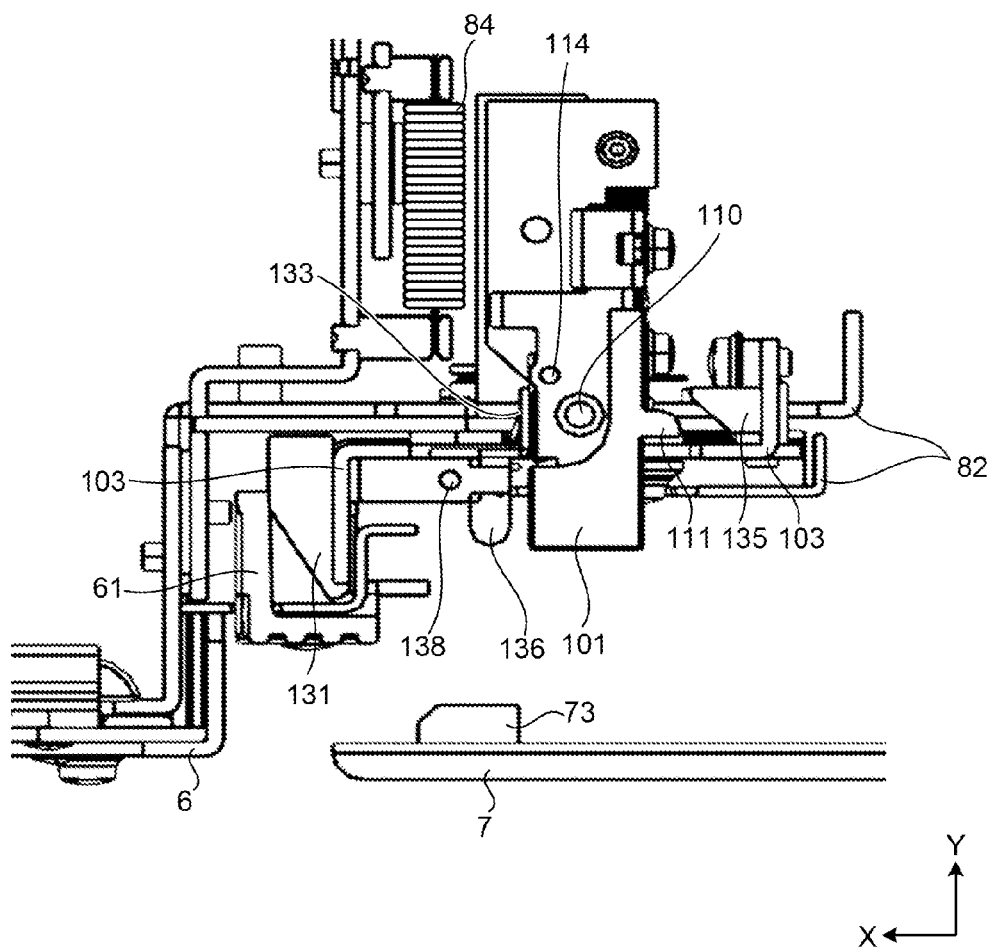
FIG. 52 is a schematic view illustrating a state immediately after the maintenance cover according to the fourth embodiment is removed.
Figure 53:
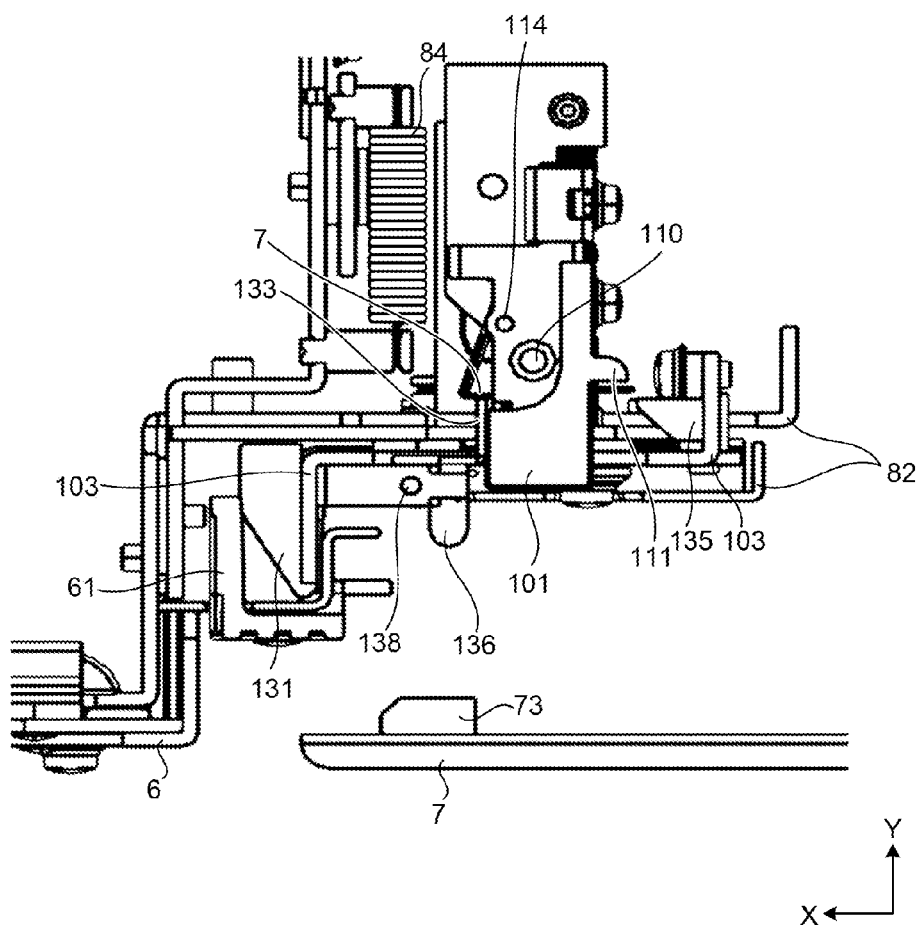
FIG. 53 is a schematic view illustrating a state in which the maintenance cover according to the fourth embodiment is removed and the disabling button is pressed.
Figure 54:
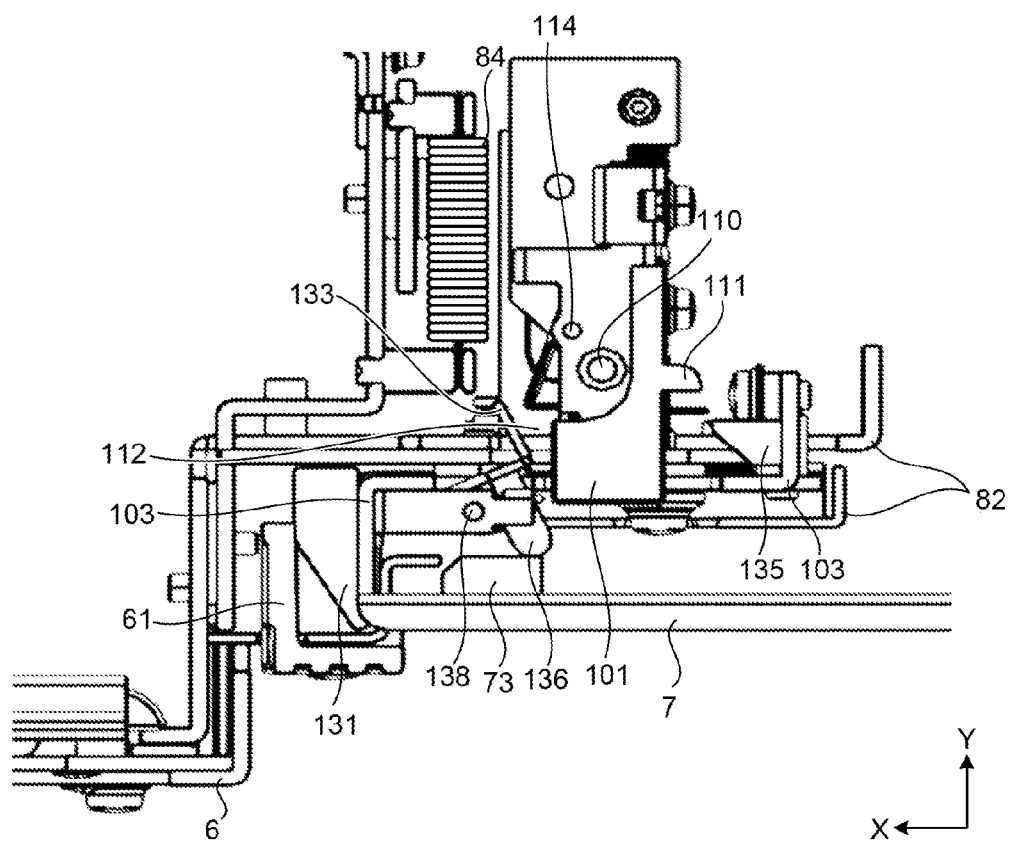
FIG. 54 is a schematic view illustrating a state in the middle of attaching the maintenance cover by pressing the maintenance cover from the state in which the disabling button according to the fourth embodiment is pressed.

Next, an operation of a mechanism for releasing the disabled state of the interlock according to the present embodiment will be described with reference to FIGS. 51 to 54. FIG. 51 is a schematic diagram illustrating a state in which the maintenance cover according to the fourth embodiment is attached. FIG. 52 is a schematic diagram illustrating a state immediately after the maintenance cover according to the fourth embodiment is removed. FIG. 53 is a schematic diagram illustrating a state in which the maintenance cover according to the fourth embodiment is removed and the disabling button is pressed. FIG. 54 is a schematic view illustrating a state in the middle of attaching the maintenance cover by pressing the maintenance cover from the state in which the disabling button according to the fourth embodiment is pressed.

In the state in which the maintenance cover 7 is attached, as illustrated in FIG. 51, the disabling-releasable block 73 presses the projection 136 toward the Y direction and the movable claw receiving portion 133 rotates around the fulcrum 138 as a center in the direction going away from the disabling button 101. The movable claw 112 protrudes from the disabling button 101.

When the maintenance cover 7 is removed from the state of FIG. 51, as in FIG. 52, the movable claw receiving portion 133 comes in contact with the movable claw 112 from the reverse X direction toward the disabling button 101 around the fulcrum 138 as a center by the restoring force of the torsion coil spring 137, and the movable claw 112 rotates in a direction approaching the disabling button 101. Since the restoring force of the movable claw receiving portion 133 is greater than that of the movable claw 112, the movable claw receiving portion 133 rotates to press and rotate the movable claw 112 toward the reverse X direction. The movable claw 112 is stored in the disabling button 101 by receiving the pressure force from the movable claw receiving portion 133, as illustrated in FIG. 52.

When the disabling button 101 is pressed in the state of FIG. 52, the disabling button 101 moves in the reverse Y direction. Thus, the contact between the movable claw 112 and the movable claw receiving portion 133 disappears, and the movable claw 112 protrudes from the disabling button 101. At this time, the movable claw receiving portion 133 maintains the state in which the movable claw 112 is pushed in the disabling button 101. Thereafter, as in FIG. 53, the movable claw 112 comes in contact with the movable claw receiving portion 133 from the reverse Y direction to inhibit the disabling button 101 from moving to the reverse Y direction and to stop the disabling button 101. Even though the inner door 6 is opened in this state, the stopper 111 and the button stopper 135 come in contact with each other, and the disabled state of the interlock is maintained. That is, in this state without change, there is a possibility that an operator for performing the next work opens the inner door 6 and performs the work without knowing the disabled state of the interlock, which is dangerous. Therefore, the following operations are performed by attaching the maintenance cover 7.

When the maintenance cover 7 is attached in the state of FIG. 53, as illustrated in FIG. 54, the disabling-releasable block 73 comes in contact with projection 136. Thereafter, the disabling-releasable block 73 moves in the Y direction while adding the pressure force to the projection 136 to rotate the movable claw receiving portion 133 in the direction going away from the disabling button 101 around the fulcrum 138 as a center. As the movable claw receiving portion 133 rotates, the contact between the movable claw 112 and the movable claw receiving portion 133 in the Y direction is released. When the contact between the movable claw 112 and the movable claw receiving portion 133 in the Y direction is released, a force for inhibiting the movement to the reverse Y direction of the disabling button 101 is eliminated, and thus the disabling button 101 moves in the Y direction by the restoring force of the button spring 102. Then, when the attachment of the maintenance cover 7 is completed, it is returned to the state of FIG. 51. In this state, the disabling button 101 is not pressed, and thus the power supply to the conveyance mechanism 4 is shut off when the operator opens the inner door 6 and the operator can perform maintenance work in a safety state.

Figure 55:
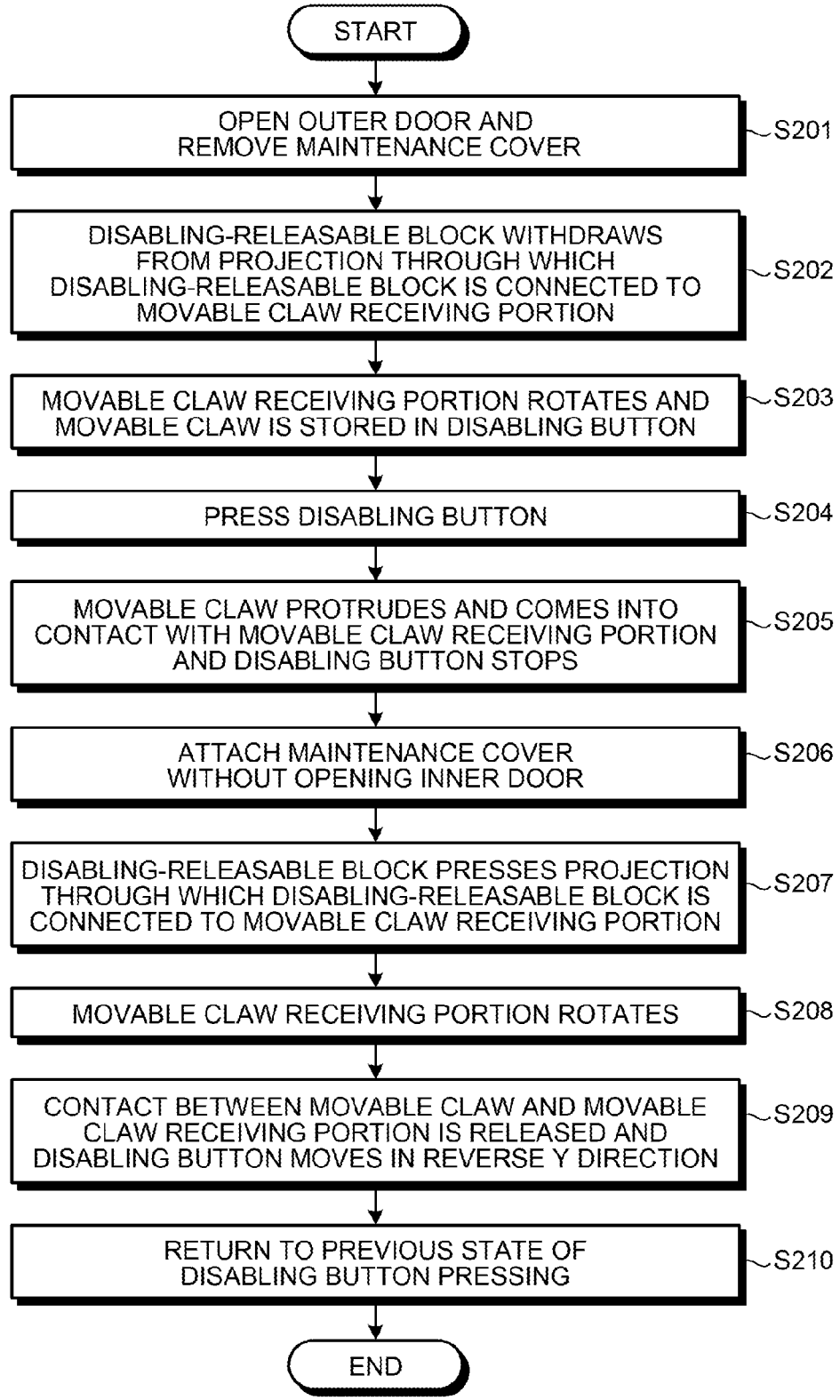
FIG. 55 is a flowchart of an operation of a disabling release in a tape library device according to the fourth embodiment.

Next, an operation of releasing the disabled state of the interlock in the tape library device 1 according to the fourth embodiment will be described with reference to FIG. 55. FIG. 55 is a flowchart of the operation of the disabling release in the tape library device according to the fourth embodiment.

The operator opens the outer door 5 and removes the maintenance cover 7 (step S201).

The disabling-releasable block 73 withdraws from the projection 136 through which the disabling-releasable block is connected to the movable claw receiving portion 133 (step S202).

The movable claw receiving portion 133 rotates and the movable claw 112 is stored in the disabling button 101 (step S203).

The operator presses the disabling button 101 (step S204).

The movable claw 112 protrudes from the disabling button 101 and comes in contact with the movable claw receiving portion 133 to stop the movement of the disabling button 101 in the reverse Y direction (step S205).

The operator attaches the maintenance cover 7 without opening the inner door 6 (step S206).

The disabling-releasable block 73 presses the projection 136 through which the disabling-releasable block is connected to the movable claw receiving portion 133 (step S207).

The movable claw receiving portion 133 rotates in the direction going away from the disabling button 101 around the fulcrum 138 as a center (step S208).

The contact between the movable claw 112 and the movable claw receiving portion 133 is released and the disabling button 101 moves in the reverse Y direction (step S209).

The disabling button 101 is returned to the state before being pressed (step S210). Thus, the disabled state of the interlock is released.

As described above, in the tape library device according to the present embodiment, as in the third embodiment, when the maintenance cover is returned without opening the inner door in the state in which the disabling button is pressed and the interlock is disabled, the disabled state of the interlock is released. For this reason, even when the work is completed without opening the inner door while pressing the disabling button, the disabled state of the interlock is released and thus the operator can perform the work in safety in a case of performing the next work.

Furthermore, the mechanism for releasing the disabled state of the interlock according to the present embodiment can be also added to the first embodiment. Even in this case, the same effects can be obtained.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A library device comprising:
a storage shelf that stores a plurality of storage media;
a management unit that manages movement of the storage media stored in the storage shelf;
a switch cam that moves in a predetermined direction when a pressing force from a pressing member is removed;
a power supply shutoff unit that shuts off power supply to the management unit when the switch cam moves in the predetermined direction; and
a movement prevention unit that moves on a moving path of the switch cam by receiving an instruction from an operator and prevents the switch cam from moving in the predetermined direction.
2. The library device according to claim 1, comprising:
a plurality of housings in which the storage shelf is mounted,
wherein the management unit includes a robot mechanism that puts the storage media into the storage shelf and takes the storage media out of the storage shelf and a conveyance mechanism that conveys the storage media between the housings, and
the power supply shutoff unit shuts off power supply to either one or both of the robot mechanism and the conveyance mechanism.
3. The library device according to claim 1, wherein
the power supply shutoff unit shuts off power supply when the switch cam moves a predetermined distance, and the movement prevention unit moves to within the predetermined distance from the switch cam in the predetermined direction and prevents the switch cam from moving a distance greater than the predetermined distance in the predetermined direction.

4. The library device according to claim 1, wherein
the movement prevention unit includes a button, and
when the button is pressed by the operator, a protrusion portion connected to the button moves on the moving path of the switch cam and prevents the switch cam from moving in the predetermined direction.

5. The library device according to claim 1, wherein
when the switch cam is pressed in a direction opposite to the predetermined direction by the pressing member in a state in which the movement prevention unit prevents the switch cam from moving in the predetermined direction, the movement prevention unit retreats from the moving path of the switch cam and releases preventing the switch cam from moving in the predetermined direction.

6. The library device according to claim 1, wherein
the pressing member is arranged on a door of the library device.

7. The library device according to claim 1, further comprising movement prevention releasing units that move the movement prevention unit from the moving path of the switch cam and release the state in which the movement prevention unit prevents the switch cam from moving in the predetermined direction.

8. The library device according to claim 7, further comprising a detachable protection member that covers the movement prevention unit,
wherein the movement prevention releasing units are projections that are provided on a surface facing the movement prevention unit of the protection member, in a state in which the protection member covers the movement prevention unit, and press the movement prevention unit to move the movement prevention unit from the moving path of the switch cam when the protection member covers the movement prevention unit.

9. A control method of a library device including a storage shelf that stores a plurality of storage media, a management mechanism that manages movement of the storage media stored in the storage shelf, and a switch cam that moves in a predetermined direction when a pressing force from a pressing member is removed, the control method comprising:
shutting off power supply to the management mechanism when the switch cam moves in the predetermined direction; and
moving a movement prevention unit on the moving path of the switch cam by receiving an instruction from an operator and preventing the switch cam from moving in the predetermined direction.

\* \* \* \* \*